United States Patent [19]

Nagaoka

[11] Patent Number: 5,386,365
[45] Date of Patent: Jan. 31, 1995

[54] REAR WHEEL STEERING SYSTEM FOR VEHICLE

[75] Inventor: Mitsuru Nagaoka, Hiroshima, Japan

[73] Assignee: Mazda Motor Corporation, Hiroshima, Japan

[21] Appl. No.: 855,060

[22] Filed: Mar. 19, 1992

[30] Foreign Application Priority Data

| Mar. 22, 1991 | [JP] | Japan | 3-058587 |
| Mar. 22, 1991 | [JP] | Japan | 3-058588 |
| Mar. 22, 1991 | [JP] | Japan | 3-058589 |
| Mar. 22, 1991 | [JP] | Japan | 3-058591 |
| May 20, 1991 | [JP] | Japan | 3-114939 |
| May 20, 1991 | [JP] | Japan | 3-114940 |
| May 20, 1991 | [JP] | Japan | 3-114941 |
| Jun. 6, 1991 | [JP] | Japan | 3-134811 |
| Jun. 6, 1991 | [JP] | Japan | 3-134812 |
| Jun. 6, 1991 | [JP] | Japan | 3-134813 |

[51] Int. Cl.$^6$ ............................................. B62D 7/14
[52] U.S. Cl. ............................. 364/424.05; 364/424.01
[58] Field of Search .................... 364/424.01, 424.02, 364/424.03, 424.04, 424.05; 280/91; 395/900

[56] References Cited

U.S. PATENT DOCUMENTS

| 4,679,808 | 7/1987 | Ito et al. | 364/424.01 |
| 4,706,979 | 11/1987 | Kawabe et al. | 280/91 |
| 4,718,685 | 1/1988 | Kawabe et al. | 280/91 |
| 4,767,588 | 9/1988 | Ito | 364/424.01 |
| 4,786,065 | 11/1988 | Donges et al. | 280/91 |
| 4,834,204 | 5/1989 | Ito et al. | 364/424.1 |
| 4,947,326 | 9/1990 | Mori et al. | 364/424.05 |
| 4,949,261 | 9/1990 | Ito et al. | 364/424.05 |
| 5,018,070 | 5/1991 | Eguchi | 364/424.05 |
| 5,048,627 | 10/1991 | Eguchi et al. | 364/424.05 |
| 5,138,554 | 9/1992 | Wada | 364/424.05 |
| 5,159,555 | 10/1992 | Wada | 364/424.05 |
| 5,208,751 | 5/1993 | Berkefeld | 364/424.05 |

FOREIGN PATENT DOCUMENTS 1-262268 10/1989 Japan.

Primary Examiner—Kevin J. Teska
Assistant Examiner—Stephen J. Walder, Jr.
Attorney, Agent, or Firm—Keck, Mahin & Cate

[57] ABSTRACT

A rear wheel steering system for a vehicle including a yaw rate sensor for detecting a yaw rate of the vehicle and yaw rate feedback controller for controlling a steering angle of rear wheels so that a yaw rate detected by the yaw rate sensor is made equal to a target yaw rate, the rear wheel steering system further including a side slip angle calculator for estimating a side slip angle of the vehicle, a side slip angle controller for controlling the steering angle of the rear wheels to decrease an absolute value of the estimated side slip angle calculated by the side slip angle calculator and a fuzzy controller for controlling the steering angle of the rear wheels based on fuzzy control to decrease an absolute value of a rate of change in the detected yaw rate. This rear wheel steering system can control the steering angle of the rear wheels in a desired manner even when the lateral acceleration is high and the vehicle is turning sharply, and can improve driving stability.

13 Claims, 34 Drawing Sheets

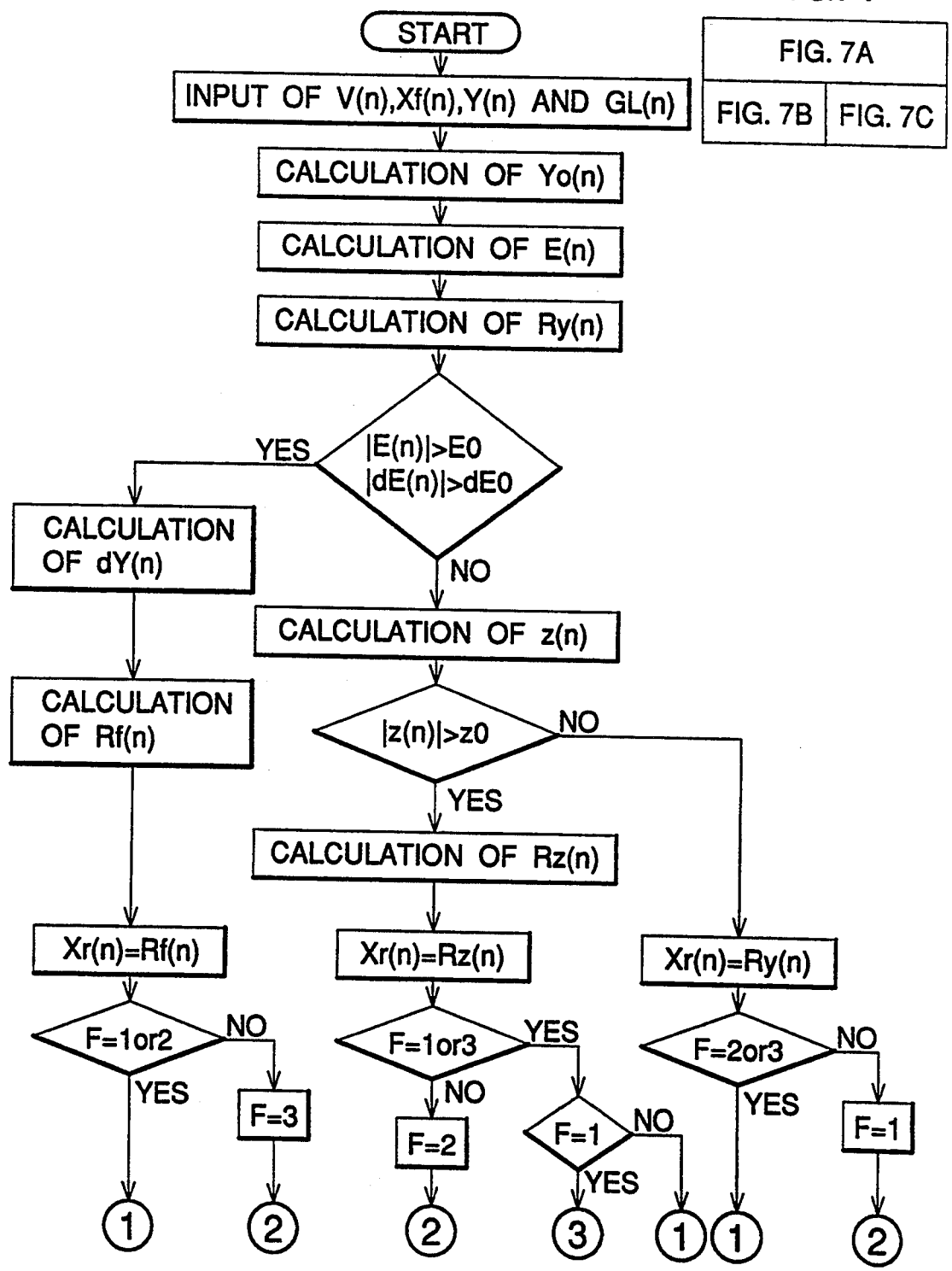

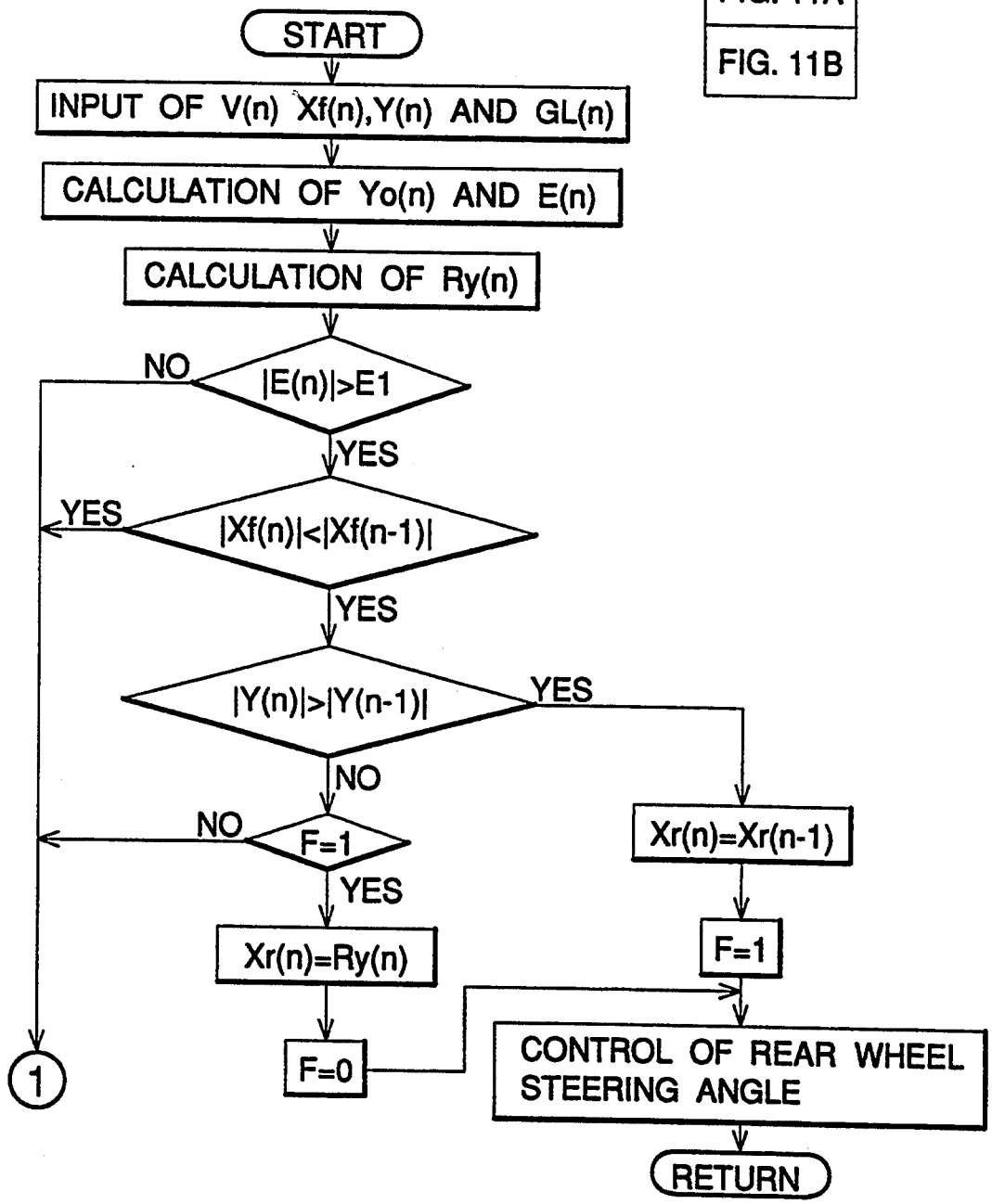
FIG. 11A
FIG. 11
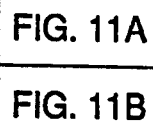

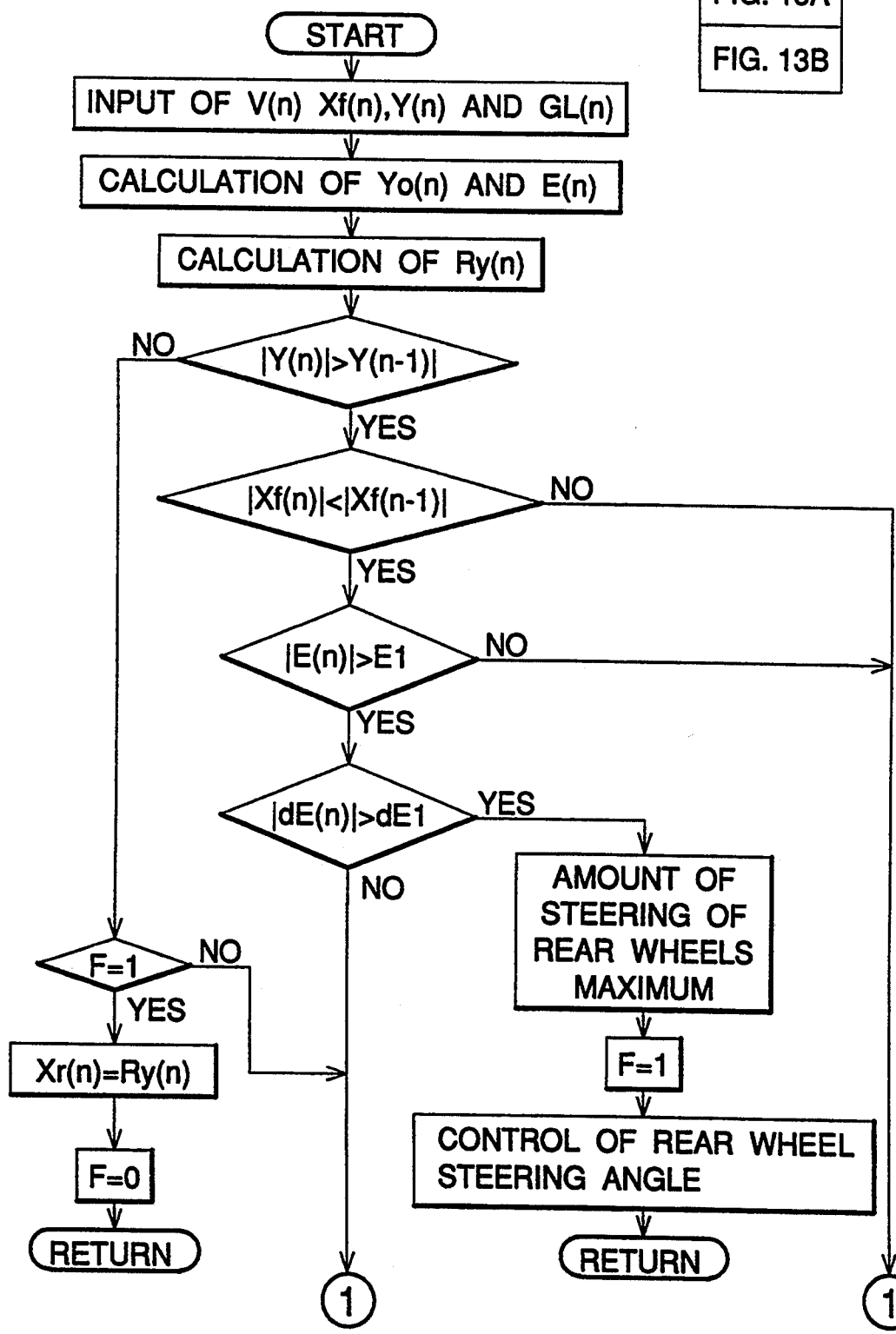

| FIG. 16A |
|---|
| FIG. 16B |

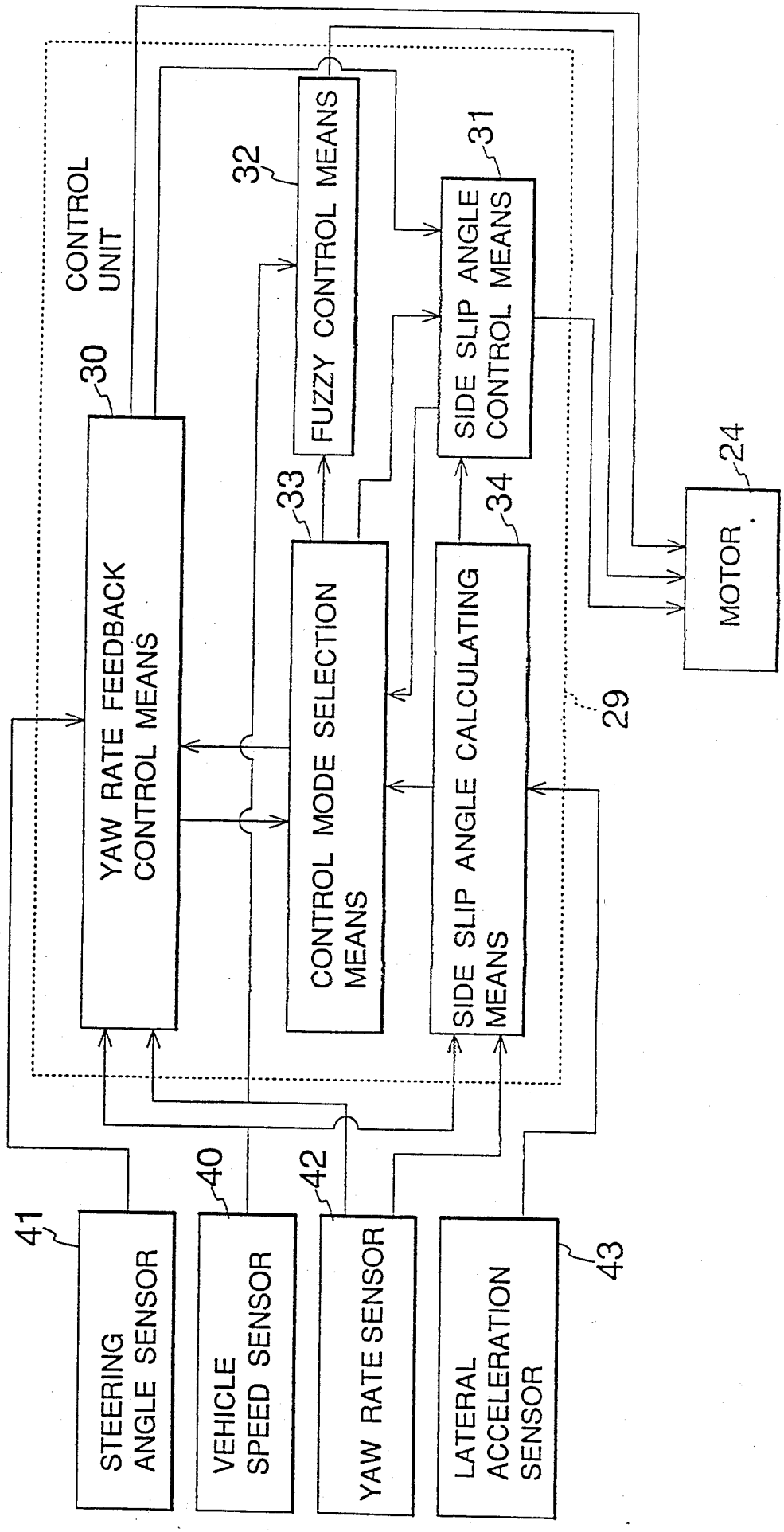

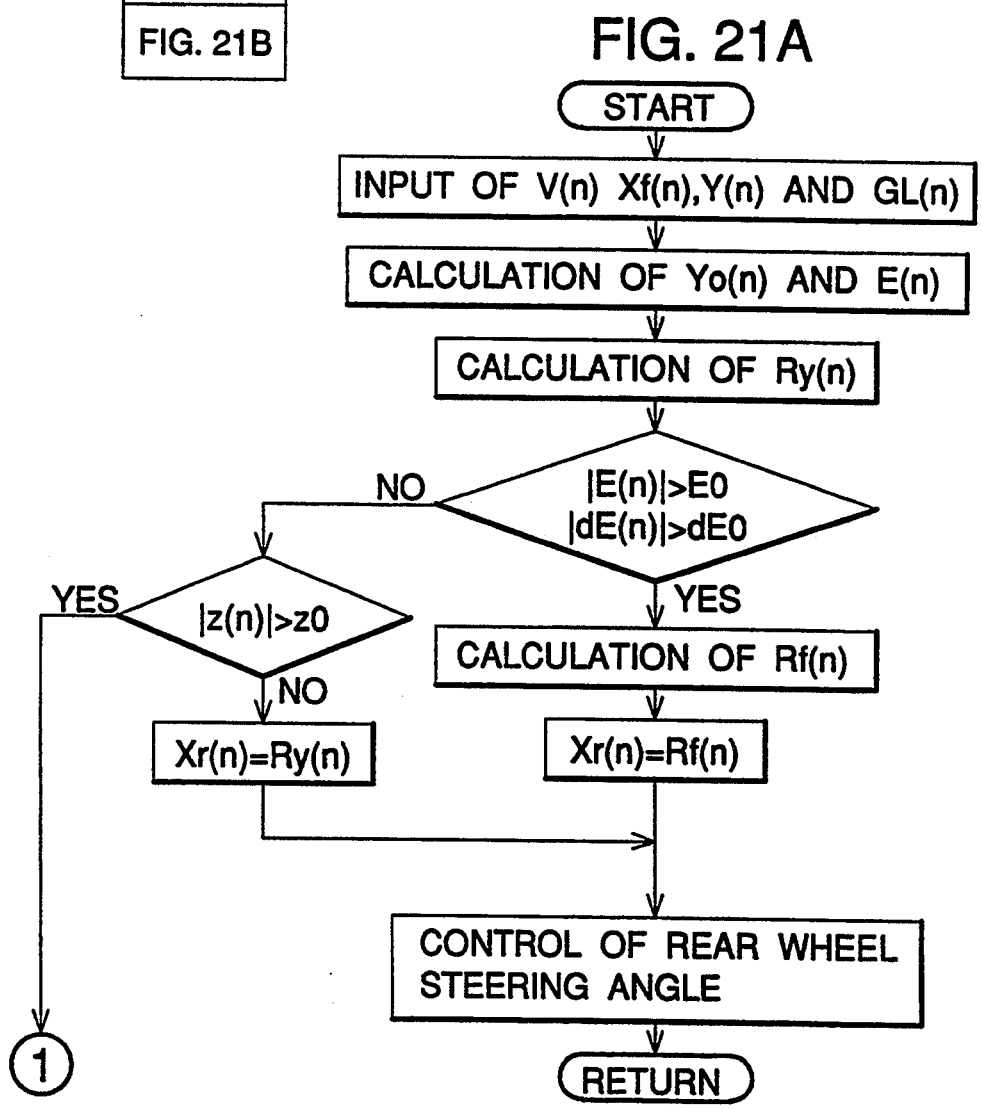

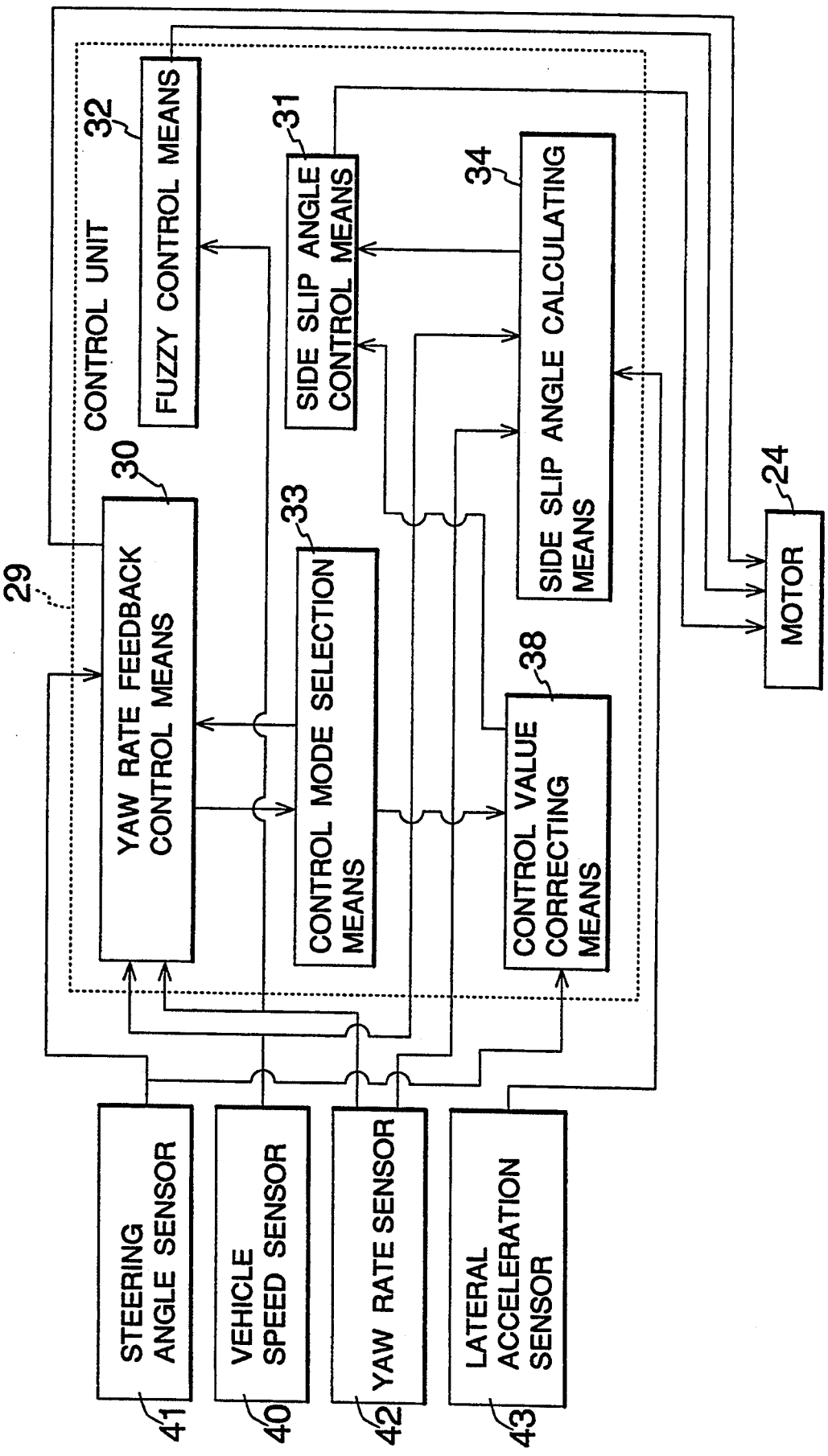

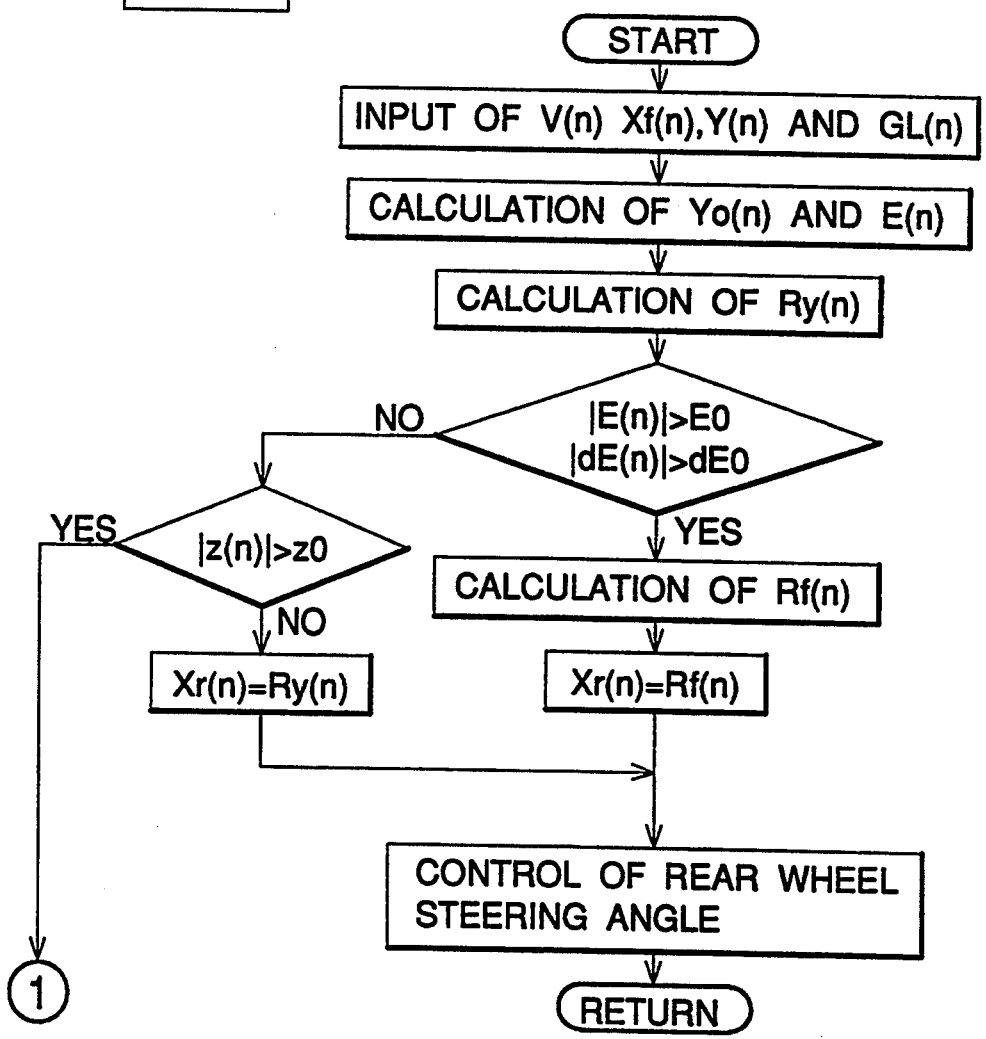

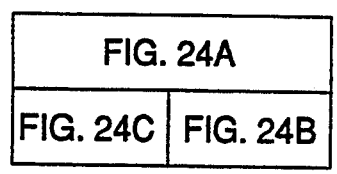
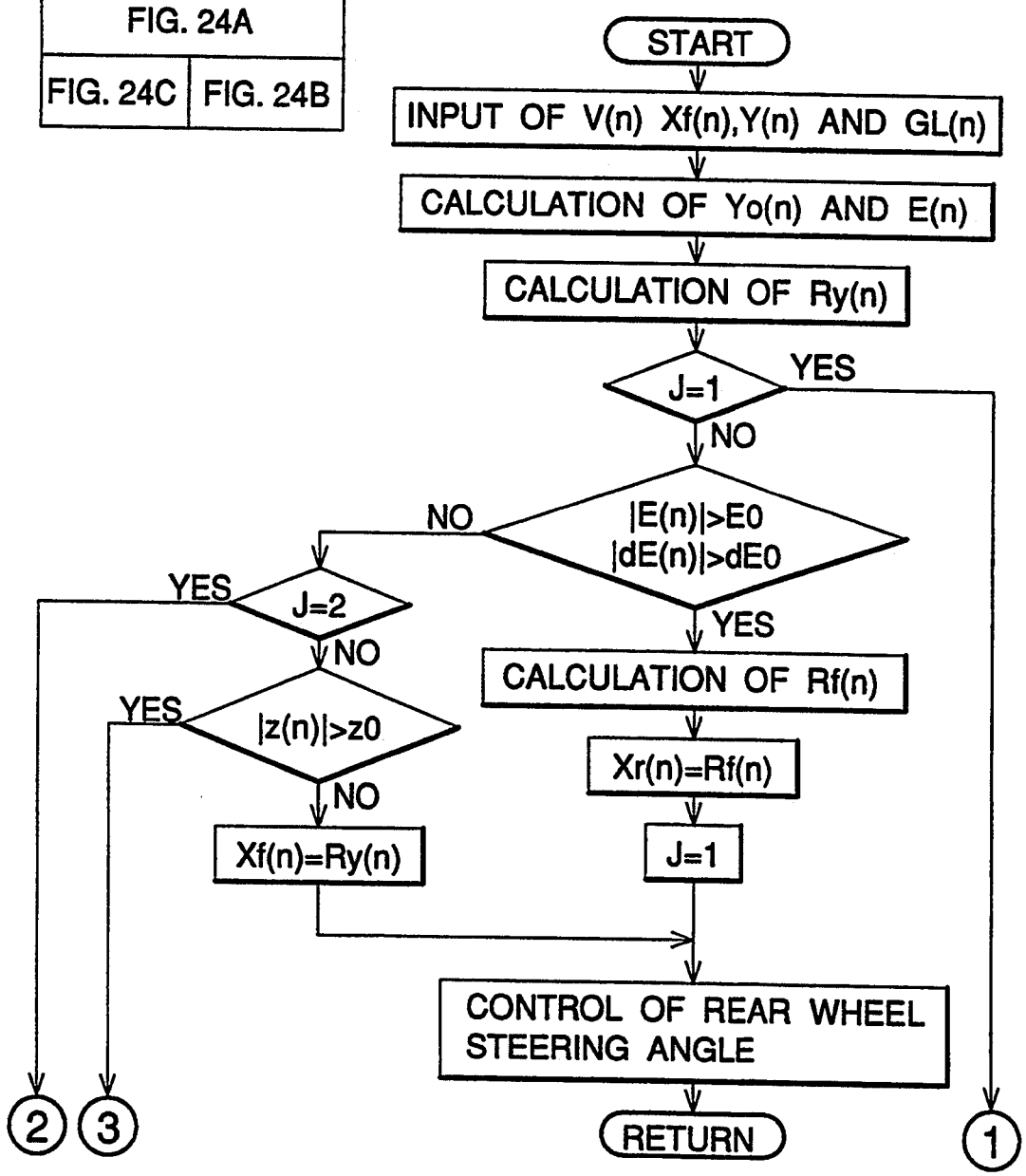
FIG. 24A

REAR WHEEL STEERING SYSTEM FOR VEHICLE

BACKGROUND OF THE INVENTION

The present invention relates to a rear wheel steering system for vehicle.

DESCRIPTION OF PRIOR ART

There is known a vehicle rear wheel steering system which steers the rear wheels by a ratio to the steering angle of front wheels determined in accordance with the vehicle speed.

In this kind of rear wheel steering system, it is possible to steer the rear wheels in the manner intended by a driver irrespective of the vehicle speed. However, the front wheels and the rear wheels are often steered in the same phase, namely, in the same direction with respect to the longitudinal direction of the vehicle in the transitional state immediately after the driver turns the steering wheel and, therefore, it is difficult to turn the vehicle quickly in this transitional state.

Japanese Patent Application Disclosure No. Hei 1-262268 proposes a rear wheel steering system which controls the steering angle of the rear wheels by feedback control by calculating a target yaw rate of the vehicle based upon the steering angle of the steering wheel and causing the detected yaw rate of the vehicle become equal to the target yaw rate.

However, since a vehicle is generally designed for improving driving stability a vehicle is generally designed to under-steer in a driving condition where the lateral acceleration is high, with this rear wheel steering system, the turning radius becomes great and the yaw rate is lowered under a sharp turning condition where the lateral acceleration is high and, in the case where the steering angle of the rear wheels is controlled so that the detected yaw rate of the vehicle is made equal to the target yaw rate by a feedback control, the rear wheels tend to be steered in the reverse phase with respect to the front wheels, namely, in the opposite direction to the front wheels with respect to the longitudinal center line of the vehicle, whereby there arises a problem of the driving stability being lowered when any disturbing force acts on the vehicle.

SUMMARY OF THE INVENTION

It is, therefore, an object of the present invention to provide a rear wheel steering system for a vehicle, which comprises turning state detecting means for physically detecting the turning state of the vehicle and feedback control means for controlling the steering angle of the rear wheels based on feedback control so that a yaw rate detected by the turning state detecting means is made equal to a target yaw rate and which can control the steering angle of the rear wheels in a desired manner even when the lateral acceleration is high and the vehicle is turning sharply, and can improve driving stability.

Another object of the present invention is to provide such a rear wheel steering system for a vehicle, which can control the steering angle of the rear wheels in a desired manner and improve driving stability without a large computer.

The above and other objects of the present invention can be accomplished by a rear wheel steering system for a vehicle comprising turning state detecting means for physically detecting the turning state of the vehicle and yaw rate feedback control means for controlling the steering angle of the rear wheels so that a yaw rate detected by the turning state detecting means becomes equal to a target yaw rate, said rear wheel steering system further comprising a second rear wheel steering angle control means adapted for controlling the steering angle of the rear wheels based on a control mode different from that of the yaw rate feedback control means and a control mode selection means adapted for causing the second rear wheel steering angle control means to control the steering angle of the rear wheels when the vehicle is turning with a turning radius smaller than a first predetermined turning radius and causing the yaw rate feedback control means to control the steering angle of the rear wheels when the vehicle is turning with a turning radius equal to or greater than the first predetermined turning radius.

In a preferred aspect of the present invention, said rear wheel steering system further includes side slip angle calculating means for estimating the value of the side slip angle of the vehicle and the second rear wheel steering angle control means is constituted as a side slip angle control means adapted for controlling the steering angle of the rear wheels so that the absolute value of the estimated value of the side slip angle calculated by the side slip angle calculating means decreases.

In another preferred aspect of the present invention, the second rear wheel steering angle control means is constituted as a fuzzy control means adapted for controlling the steering angle of the rear wheels based on fuzzy control so as to decrease the absolute value of the rate of change in the detected yaw rate.

In a further preferred aspect of the present invention, said rear wheel steering system further includes a third rear wheel steering angle control means adapted for controlling the steering angle of the rear wheels based upon a control mode different from those of the yaw rate feedback control means and the second rear wheel steering angle control means and the control mode selection means adapted for causing the second rear wheels steering angle control means to control the steering angle of the rear wheels when the vehicle is turning with a turning radius smaller than a first predetermined turning radius and greater than a second predetermined turning radius, causing the third rear wheel steering angle control means to control the steering angle of the rear wheels when the vehicle is turning with a turning radius equal to or smaller than the second predetermined turning radius and causing the yaw rate feedback control means to control the steering angle of the rear wheels when the vehicle is turning with a turning radius equal to or greater than the first predetermined turning radius.

In a further preferred aspect of the present invention, said rear wheel steering system further includes side slip angle calculating means for estimating the value of the side slip angle of the vehicle and the second rear wheel steering angle control means is constituted as a side slip angle control means adapted for controlling the steering angle of the rear wheels so that the absolute value of the estimated value of the side slip angle calculated by the side slip angle calculating means and the third rear wheel steering angle control means is constituted as a fuzzy control means adapted for controlling the steering angle of the rear wheels based on fuzzy control so as to decrease the absolute value of the rate of change in the detected yaw rate.

In a further preferred aspect of the present invention, during control of the steering angle of the rear wheels by the second rear wheel steering angle control means or the third rear wheel steering angle control means, once the absolute value of the detected yaw rate has begun to increase, when it has gone over the peak value thereof, the control mode selection means causes the yaw rate feedback control means to control the steering angle of the rear wheels.

In a further preferred aspect of the present invention, said rear wheel steering system further includes steering angle detecting means for detecting the steering angle of the steering wheel and the control mode selection means is adapted for causing the yaw rate feedback control means to control the steering angle of the rear wheels, during control of the steering angle of the rear wheels by the second rear wheel steering angle control means or the third rear wheel steering angle control means, once the absolute value of the detected yaw rate has begun to increase, when it has gone over the peak value thereof and the sign of the rate of change in the steering angle of the steering wheel detected by the steering angle detecting means has been changed, the control mode selection means causes the yaw rate feedback control means to control the steering angle of the rear wheels.

In a further preferred aspect of the present invention, during control of the steering angle of the rear wheels by the second rear wheel steering angle control means or the third rear wheel steering angle control means, when the absolute value of the deviation between the detected yaw rate and the target yaw rate begins to decrease, the control mode selection means causes the yaw rate feedback control means to control the steering angle of the rear wheels.

In a further preferred aspect of the present invention, in a case where the control of the steering angle of the rear wheels is switched from one to another of the yaw rate feedback control means, the second rear wheel steering angle control means and the third rear wheel steering angle control means, when the amount of change in the steering angle of the rear wheels is greater than a predetermined limit value, the control mode selection means selects the one of the yaw rate feedback control means, the second rear wheel steering angle control means and the third rear wheel steering angle control means which will enable the amount of change in the steering angle of the rear wheels to become equal to the predetermined limit value.

In a further preferred aspect of the present invention, said rear wheel steering system further includes steering speed restricting means adapted for restricting the steering speed of the rear wheels so as to steer the rear wheels at a steering speed lower than a steering speed calculated by the yaw rate feedback control means, while the absolute value of the detected yaw rate is increasing, when the absolute value of a deviation between the detected yaw rate and the target yaw rate exceeds a predetermined value.

In a further preferred aspect of the present invention, said rear wheel steering system further includes steering angle restricting means adapted for restricting the steering angle of the rear wheels so that the absolute value of the amount of steering of the rear wheels becomes maximum to decrease the detected yaw rate, while the absolute value of the detected yaw rate is increasing, when the absolute value of the deviation between the detected yaw rate and the target yaw rate exceeds a predetermined value and the absolute value of the rate of change in the deviation exceeds a predetermined value.

In a further preferred aspect of the present invention, said rear wheel steering system further includes function correcting means adapted for correcting a membership function of the fuzzy control means in accordance with the road surface conditions.

In a further preferred aspect of the present invention, said control mode selection means is constituted so that even when the steering angle of the rear wheels is to be controlled by the side slip angle control means, it prevents the side slip angle control means from controlling the steering angle of the rear wheels until the absolute value of the steering angle calculated by the side slip angle control means becomes equal to or greater than the absolute value of the steering angle of the rear wheels calculated by the yaw rate feedback control means.

In a further preferred aspect of the present invention, said control mode selection means is constituted so that when the control of the steering angle of the rear wheels is switched from the yaw rate feedback control means to the side slip angle control means, it causes the side slip angle control means to start controlling the steering angle of the rear wheels by using the steering angle of the rear wheels calculated by the yaw rate feedback control means as an initial value.

In a further preferred aspect of the present invention, said rear wheel steering system further includes steering angle correcting means adapted for correcting the absolute value of the steering angle of the rear wheels calculated by the side slip angle control means so as to become greater when the absolute value of the rate of change in the side slip angle calculated by the side slip angle calculating means is equal to or greater than a predetermined value and the sign of the rate of change in the side slip angle is the same as that of the calculated side slip angle.

In a further preferred aspect of the present invention, said rear wheel steering system further includes a steering angle sensor for detecting the steering angle of the steering wheel and the control mode selection means is adapted for causing the yaw rate feedback control means to control the steering angle of the rear wheels, when, during control of the steering angle of the rear wheels by the second rear wheel steering angle control means or the third rear wheel steering angle control means, the steering wheel which was once turned in one direction has been turned in the other direction and the absolute value of the difference between the steering angle of the rear wheels calculated by the second rear wheel steering angle control means or the third rear wheel steering angle control means and that calculated by the yaw rate feedback control means has become equal to or smaller than a predetermined value.

The above and other objects and features of the present invention will become apparent from the following description made with reference to the accompanying drawings.

BRIEF DESCRIPTION OF THE DRAWINGS

FIGS. 7, 7A-7C is a flow chart showing a further embodiment of the rear wheel steering angle control effected by a control unit of a vehicle rear wheel steering system.

FIGS. 11, 11A-11B is a flow chart showing a further embodiment of the rear wheel steering angle control effected by the control unit shown in FIG. 10.

FIGS. 13, 13A-13B is a flow chart showing a further embodiment of the rear wheel steering angle control effected by a control unit of a vehicle rear wheel steering system.

FIG. 18 is a block diagram showing a control unit of a rear wheel steering system which is a further embodiment of the present invention and a detection system provided in a vehicle.

FIGS. 21, 21A-21B is a flow chart showing a further embodiment of the rear wheel steering angle control effected by the control unit shown in FIG. 20.

FIG. 22 is a block diagram showing a control unit of a rear wheels steering system which is a further embodiment of the present invention and a detection system provided in a vehicle.

FIGS. 23, 23A-23B is a flow chart showing a further embodiment of the rear wheel steering angle control effected by the control unit shown in FIG. 22.

FIGS. 24, 24A-24C is a flow chart showing a further embodiment of the rear wheel steering angle control effected by a control unit of a vehicle rear wheel steering system.

DESCRIPTION OF THE PREFERRED EMBODIMENT

Figure 1:
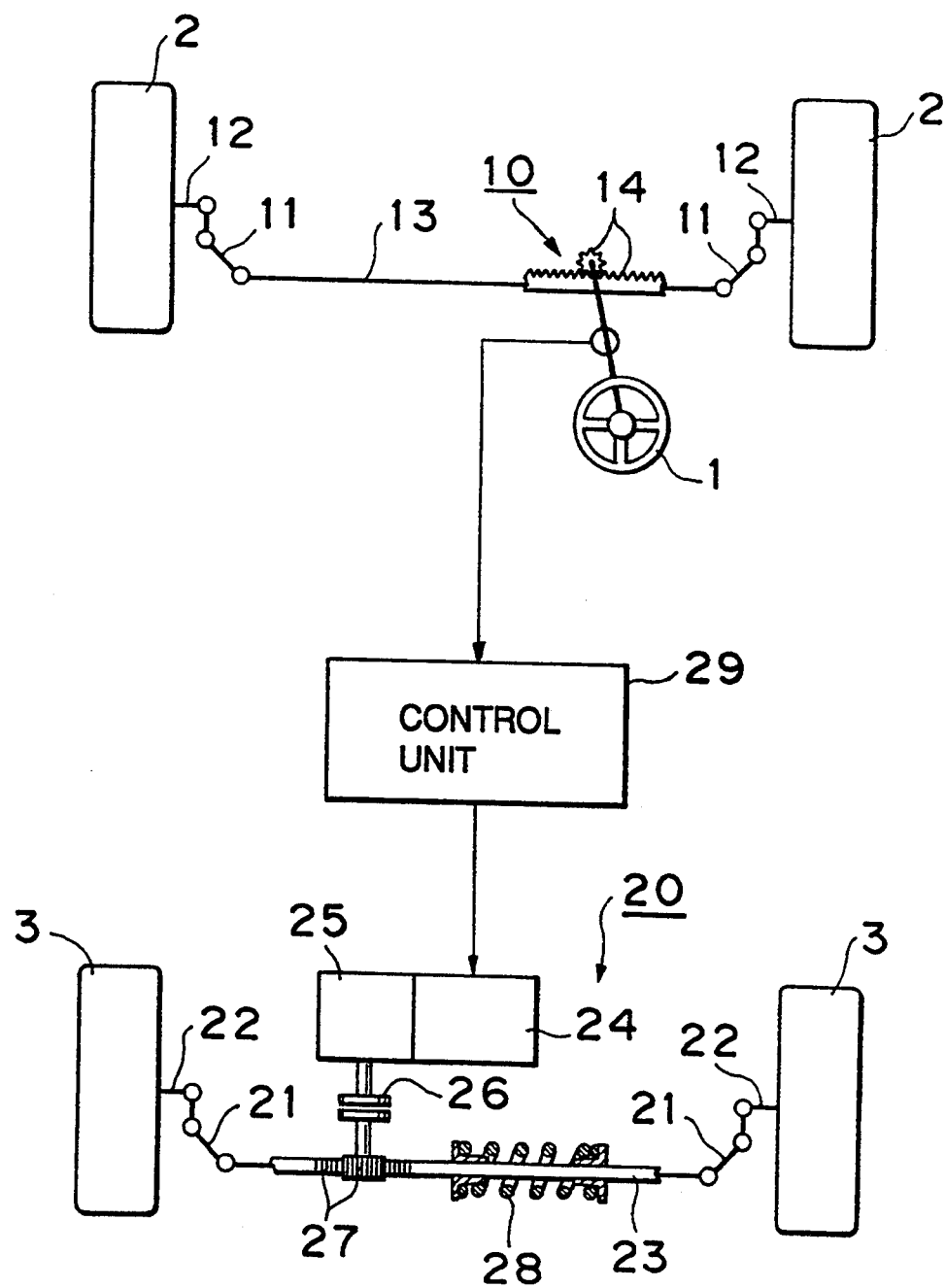
FIG. 1 is a schematic drawing showing a plan view of a vehicle including a rear wheel steering system for a vehicle which is an embodiment of the present invention.

FIG. 1 is a schematic drawing showing a plan view of a vehicle including a rear wheel steering system which is an embodiment of the present invention.

Referring to FIG. 1, the vehicle including the rear wheel steering system which is an embodiment of the present invention comprises a steering wheel 1, front wheel steering system 10 for steering right and left front wheels 2, 2 in accordance with the operation of the steering wheel 1 and a rear wheel steering system 20 for steering right and left rear wheels 3, 3 in response to the steering of the front wheels 2, 2.

The front steering system 10 is arranged in the widthwise direction of the vehicle and comprises a relay rod 13, the opposite end portions of which are connected with the right and left front wheels 2, 2 via tie rods 11, 11 and knuckle arms 12, 12 and a steering gear mechanism 14 in the form of a rack and pinion for moving the relay rod 13 in the right or left direction in synchronism with the operation of the steering wheel 1. The thus constituted front wheel steering system 10 steers the right and left front wheels 2, 2 in the direction corresponding to that in which the steering wheel 1 is turned and by an angle corresponding to the amount of the turning of the steering wheel 1.

On the other hand, the rear wheels steering system 20 is arranged in the widthwise direction of the vehicle and comprises a relay rod 23, the opposite end portions of which are connected with the right and left rear wheels 3, 3 via tie rods 21, 21 and knuckle arms 22, 22, a motor 24, a steering gear mechanism 27 in the form of a rack and pinion driven by the motor 24 via a speed reducing mechanism 25 and a clutch 26 for moving the relay rod 23 in the right or left direction, a centering spring 28 for biasing the relay rod 23 for locating it at its neutral position and a control unit 29 for controlling the operation of the motor 24 in accordance with driving conditions of the vehicle. The thus constituted rear wheel steering system 20 steers the right and left front wheels 3, 3 in the direction corresponding to that of the operation of the steering wheel 1 and by an angle corresponding to the amount by which the steering wheel 1 is turned.

Figure 2:
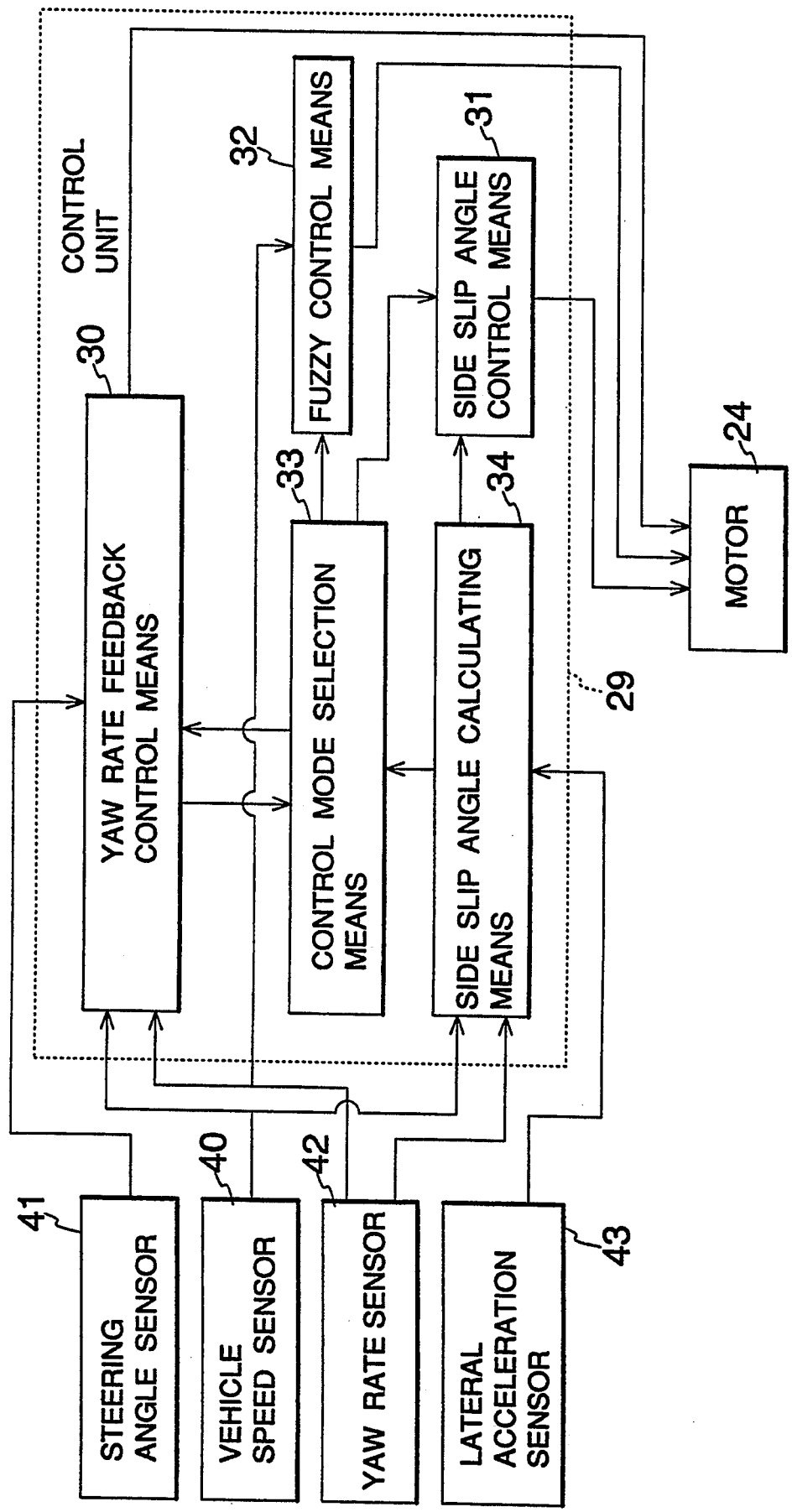
FIG. 2 is a block diagram showing a control unit of a rear wheel steering system which is an embodiment of the present invention and a detection system provided in a vehicle.

FIG. 2 is a block diagram showing a control unit 29 of a rear wheel steering system which is an embodiment of the present invention and an associated detection system provided in the vehicle.

Referring to FIG. 2, the control unit 29 comprises a yaw rate feedback control means 30, a side slip angle control means 31, a fuzzy control means 32, a control mode selection means 33 and a side slip angle calculating means 34 and receives detection signals from a vehicle speed sensor 40 for detecting the vehicle speed V, a steering angle sensor 41 for detecting the steering angle of the steering wheel 1, namely, the steering angle Xf of the front wheels 2, 2, a yaw rate sensor 42 for detecting the yaw rate Y of the vehicle and a lateral acceleration sensor 43 for detecting the lateral acceleration GL acting on the vehicle.

The yaw rate feedback control means 30 is constituted so as to calculate a target yaw rate Yo based upon the vehicle speed V input from the vehicle speed sensor 40 and the steering angle Xf of the front wheels 2, 2 input from the steering angle sensor 41, thereby to further calculate the deviation E between the target yaw rate Yo and the detected yaw rate Y input from the yaw rate sensor 42, to calculate a yaw rate feedback value Ry using a I-PD control calculation formula stored therein in advance, and to output the thus calculated yaw rate feedback value Ry to the control mode selection means 33. Further, the yaw rate feedback control means 30 is constituted so that when a control effecting signal is input thereto from the control mode selection means 33, it outputs a yaw rate feedback control signal to the motor 24, thereby controlling the steering angle Xr of the rear wheels 3, 3 so as to make it equal to the yaw rate feedback amount Ry.

The control mode selection means 33 is constituted so as to calculate the rate of change dE in the deviation E between the target yaw rate Yo and the detected yaw rate Y based on the deviation E input from the yaw rate feedback control means 30 so that when the absolute value of the deviation E is greater than a predetermined value E0 and the absolute value of the rate of change dE in the deviation E is greater than a predetermined value dE0, namely, in an extremely sharp turning state, it outputs a control effecting signal to the fuzzy control means 32, that when the absolute value of the deviation E is equal to or smaller than the predetermined value E0 and the absolute value of the rate of change dE in the deviation E is equal to or smaller than the predetermined value dE0 but the estimated absolute value of a side slip angle z calculated by the side slip angle calculating means 34 is greater than a predetermined value z0, namely, in the sharp turning state, it outputs a control effecting signal to the side slip angle control means 31, and that in other states, namely, in normal turning state, it outputs a control effecting signal to the yaw rate feedback control means 30.

The side slip angle control means 31 is constituted so that when the control effecting signal is input from the control mode selection means 33, it calculates a side slip angle control value Rz in accordance with a calculation formula stored therein in advance and outputs a side slip angle control signal produced based upon the side slip angle control value Rz to the motor 24, thereby to control the steering angle Xr of the rear wheels 3, 3 so that the steering angle Xr(n) of the rear wheels 3, 3 is made equal to the side slip angle control value Rz and that the estimated absolute value of the side slip angle z calculated by the side slip angle calculating means 34 is reduced.

The fuzzy control means 32 is constituted so that when the control effecting signal is input from the control mode selection means 33, it calculates the rate of change dY in the detected yaw rate Y based upon the detected yaw rate input from the yaw rate sensor 42 and also calculates a fuzzy control value Rf in accordance with a calculation formula stored therein in advance so as to output a fuzzy control signal produced based upon the fuzzy control value Rf to the motor 24, thereby controlling the steering angle Xr of the rear wheels 3, 3 so that the steering angle Xr(n) of the rear wheels 3, 3 is made equal to the fuzzy control value Rf and that the rate of change dY in the detected yaw rate Y is reduced.

The side slip angle calculating means 34 is constituted so as to estimate the value of the side slip angle z in accordance with the following formula (1) based upon the vehicle speed V detected by the vehicle speed sensor 40, the detected yaw rate Y detected by the yaw rate sensor 42 and the lateral acceleration GL detected by the lateral acceleration sensor 43 and output the estimated value to the control mode selection means 33.

$$z(n) = 9.8 \times \{GL(n)/V(n)\}\{Y(n)/57\} + z(n-1) \qquad (1)$$

In this formula, the symbol (n) indicates values in the current control cycle and the symbol (n−1) indicates values in the preceding control cycle.

Figure 3:
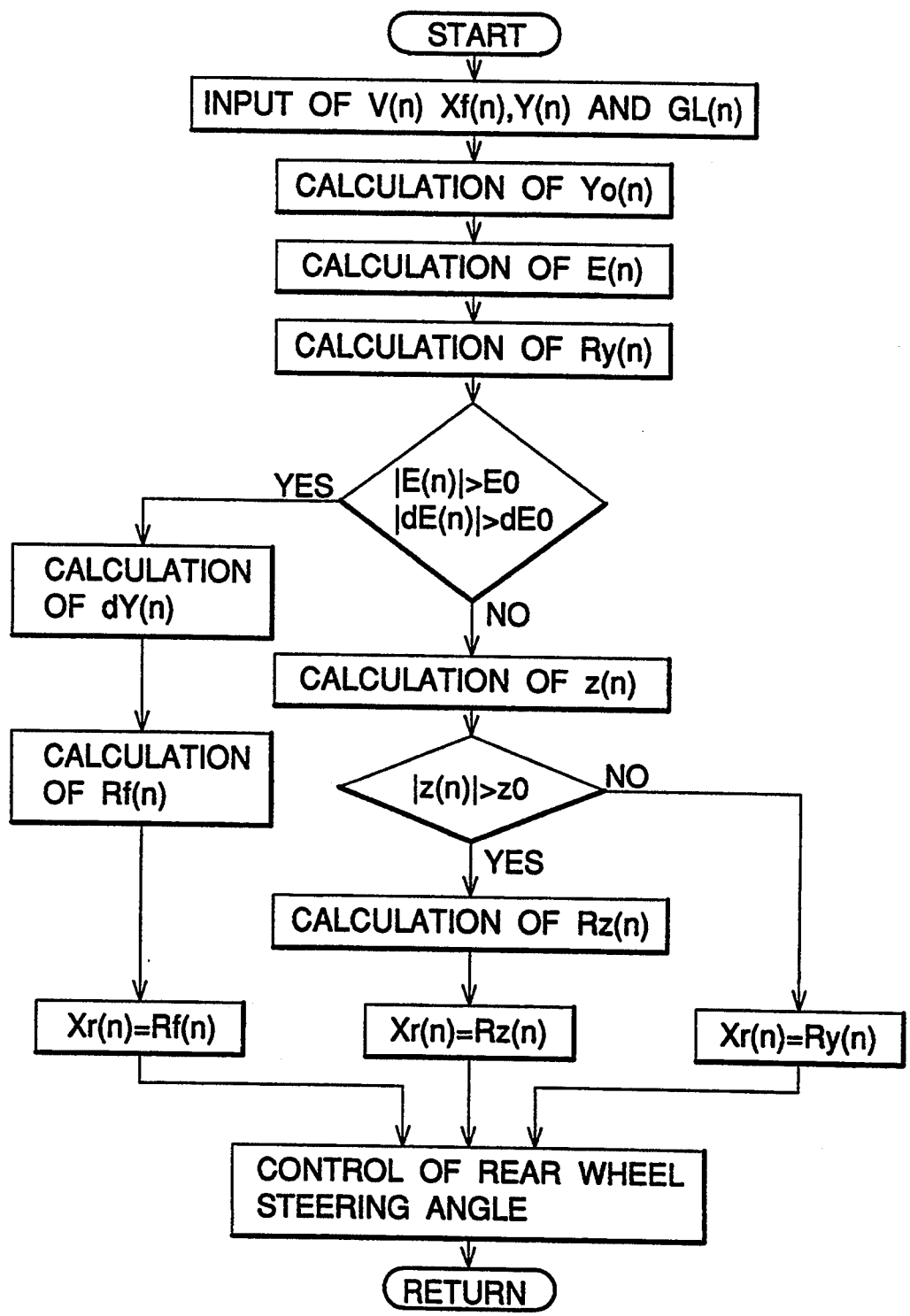
FIG. 3 is a flow chart showing an embodiment of the rear wheel steering angle control effected by a control unit of a vehicle rear wheel steering system.
Figure 4:
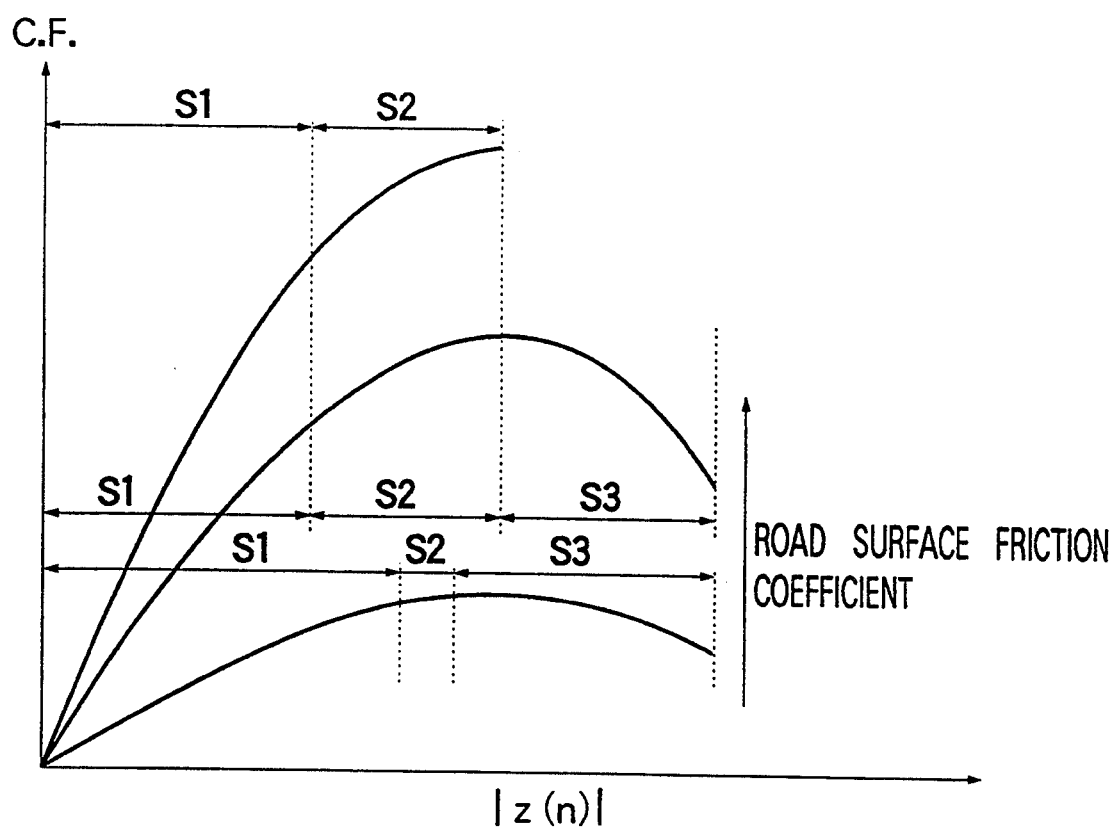
FIG. 4 is a graph showing the relationship between a tire cornering force C.F. and an absolute value of a estimated value of a side slip angle.

FIG. 3 is a flow chart showing an embodiment of the steering angle control of rear wheels 3, 3 effected by the thus constituted control unit 29 and FIG. 4 is a graph showing the relationship between the tire cornering force C.F. and the estimated absolute side slip angle.

Referring to FIG. 3, the control unit 29 receives the vehicle speed V(n) detected by the vehicle speed sensor 40, the steering angle Xf(n) of the front wheels 2, 2 detected by the steering angle sensor 41, the detected yaw rate Y(n) detected by the yaw rate sensor 42 and the lateral acceleration GL(n) detected by the lateral acceleration sensor 43.

The yaw rate feedback control means 30 calculates a target yaw rate Yo(n) for the current control cycle based upon the vehicle speed V(n) input from the vehicle speed sensor 40 and the steering angle Xf(n) of the front wheels 2, 2 input from the steering angle sensor 41 in accordance with the following formula (2).

$$Yo(n) = V(n)/\{1 + A \times V(n)^2\} \times Xf(n)/L \qquad (2)$$

In this formula, A is a stability factor and L is the wheel base.

The yaw rate feedback control means 30 calculates the deviation E(n) between the thus calculated target yaw rate Yo(n) and the detected yaw rate Y(n) input from the yaw rate sensor 42 in accordance with the following formula (3).

$$E(n) = Yo(n) - Y(n) \qquad (3)$$

Further, the yaw rate feedback control means 30 calculates a yaw rate feedback control value Ry(n) for the current control cycle in accordance with the following formula (4).

$$Ry(n) = Ry(n-1) - [KI \times E(n) - FP \times \{Y(n) - Y(n-1)\} - FD \times \{Y(n) - 2 \times Y(n-1) + Y(n-2)\}] \qquad (4)$$

In this formula, KI is a integration constant, FP is a proportion constant, FD is a differentiation constant and Ry(n−1) is the yaw rate feedback control amount in the preceding control cycle, Y(n−1) is the detected yaw rate in the preceding control cycle and Y(n−2) is the detected yaw rate in the control cycle before last.

The thus calculated yaw rate feedback control amount Ry(n) and deviation E(n) are output to the control mode selection means 33. The control mode selection means 33 calculates the rate of change dE(n) in the deviation E(n) and judges whether or not the absolute value of the deviation E(n) is greater than a predetermined value E0 and the absolute value of the rate of change dE(n) in the deviation E(n) is greater than a predetermined value dE0.

When the result of this judgment is YES, namely, when the absolute value of the deviation E(n) is greater than a predetermined value E0 and the absolute value of the rate dE(n) of change in the deviation E(n) is greater than a predetermined value dE0, it can be considered that the vehicle is being driven in a state corresponding to the area S3 in FIG. 4. In this area, the vehicle is being turned extremely sharply and there is a considerable risk of excessive oversteering, meaning that the driving conditions of the vehicle is unstable. Therefore, it is extremely difficult to control the steering angle Xr(n) of the rear wheels 3, 3 is controlled by the yaw rate feedback control means 30 so as to follow the change in the yaw rate of the vehicle without a large computer which can make calculations extremely quickly. On the other hand, it is also extremely impractical to equip the vehicle with such a large computer from the viewpoint of cost and space. So, according to this embodiment, in this turning state, the control mode selection means 33 outputs a control effecting signal to the fuzzy control means 32 for controlling the steering angle Xr(n) of the rear wheels 3, 3 based on the fuzzy control calculation.

When the fuzzy control means 32 receives the control effecting signal from the control mode selection means 33, it calculates the rate of change dY(n) in the detected yaw rate Y(n) based upon the detected yaw rate input from the yaw rate sensor 42 and further calculates a fuzzy control value Rf(n) based on a membership function which is experimentally determined so as to reduce the absolute value of the rate of change in the detected yaw rate Y(n) and which depends on the deviation E(n) and the rate of change dE(n) in accordance with the following formula (5).

$$Rf(n) = f(E(n), dE(n)) \qquad (5)$$

Then, the fuzzy control means 32 outputs a fuzzy control signal to the motor 24, thereby controlling the steering angle Xr(n) of the rear wheels 3, 3 so that the steering angle Xr(n) of the rear wheels 3, 3 is made equal to the fuzzy control value Rf(n) and the absolute value of the rate of change in the detected yaw rate Y(n) is reduced.

On the contrary, when the absolute value of the deviation E(n) is not greater than a predetermined value E0 or when the absolute value of the rate of change dE(n) in the deviation E(n) is not greater than a predetermined value dE0, the control mode selection means 33 judges whether or not the absolute value of the estimated value z(n) of the side slip angle input from the side slip angle calculating means 34 is greater than a predetermined value z0.

When the result of this judgment is YES, namely, when the absolute value of the estimated value z(n) of the side slip angle is greater than a predetermined value z0, it can be considered that the vehicle is being driven in a state corresponding to the area S2 in FIG. 4. In this area, the vehicle is being sharply turned with large lateral acceleration GL(n) and considerable tire slipping in the lateral direction, whereby the turning radius becomes larger and the yaw rate Y(n) is lowered. Therefore, if the steering angle Xr(n) of the rear wheels 3, 3 is controlled by the yaw rate feedback control means 30, the rear wheels 3, 3 will be steered in the reverse phase with respect to that of the steering angle Xf(n) of the front wheels 2, 2, namely, in the opposite direction to that of the front wheels 2, 2 with respect to the longitudinal center line of the vehicle, whereby there is some risk of the driving stability being lowered. On the other hand, since the driving condition is not so unstable as to make it necessary to control the steering angle Xr(n) of the rear wheels 3, 3 based on the fuzzy control, the control mode selection means 33 outputs a control effecting signal to the side slip angle control means 31, thereby to cause the side slip angle control means 31 to control the steering angle Xr(n) of the rear wheels 3, 3.

When the side slip angle control means 31 receives the control effecting signal from the control mode selection means 33, it calculates the side slip angle control value Rz(n) in accordance with the following formula (6) and outputs a side slip angle control signal to the motor 24 so as to make the steering angle Xr(n) of the rear wheels 3, 3 become equal to the side slip angle control value Rz(n), thereby to reduce the absolute value of the estimated value z(n) of the side slip angle.

$$Rz(n) = k1 \times z(n) \qquad (6)$$

In this formula, k1 is a control constant and positive. Therefore, the side slip angle control value Rz(n) increases with the estimated value z(n) of the side slip angle and, as a result, since the greater the estimated value z(n) of the side slip angle is, the more the rear wheels 3, 3 are steered in the same phase as that of the front wheels 2, 2, it is possible, in the state where the turning radius is great and the yaw rate Y(n) is low, to prevent the rear wheels 3, 3 from being steered in the reverse phase with respect to that of the front wheels 2, 2 and to reliably prevent the driving stability from being lowered.

On the contrary, when the estimated absolute value z(n) of the side slip angle is not greater than the predetermined value z0, since it can be considered that the vehicle is being driven in a state corresponding to the area S1 shown in FIG. 4 where the cornering force C.F. is substantially proportional to the estimated absolute value z(n) of the side slip angle and that the driving condition is stable, the control mode selection means 33 outputs a control effecting signal to the yaw rate feedback control means 30.

When the yaw rate feedback control means 30 receives the control effecting signal from the control mode selection means 33, it outputs a yaw rate feedback control signal to the motor 24, thereby controlling the steering angle Xr(n) of the rear wheels 3, 3 for making it become equal to the yaw rate feedback control value Ry(n).

The above described control is repeated at predetermined time intervals and the rear wheels 3, 3 are steered accordingly.

According to this embodiment, since the rear wheels 3, 3 are steered by the yaw rate feedback control means 30 in the stable driving state corresponding to the area S1 so as to make the detected yaw rate Y(n) become equal to the target yaw rate Yo(n) determined based upon the steering angle of the steering wheel 1, it is possible to steer the rear wheels 3, 3 in a desired manner. On the other hand, since the rear wheels 3, 3 are steered by the side slip angle control means 31 in the state where the estimated absolute value z(n) of the side slip angle is greater than the predetermined value z0 and the vehicle is being sharply turned and subjected to a large lateral acceleration GL(n), in such a manner that the greater the estimated absolute value z(n) of the side slip angle is, the more the rear wheels 3, 3 are steered in the same phase as that of the front wheels 2, 2, namely, in the same direction as that of the front wheels 2, 2 with respect to the longitudinal center line of the vehicle, it is possible to prevent the rear wheels 3, 3 from being steered in the reverse phase with respect to that of the front wheels 2, 2 by the yaw rate feedback control means 30 and to prevent the driving stability from being lowered. Furthermore, in the state corresponding to the area S3 where the absolute value of the deviation E ( n ) between the target yaw rate Yo ( n ) and the detected yaw rate Y(n) is greater than the predetermined value E0 and the rate of change dE(n) in the deviation E(n) is greater than the predetermined value dE0, in other words, when the vehicle is turning extremely sharply and there is considerable risk of excessive oversteering, since the rear wheels 3, 3 are steered by the fuzzy control means 32 so as to reduce the rate of change dY(n) in the detected yaw rate Y(n), it is possible to improve the driving stability even in this unstable state without a large computer.

Figure 5:
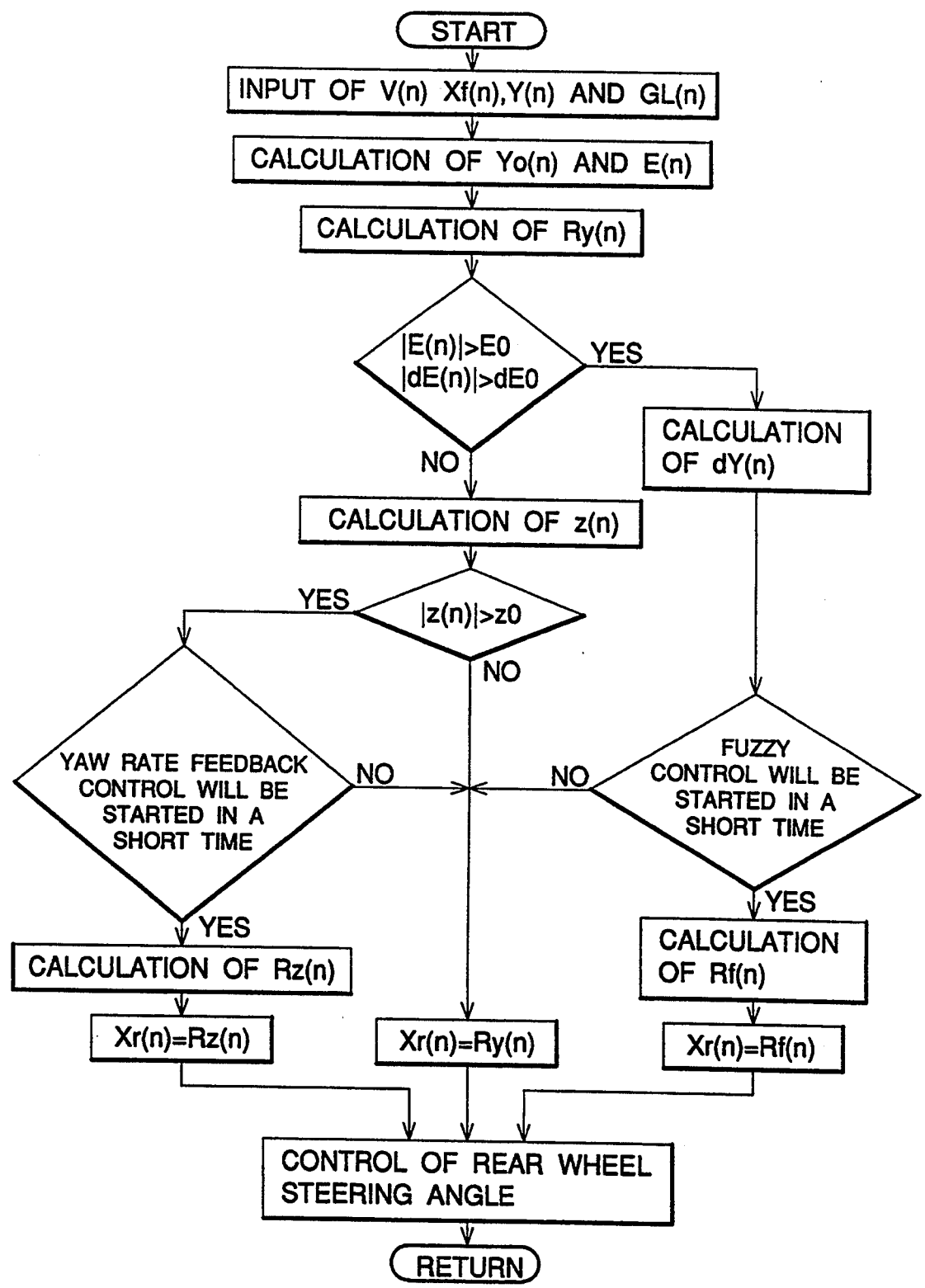
FIG. 5 is a flow chart showing another embodiment of the rear wheel steering angle control effected by a control unit of a vehicle rear wheel steering system.

FIG. 5 is a flow chart showing another embodiment of the steering angle control of the rear wheels effected by the control unit shown in FIG. 2.

In the embodiment shown in FIG. 5, even when the steering angle Xr(n) of the rear wheels 3, 3 should be controlled by the side slip angle control means 31 or the fuzzy control means 32, if it is considered that the yaw rate feedback control would be started in a short time, the control mode selection means 33 immediately causes the yaw rate feedback control means 30 to start controlling the steering angle Xr(n) of the rear wheels 3, 3 for ensuring that the control means for controlling the steering angle Xr(n) of the rear wheels 3, 3 can be smoothly switched from the side slip angle control means 31 or the fuzzy control means 32 to the yaw rate feedback control means 30. Therefore, in this embodiment, when the control mode selection means 33 judges that the steering angle Xr(n) of the rear wheels 3, 3 should be controlled by the side slip angle control means 31 or the fuzzy control means 32, it further judges whether or not the absolute value of the detected yaw rate Y(n) in the current control cycle is smaller than the absolute value of the detected yaw rate Y(n−1) in the preceding control cycle and whether or not the sign of the rate of change in the steering angle of the steering wheel 1 has changed and causes the side slip angle control means 31 or the fuzzy control means 32 to control the steering angle Xr(n) of the rear wheels 3, 3 when the result is NO, whereas it causes the yaw rate feedback control means 30 to control the steering angle Xr(n) of the rear wheels 3, 3 when the result is YES.

Figure 6:
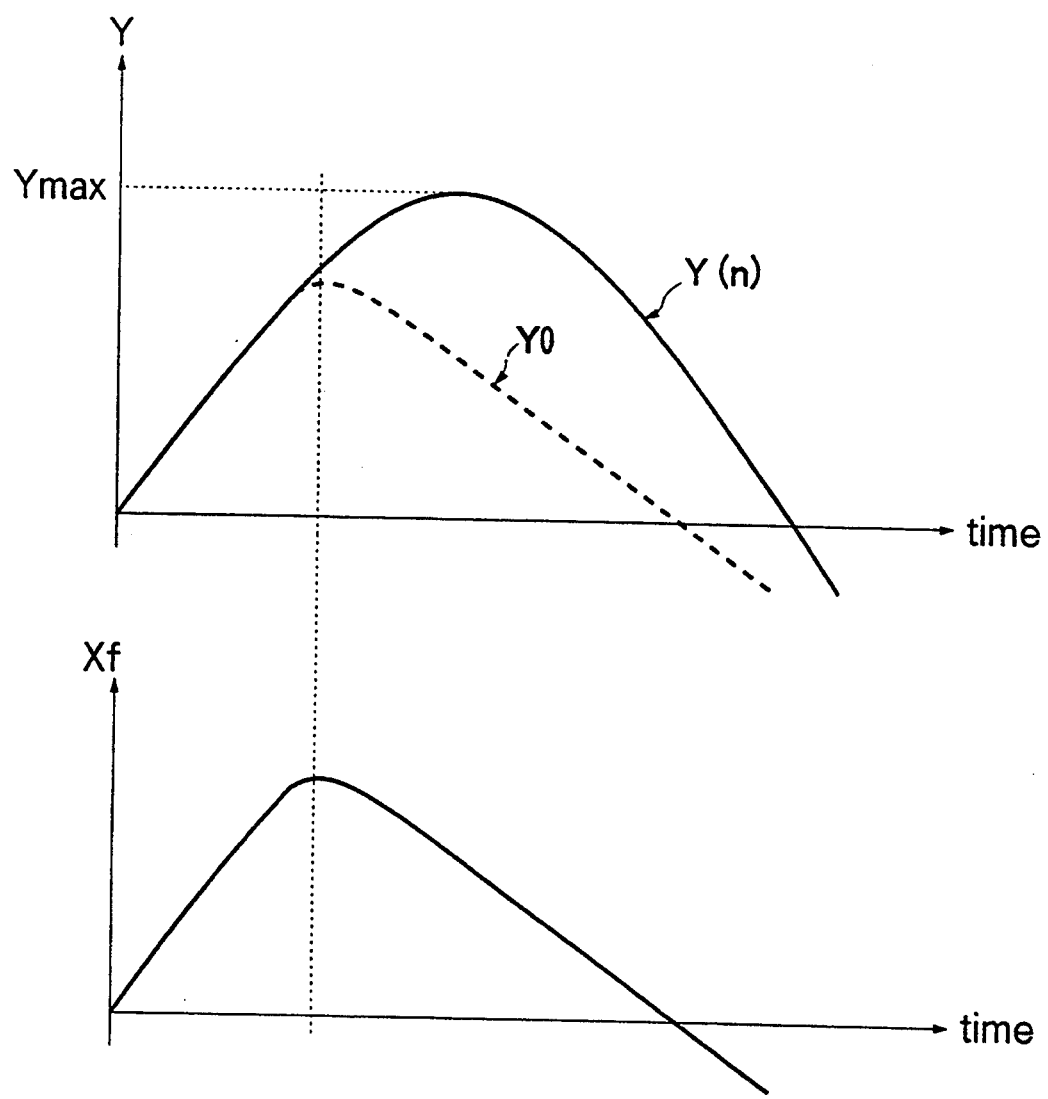
FIG. 6 is a graph showing the relationship between a detected yaw rate and a target yaw rate, and a steering angle of front wheels and time.

More specifically, in the flow chart shown in FIG. 5, when the control mode selection means 33 judges that the absolute value of the deviation E(n) is greater than the predetermined value E0 and the rate of change dE(n) in the deviation E(n) is greater than the predetermined value dE0, it can be considered that the vehicle is being driven under the state corresponding to the area S4 in FIG. 4, namely, that the vehicle is turning extremely sharply and that there is a considerable risk of excessive oversteering. Normally, the steering angle Xr(n) of the rear wheels 3, 3 should be controlled by the fuzzy control means 32 in this state. However, even if the steering angle Xr(n) of the rear wheels 3, 3 should be controlled by the fuzzy control means 32, when the steering wheel 1 has been turned back so that the yaw rate feedback control would be started in a short time, if the fuzzy control should be effected, the rear wheels 3, 3 once steered in the same phase as that of the front wheels 2, 2 would suddenly be steered in the reverse phase with respect to the that of the front wheels 2, 2 when the control means for controlling the steering angle Xr(n) of the rear wheels 3, 3 is changed from the fuzzy control means 32 to the yaw rate feedback means 30 and there would be a considerable risk of the driving stability being lowered. Therefore, the control mode selection means 33 further judges whether or not the yaw rate feedback control will be started in a short time without outputting a control effecting signal to the fuzzy control means 32. For this purpose, the control mode selection means 33 judges whether or not the absolute value of the detected yaw rate Y(n) in t he current control cycle is smaller than the absolute value of the detected yaw rate Y(n−1) in the preceding control cycle and whether or not the sign of the rate of change in the steering angle of the steering wheel 1 has changed, namely, whether the absolute value of the steering angle Xf(n) of the front wheels 2, 2 in the current control cycle is smaller than the absolute value of the steering angle Xf(n−1) of the front wheels 2, 2 in the preceding control cycle. In other words, when the detected yaw rate Y(n) has gone over its peak value Ymax as shown in FIG. 6 and the absolute value of the steering angle Xf(n) of the front wheels 2, 2 in the current control cycle is smaller than the absolute value of the steering angle Xf(n−1) of the front wheels 2, 2 in the preceding control cycle, it can be considered that the deviation E(n) between the detected yaw rate Y(n) and the target yaw rate Yo(n) is lowering as a result of the steering wheel 1 having been turned back and that this shows that the control means for controlling the steering angle Xr(n) of the rear wheels 3, 3 will be changed from the fuzzy control means 32 to the yaw rate feedback means 30 in a short time. Therefore, since for improving the driving stability, it is better to control the steering angle Xr(n) of the rear wheels 3, 3 by the yaw rate feedback control than the fuzzy control since this makes it possible to prevent the steering angle Xr(n) of the rear wheels 3, 3 from being suddenly changed when the control means for controlling the steering angle Xr(n) of the rear wheels 3, 3 is changed from the fuzzy control means 32 to the yaw rate feedback means 30 and to prevent the driving stability from being lowered, the control mode selection means 33 outputs a control effecting signal to the yaw rate feedback control means 30 so that the steering angle Xr(n) of the rear wheels 3, 3 is controlled by the yaw rate feedback control means 30.

On the contrary, when the absolute value of the detected yaw rate Y(n) in the current control cycle is not smaller than the absolute value of the detected yaw rate Y(n−1) in the preceding control cycle or when the absolute value of the steering angle Xf(n) of the front wheels 2, 2 in the current control cycle is not smaller than the absolute value of the steering angle Xf(n−1) of the front wheels 2, 2 in the preceding control cycle, since it cannot be considered that the control means for controlling the steering angle Xr(n) of the rear wheels 3, 3 will be changed from the fuzzy control means 32 to the yaw rate feedback means 30 in a short time, the control mode selection means 33 outputs a control effecting signal to the fuzzy control means 32.

When the fuzzy control means 32 receives the control effecting signal from the control mode selection means 33, it calculates the rate of change dY(n) in the detected yaw rate Y(n) based upon the detected yaw rate input from the yaw rate sensor 42 and further calculates a fuzzy control value Rf(n) based on a membership function which is experimentally determined so as to reduce the absolute value of the rate of change dY(n) in the detected yaw rate Y(n) and which depends upon the deviation E(n) and the rate of change dE(n) in accordance with the formula (5).

Then, the fuzzy control means 32 outputs a fuzzy control signal to the motor 24, thereby controlling the steering angle Xr(n) of the rear wheels 3, 3 so that the steering angle Xr(n) of the rear wheels 3, 3 is made equal to the fuzzy control value Rf(n) and the rate of change in the detected yaw rate Y(n) is reduced.

On the contrary, when the absolute value of the deviation E(n) is not greater than a predetermined value E0 or when the absolute value of the rate of change dE(n) in the deviation E(n) is not greater than a predetermined value dE0, the control mode selection means 33 judges whether or not the absolute value of the estimated value z(n) of the side slip angle input from the side slip angle calculating means 34 is greater than a predetermined value z0.

When the result of this judgment is YES, similarly to the previous embodiment, it is judged that the steering angle Xr(n) of the rear wheels 3, 3 should be controlled by the side slip angle control means 31.

However, even though the steering angle Xr(n) of the rear wheels 3, 3 should be controlled by the side slip angle control means 31, if the steering wheel 1 has been turned back, the yaw rate feedback control would be started in a short time after the side slip angle control was effected. As a result, the rear wheels 3, 3 once steered in the same phase as that of the front wheels 2, 2 would suddenly be steered in the reverse phase with respect to the that of the front wheels 2, 2 when the control means for controlling the steering angle Xr(n) of the rear wheels 3, 3 is changed from the side slip angle control means 31 to the yaw rate feedback means 30 and there would be a considerable risk of the driving stability being lowered. Therefore, the control mode selection means 33 further judges whether or not the yaw rate feedback control will be effected in a short time without outputting a control effecting signal to the side slip angle control means 31. For this purpose, the control mode selection means 33 judges whether or not the absolute value of the detected yaw rate Y(n) in the current control cycle is smaller than the absolute value of the detected yaw rate Y(n−1) in the preceding control cycle and whether or not the sign of the rate of change in the steering angle of the steering wheel 1 has changed, namely, whether the absolute value of the steering angle Xf(n) of the front wheels 2, 2 in the current control cycle is smaller than the absolute value of the steering angle Xf(n−1) of the front wheels 2, 2 in the preceding control cycle. Referring to FIG. 6, when the detected yaw rate Y(n) has gone over its peak value Ymax and the absolute value of the steering angle Xf(n) of the front wheels 2, 2 in the current control cycle is smaller than the absolute value of the steering angle Xf(n−1) of the front wheels 2, 2 in the preceding control cycle, it can be considered that the deviation E(n) between the detected yaw rate Y(n) and the target yaw rate Yo(n) is lowering as a result of the steering wheel 1 having been turned back and that this shows that the control means for controlling the steering angle Xr(n) of the rear wheels 3, 3 will be changed from the side slip angle control means 31 to the yaw rate feedback means 30 in a short time. Therefore, since for improving the driving stability, it is better to control the steering angle Xr(n) of the rear wheels 3, 3 by the yaw rate feedback control based upon the actual detected value than the side slip angle control based upon the estimated value z(n) of the side slip angle which is not necessarily accurate since this makes it possible to prevent the steering angle Xr(n) of the rear wheels 3, 3 from being suddenly and greatly changed when the control means for controlling the steering angle Xr(n) of the rear wheels 3, 3 is changed from the side slip angle control means 31 to the yaw rate feedback means 30 and to prevent the driving stability from being lowered, the control mode selection means 33 outputs a control effecting signal to the yaw rate feedback control means 30 so that the steering angle Xr(n) of the rear wheels 3, 3 is controlled by the yaw rate feedback control means 30.

On the contrary, when the absolute value of the detected yaw rate Y(n) in the current control cycle is not smaller than the absolute value of the detected yaw rate Y(n−1) in the preceding control cycle or when the absolute value of the steering angle Xf(n) of the front wheels 2, 2 in the current control cycle is not smaller than the absolute value of the steering angle Xf(n−1) of the front wheels 2, 2 in the preceding control cycle, since it cannot be considered that the control means for controlling the steering angle Xr(n) of the rear wheels 3, 3 will be changed from the fuzzy control means 32 to the yaw rate feedback means 30 in a short time, the control mode selection means 33 outputs a control effecting signal to the side slip angle control means 31.

When the side slip angle control means 31 receives the control effecting signal from the control mode selection means 33, similarly to the previous embodiment, it calculates the side slip angle control value Rz(n) in accordance with the formula (6) and outputs a side slip angle control signal to the motor 24 so that the steering angle Xr(n) of the rear wheels 3, 3 is made equal to the side slip angle control value Rz(n) and the estimation value of the side slip angle z(n) is reduced. Therefore, in the state where the turning radius of the vehicle is large and the yaw rate Y(n) is low, it is possible to prevent the rear wheels 3, 3 from being steered in the reverse phase with respect to that of the front wheels 2, 2 and reliably prevent the driving stability from being lowered.

On the contrary, when the absolute value of the estimation value z(n) of the side slip angle is not greater than the predetermined value z0, since it can be considered that the vehicle is being driven in a state corresponding to the area S1 shown in FIG. 4 where the cornering force C.F. is substantially proportional to the estimated absolute value z(n) of the side slip angle and that the driving condition is stable, the control mode selection means 33 outputs a control effecting signal to the yaw rate feedback control means 30.

When the yaw rate feedback control means 30 receives the control effecting signal from the control mode selection means 33, it outputs a yaw rate feedback control signal to the motor 24, thereby controlling the steering angle Xr(n) of the rear wheels 3, 3 to make it equal to the yaw rate feedback control value Ry(n).

The above described control is repeated at predetermined time intervals and the rear wheels 3, 3 are steered accordingly.

According to this embodiment, since the rear wheels 3, 3 are steered by the yaw rate feedback control means 30 in the stable driving state corresponding to the area S1 so as to make the detected yaw rate $Y(n)$ become equal to the target yaw rate $Yo(n)$ determined based upon the steering angle of the steering wheel 1, it is possible to steer the rear wheels 3, 3 in a desired manner. On the other hand, since the rear wheels 3, 3 are steered by the side slip angle control means 31 in the state where the estimated absolute value $z(n)$ of the side slip angle is greater than the predetermined value $z0$ and the vehicle is being sharply turned and subjected to a large lateral acceleration $GL(n)$, in such a manner that the greater the estimated absolute value $z(n)$ of the side slip angle is, the more the rear wheels 3, 3 are steered in the same phase as that of the front wheels 2, 2, namely, in the same direction as that of the front wheels 2, 2 with respect to the longitudinal center line of the vehicle, it is possible to prevent the rear wheels 3, 3 from being steered in the reverse phase with respect to that of the front wheels 2, 2 by the yaw rate feedback control means 30 and to prevent the driving stability from being lowered. Furthermore, in the state corresponding to the area S3 where the absolute value of the deviation $E(n)$ between the target yaw rate $Yo(n)$ and the detected yaw rate $Y(n)$ is greater than the predetermined value $E0$ and the rate of change $dE(n)$ in the deviation $E(n)$ is greater than the predetermined value $dE0$, in other words, when the vehicle is turning extremely sharply and there is considerable risk of excessive oversteering, since the rear wheels 3, 3 are steered by the fuzzy control means 32 so as to reduce the rate of change $dY(n)$ in the detected yaw rate $Y(n)$, it is possible to improve the driving stability even in this unstable state without a large computer. Moreover, even in the case where it is judged that the steering angle $Xr(n)$ of the rear wheels 3, 3 should be effected, when the absolute value of the detected yaw rate $Y(n)$ in the current control cycle is smaller than the absolute value of the detected yaw rate $Y(n-1)$ in the preceding control cycle and the absolute value of the steering angle $Xf(n)$ of the front wheels 2, 2 in the current control cycle is smaller than the absolute value of the steering angle $Xf(n-1)$ of the front wheels 2, 2 in the preceding control cycle, it can be considered that since the steering wheel 1 once turned in one direction has been turned back in the other direction, the deviation $E(n)$ between the detected yaw rate $Y(n)$ and the target yaw rate $Yo(n)$ is decreasing and that this means that the control means for controlling the Steering angle $Xr(n)$ of the rear wheels 3, 3 will be changed from the fuzzy control means 32 or the side slip angle control means 31 to the yaw rate feedback control means 30 in a short time. Therefore, although the fuzzy control or the side slip angle control should be effected, since the control mode selection means 33 causes the yaw rate feedback control means 30 to start controlling the steering angle $Xr(n)$ of the rear wheels 3, 3 based on the actually detected value without outputting a control effecting signal to the fuzzy control means 32 or the side slip angle control means 31, it is possible to improve the driving stability and prevent the steering angle $Xr(n)$ of the rear wheels 3, 3 from being suddenly changed when the control means for controlling the steering angle $Xr(n)$ of the rear wheels 3, 3 is changed from the fuzzy control means 32 or the side slip angle control means 31 to the yaw rate feedback control means 30, thereby to prevent the driving stability from being lowered on changing the control means.

Figure 7B:
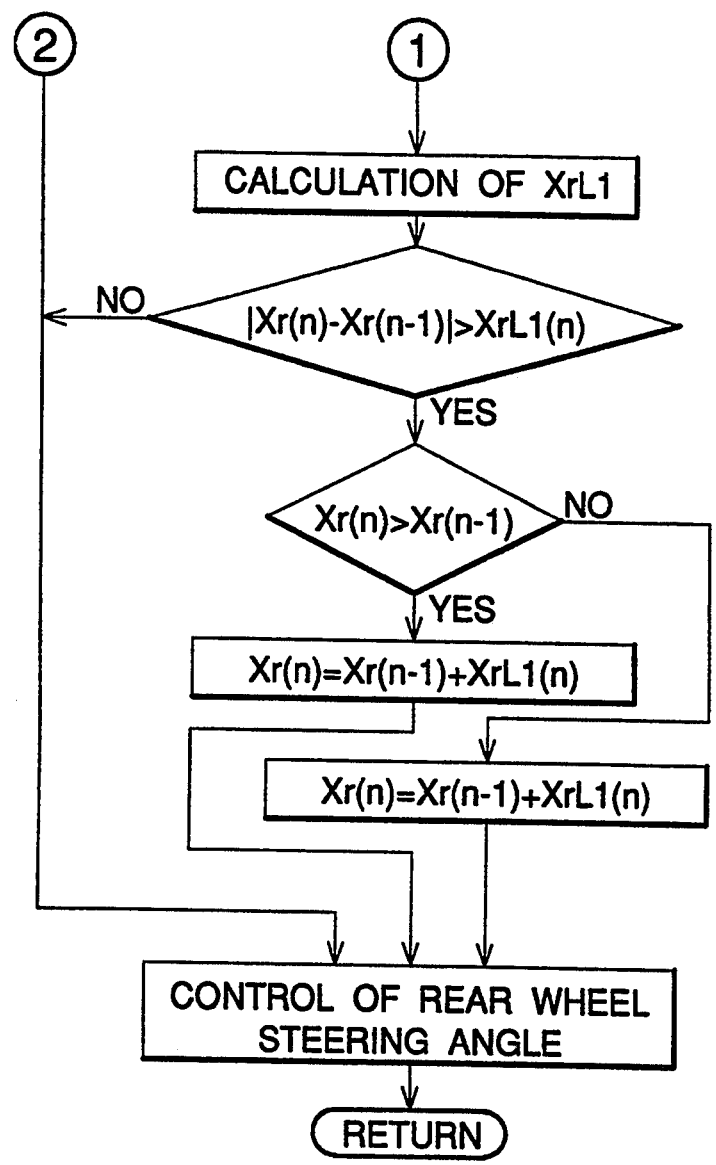
Figure 7C:
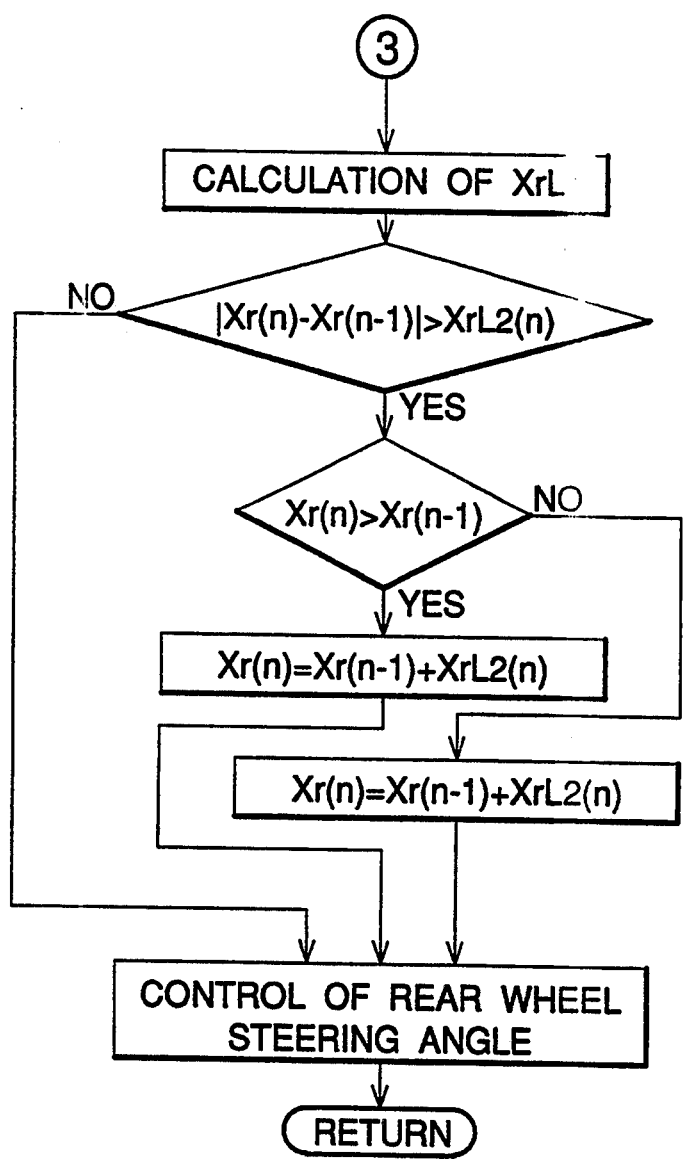

FIG. 7 is a flow chart showing a further embodiment of the steering angle control of rear wheels effected by the control unit of the rear wheel steering system.

The embodiment shown in FIG. 7 prevents the steering angle $Xr(n)$ of the rear wheels 3, 3 from being greatly changed when the control means for controlling the steering angle $Xr(n)$ of the rear wheels 3, 3 is changed.

In this embodiment, the control mode selection means 33 is constituted so that when it changes the control means for controlling the steering angle $Xr(n)$ of the rear wheels 3, 3 from the yaw rate feedback control means 30 to the fuzzy control means 32, from the side slip angle control means 31 to the fuzzy control means 32, from the side slip angle control means 31 to the yaw rate feedback control means 30, from the fuzzy control means 32 to the yaw rate feedback control means 30, or from the fuzzy control means 32 to the side slip angle control means 31, it outputs a first control signal together with a control effecting signal to the control means which is to control the steering angle $Xr(n)$ of the rear wheels 3, 3 and that, on the other hand, when the control mode selection means 33 changes the control means for controlling the steering angle $Xr(n)$ of the rear wheels 3, 3 from the yaw rate feedback control means 30 to the side slip angle control means 31, it outputs a second control signal together with a control effecting signal to the side slip angle control means 31.

The yaw rate feedback control means 30 is constituted so that when it receives only a control effecting signal from the control mode selection means 33, it produces the yaw rate feedback control signal and outputs it to the motor 24 so that the steering angle $Xr(n)$ of the rear wheels 3, 3 can be controlled so as to become equal to the yaw rate feedback control value $Ry(n)$ and that, on the other hand, when it receives the first control signal together with the control effecting signal, it judges whether or not the absolute value of the difference between the steering angle $Xr(n)$ calculated in the current control cycle, namely, the yaw rate feedback control value $Ry(n)$, and the steering angle $Xr(n-1)$ in the preceding control cycle is greater than a first limit value $XrL1(n)$, in other words, whether or not the amount of change in the steering angle $Xr$ of the rear wheels 3, 3 between the preceding control cycle and the current cycle is greater than the first limit value. When the absolute value of the difference between the steering angle $Xr(n)$ calculated in the current control cycle and the steering angle $Xr(n-1)$ in the preceding control cycle is not greater than the first limit value $XrL1(n)$, the yaw rate feedback control means 30 produces the yaw rate feedback control signal and outputs it to the motor 24 so that the steering angle $Xr(n)$ of the rear wheels 3, 3 can be controlled so as to become equal to the yaw rate feedback control value $Ry(n)$ calculated in the current control cycle and, on the contrary, when the absolute value of the difference between the steering angle $Xr(n)$ calculated in the current control cycle and the steering angle $Xr(n-1)$ in the preceding control cycle is greater than the first limit value $XrL1(n)$, the yaw rate feedback control means 30 produces the yaw rate feedback control signal and outputs it to the motor 24 so that the steering angle $Xr(n)$ of the rear wheels 3, 3 can be controlled in such a manner that the amount of change in the steering angle $Xr(n)$ of the rear wheels 3, 3 between the current control cycle and the preceding control cycle becomes equal to the first limit value $XrL1(n)$.

The side slip angle control means 31 is constituted so that when it receives only a control effecting signal from the control mode selection means 33, it produces the side slip angle control signal and outputs it to the motor 24 so that the steering angle Xr(n) of the rear wheels 3, 3 can be controlled so as to become equal to the side slip angle control value Rz(n) calculated based upon the formula (6) stored therein and that, on the other hand, when it receives the first control signal together with the control effecting signal, it judges whether or not the absolute value of the difference between the steering angle Xr(n) calculated in the current control cycle, namely, the side slip angle control value Rz(n), and the steering angle Xr(n−1) in the preceding control cycle is greater than a first limit value XrL1(n), in other words, whether or not the amount of change in the steering angle Xr of the rear wheels between the preceding control cycle and the current cycle is greater than the first limit value. When the absolute value of the difference between the steering angle Xr(n) calculated in the current control cycle and the steering angle Xr(n−1) in the preceding control cycle is not greater than the first limit value XrL1(n), the side slip angle control means 31 produces the side slip angle control signal and outputs it to the motor 24 so that the steering angle Xr(n) of the rear wheels 3, 3 can be controlled so as to become equal to the side slip angle control value Rz(n) calculated in the current control cycle and, on the contrary, when the absolute value of difference between the steering angle Xr(n) calculated in the current control cycle and the steering angle Xr(n−1) in the preceding control cycle is greater than the first limit value XrL1(n), the side slip angle control means 31 produces the side slip angle control signal and outputs it to the motor 24 so that the steering angle Xr(n) of the rear wheels 3, 3 can be controlled in such a manner that the amount of change in the steering angle Xr(n) of the rear wheels 3, 3 between the current control cycle and the preceding control cycle becomes equal to the first limit value XrL1(n). Further, when the side slip angle control means 31 receives a second control signal from the control mode selection means 33, it judges whether or not the absolute value of the difference between the steering angle Xr(n) calculated in the current control cycle and the steering angle Xr(n−1) in the preceding control cycle is greater than a second limit value XrL2(n) which is smaller than the first limit value XrL1(n). When the side slip angle control means 31 judges that the absolute value of the difference between the steering angle Xr(n) calculated in the current control cycle and the steering angle Xr(n−1) in the preceding control cycle is not greater than a second limit value XrL2(n), it produces the side slip angle control signal and outputs it to the motor 24 so that the steering angle Xr(n) of the rear wheels 3, 3 can be controlled so as to become equal to the side slip angle control value Rz(n) calculated in the current control cycle and, on the contrary, when the absolute value of the difference between the steering angle Xr(n) calculated in the current control cycle and the steering angle Xr(n−1) in the preceding control cycle is greater than a second limit value XrL2(n), the side slip angle control means 31 produces the side slip angle control signal and outputs it to the motor 24 so that the steering angle Xr(n) of the rear wheels 3, 3 can be controlled in such a manner that the amount of change in the steering angle Xr(n) of the rear wheels 3, 3 between the current control cycle and the preceding control cycle becomes equal to the second limit value XrL2(n).

The fuzzy control means 32 is constituted so that when it receives only a control effecting signal from the control mode selection means 33, it produces a fuzzy control signal and outputs it to the motor 24 so that the steering angle Xr(n) of the rear wheels 3, 3 can be controlled so as to become equal to the fuzzy control value Rf(n) calculated in accordance with the formula (5) and that, on the other hand, when it receives the first control signal together with the control effecting signal, it judges whether or not the absolute value of the difference between the steering angle Xr(n) calculated in the current control cycle, namely, the fuzzy control value Rf(n), and the steering angle Xr(n−1) in the preceding control cycle is greater than a first limit value XrL1(n), in other words, whether or not the amount of change in the steering angle Xr of the rear wheels between the preceding control cycle and the current cycle is greater than the first limit value. When the absolute value of the difference between the steering angle Xr(n) calculated in the current control cycle and the steering angle Xr(n−1) in the preceding control cycle is not greater than a first limit value XrL1(n), the fuzzy control means 32 produces the fuzzy control signal and outputs it to the motor 24 so that the steering angle Xr(n) of the rear wheels 3, 3 can be controlled so as to become equal to the fuzzy control value Rf(n) calculated in the current control cycle and, on the contrary, when the absolute value of the difference between the steering angle Xr(n) calculated in the current control cycle and the steering angle Xr(n−1) in the preceding control cycle is greater than the first limit value XrL1(n), the fuzzy control means 32 produces the fuzzy control signal and outputs it to the motor 24 so that the steering angle Xr(n) of the rear wheels 3, 3 can be controlled in such a manner that the amount of change in the steering angle Xr(n) of the rear wheels 3, 3 between the current control cycle and the preceding control cycle becomes equal to the first limit value XrL1(n).

The side slip angle calculating means 34 is constituted, similarly to the previous embodiment, so as to estimate the value z(n) of the side slip angle based upon the vehicle speed V(n) input from the vehicle speed sensor 40, the detected yaw rate Y(n) input from the yaw rate sensor 42 and the lateral acceleration GL(n) input from the lateral acceleration sensor 43 in accordance with the formula (1) and output the estimated value z(n) to the side slip angle control means 31.

Figure 8:
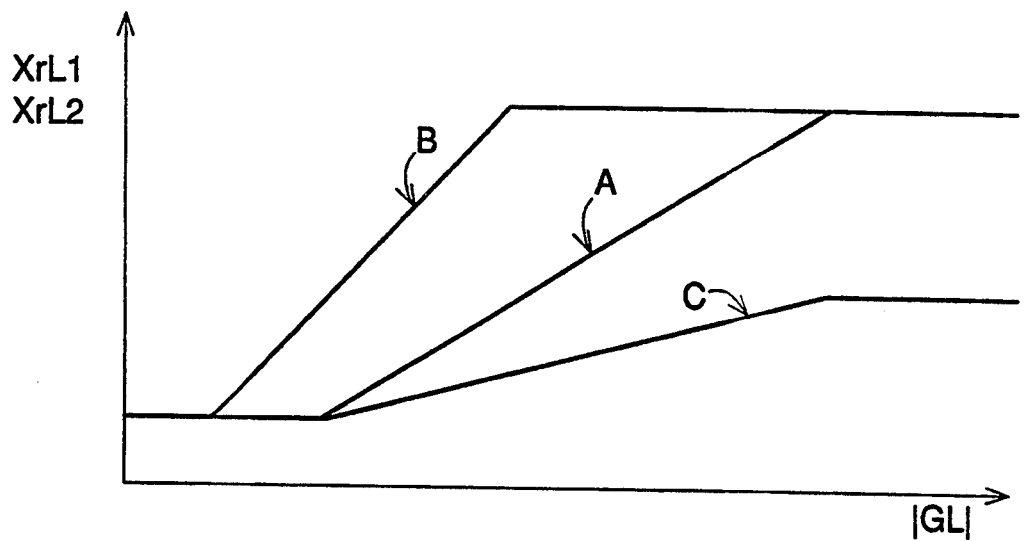
FIG. 8 is a graph showing the relationship between a limit value, a lateral acceleration GL and a road friction coefficient.
Figure 9:
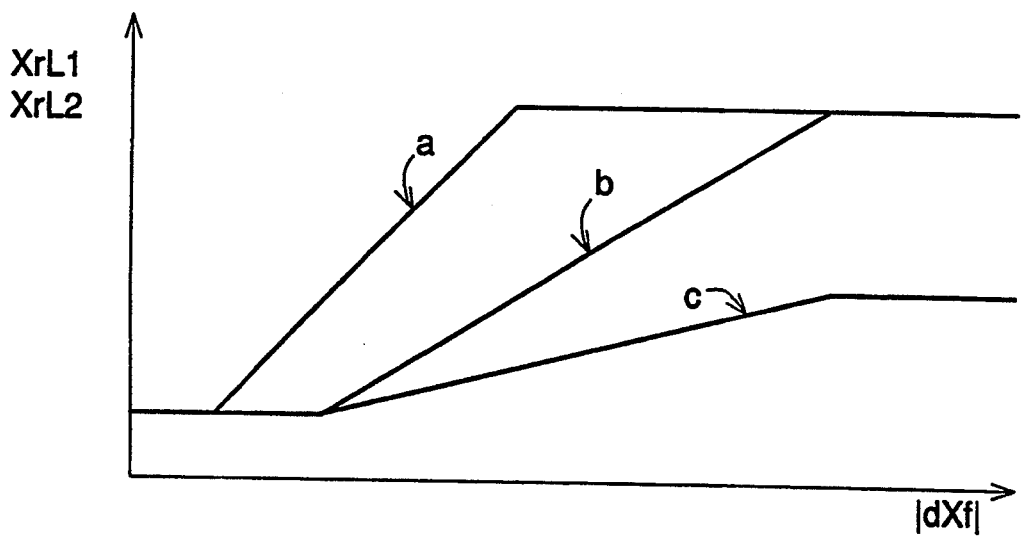
FIG. 9 is a graph showing the relationship between a limit value, an absolute value of the rate of change in steering angle of front wheels and a road surface friction coefficient.

FIG. 8 is a graph showing the relationship between the limit value, the lateral acceleration GL and the road surface friction coefficient, and FIG. 9 is a graph showing the relationship between the limit value, the absolute value of the rate of change in steering angle of the front wheels 2, 2 and a road surface friction coefficient.

In FIG. 8, the curve A shows the relationship between the first limit value XrL1(n) and the lateral acceleration GL(n) in the case where the vehicle is being driven on a road with a high road surface friction coefficient and the curve B shows the relationship between the first limit value XrL1(n) and the lateral acceleration GL(n) in the case where the vehicle is being driven on a road with a low road surface friction coefficient is low. Further, the curve C shows the relationship between the second limit value XrL2(n) and the lateral acceleration GL(n) in the case where the vehicle is being driven on a road with a high road surface friction coefficient and corresponds to the curve A. As shown in FIG. 8, the first limit value XrL1(n) and the second limit value XrL2(n) increase as the absolute value of the lateral acceleration GL(n) becomes greater, and as the road surface friction coefficient becomes lower, they increase within the range where the absolute value of the lateral acceleration GL(n) is low. The reason why the first limit value XrL1(n) is made to increase with increasing the absolute value of the lateral acceleration GL(n) is that a large absolute value of the lateral acceleration GL(n) means that the driving condition is probably unstable and, therefore, driving stability should be emphasized over riding comfort. The reason why the first limit value XrL1(n) is made to increase with decreasing the road surface friction coefficient within the range where the absolute value of the lateral acceleration GL(n) is low is that when the vehicle is being driven on a road with a low road surface friction coefficient, the driving condition is probably unstable, even though the absolute value of the lateral acceleration GL(n) is low, and, therefore, driving stability should be emphasized over riding comfort. Further, the reason why the second limit value XrL2(n) is set lower than the first limit value XrL1(n) is that the driver tends to feel uncomfortable particularly when the control means for controlling the steering angle Xr(n) of the rear wheels 3, 3 is changed from the yaw rate feedback control means 30 to the side slip angle control means 31.

In FIG. 9, the curve "a" shows the relationship between the first limit value XrL1(n) and the absolute value of the rate of change dXf in the steering angle Xf of the front wheels 2, 2 in the case where the vehicle is being driven on a road with a high road surface friction coefficient and the curve "b" shows the relationship between the first limit value XrL1(n) and the absolute value of the rate of change dXf(n) in the steering angle Xf(n) of the front wheels 2, 2 in the case where the vehicle is being driven on a road with a low road surface friction coefficient. Further, the curve "c" shows the relationship between the second limit value XrL2(n) and the absolute value of the rate of change dXf(n) in the steering angle Xf(n) of the front wheels 2, 2 in the case where the vehicle is being driven on a road with a high road surface friction coefficient and corresponds to the curve "a". As shown in FIG. 9, the first limit value XrL1(n) and the second limit value XrL2(n) increase as the absolute value of the rate of change dXf(n) in the steering angle Xf(n) of the front wheels 2, 2 becomes greater, and as the road surface friction coefficient becomes lower, they increase within the range where the absolute value of the rate of change dXf(n) in the steering angle Xf(n) of the front wheels 2, 2 is small. The reason why the first limit value XrL1(n) is made to increase as the absolute value of the rate of change dXf(n) in the steering angle Xf(n) of the front wheels 2, 2 becomes greater is that a large absolute value of the rate of change dXf(n) in the steering angle Xf(n) of the front wheels 2, 2 means that the driving condition is probably unstable, and, therefore, driving stability should be emphasized over riding comfort. The reason why the first limit value XrL1(n) is made to increase with decreasing the road surface friction coefficient within the range where the absolute value of the rate of change dXf(n) in the steering angle Xf(n) of the front wheels 2, 2 is small is that when the vehicle is being driven on a road with a low road surface friction coefficient, the driving condition is probably unstable, even though the absolute value of the rate dXf(n) of change in the steering angle Xf(n) of the front wheels 2, 2 is small, and, therefore, driving stability should be emphasized over riding comfort. Further, the reason why the second limit value XrL2(n) is set lower than the first limit value XrL1(n) is that the driver tends to feel uncomfortable particularly when the control means for controlling the steering angle Xr(n) of the rear wheels 3, 3 is changed from the yaw rate feedback control means 30 to the side slip angle control means 31.

In FIG. 7, the control unit 29 first receives the vehicle speed V(n) detected by the vehicle speed sensor 40, the steering angle Xf(n) of the front wheels 2, 2 detected by the steering angle sensor 41, the detected yaw rate Y(n) detected by the yaw rate sensor 42 and the lateral acceleration GL(n) detected by the lateral acceleration sensor 43.

Similarly to the previous embodiments, the yaw rate feedback control means 30 calculates the target yaw rate Y0(n) based upon the vehicle speed V(n) input from the vehicle speed sensor 40 and the steering angle Xf(n) of the front wheels 2, 2 input from the steering angle sensor 41 and calculates the deviation E(n) between the thus calculated target yaw rate Yo(n) and the detected yaw rate Y(n) input from the yaw rate sensor 42. Further, the yaw rate feedback control means 30 calculates the yaw rate feedback value Ry(n) in accordance with the I-PD calculation formula.

Similarly to the previous embodiments, the thus calculated yaw rate feedback value Ry(n) and deviation E(n) are output to the control mode selection means 33. The control mode selection means 33 calculates the rate of change dE(n) in the deviation E(n) and judges whether or not the absolute value of the deviation E(n) is greater than the predetermined value E0 and the absolute value of the rate of change dE(n) in the deviation E(n) is greater than the predetermined value dE0.

When the result of this judgment is YES, namely, when the absolute value of the deviation E(n) is greater than the predetermined value E0 and the absolute value of the rate of change dE(n) in the deviation E(n) is greater than the predetermined value dE0, it can be considered that the vehicle is being driven in a state corresponding to an area S3 in FIG. 4. In this area, the vehicle is being turned extremely sharply and there is a considerable risk of excessive oversteering, so that the driving conditions of the vehicle is unstable. Therefore, similarly to the embodiment shown in FIG. 3, the control mode selection means 33 judges that the steering angle Xr(n) of the rear wheels 3, 3 should be controlled by the fuzzy control means 32 and produces a control effecting signal. Then, the control mode selection means 33 further judges whether or not the steering angle Xr(n−1) of the rear wheels 3, 3 was controlled by the fuzzy control means 32 in the preceding control cycle.

When the result of this judgment is YES, namely, When the steering angle Xr(n−1) of the rear wheels 3, 3 was controlled by the fuzzy control means 32 in the preceding control cycle, the control mode selection means 33 outputs only the control effecting signal to the fuzzy control means 32.

On the contrary, when the control mode selection means 33 judges that the steering angle Xr(n−1) of the rear wheels 3, 3 was controlled by the yaw rate feedback control means 30 or the side slip angle control means 31 in the preceding control cycle, it outputs a first control signal to the fuzzy control means 32 in addition to the control effecting signal.

When the fuzzy control means 32 receives the control effecting signal from the control mode selection means 33, similarly to the previous embodiments, it calculates the rate of change dY(n) in the detected yaw rate Y(n) based upon the detected yaw rate input from the yaw rate sensor 42 and further calculates a fuzzy control value Rf(n) based on a membership function which is experimentally determined so as to reduce the absolute value of the rate of change in the detected yaw rate Y(n) and which depends upon the deviation E(n) and the rate of change dE(n) in accordance with the formula (5). Then, when only the control effecting signal is input, the fuzzy control means 32 produces the fuzzy control signal and outputs it to the motor 24 so that the steering angle Xr (n) of the rear wheels 3, 3 can be controlled so as to become equal to the fuzzy control value Rf(n).

On the contrary, when the fuzzy control means 32 receives the first control signal together with the control effecting signal from the control mode selection means 33, it judges whether or not the absolute value of the difference between the fuzzy control value Rf(n) calculated in the current control cycle and the steering angle Xr(n−1) of the rear wheels 3, 3 in the preceding control cycle is greater than the first limit value XrL1(n).

When the result of this judgment is NO, namely, when the absolute value of the difference between the fuzzy control value Rf(n) and the steering angle Xr(n−1) of the rear wheels 3, 3 in the preceding control cycle is not greater than the first limit value XrL1(n), the fuzzy control means 32 produces the fuzzy control signal and outputs it to the motor 24 so that the steering angle Xr(n) of the rear wheels 3, 3 can be controlled so as to become equal to the fuzzy control value Rf(n).

On the contrary, when the result of the judgment is YES, namely, when the absolute value of the difference between the fuzzy control value Rf(n) and the steering angle Xr(n−1) of the rear wheels 3, 3 in the preceding control cycle is greater than the first limit value XrL1(n), if the fuzzy control value Rf(n) is greater than the steering angle Xr(n−1) of the rear wheels 3, 3 in the preceding control cycle, the fuzzy control means 32 produces the fuzzy control signal and outputs it to the motor 24 so that the steering angle Xr(n) of the rear wheels 3, 3 is controlled so as to become equal to {Xr(n−1)+XrL1(n)} and if the fuzzy control value Rf(n) is not greater than the steering angle Xr(n−1) of the rear wheels 3, 3 in the preceding control cycle, the fuzzy control means 32 produces the fuzzy control signal and outputs it to the motor 24 so that the steering angle Xr(n) of the rear wheels 3, 3 is controlled so as to become equal to {Xr(n−1)−XrL1(n)}. The control mode selection means 33 stores maps corresponding to the graphs shown in FIGS. 8 and 9 and determines the first limit value XrL1(n) from the stored map based on the vehicle speed V(n), the steering angle Xf(n) of the front wheels 2, 2 and the lateral acceleration Gn(n).

On the contrary, when the absolute value of the deviation E(n) is not greater than a predetermined value E0 or when the absolute value of the rate of change dE(n) in the deviation E(n) is not greater than a predetermined value dE0, the control mode selection means 33 judges whether or not the absolute value of the estimated value z(n) of the side slip angle input from the side slip angle calculating means 34 is greater than a predetermined value z0.

When the result of this judgment is YES, similarly to the embodiment shown in FIG. 3, the control mode selection means 33 judges that the steering angle Xr(n) of the rear wheels 3, 3 should be controlled by the side slip angle control means 31 and produces a control effecting signal. Then, the control mode selection means 33 further judges whether or not the steering angle Xr(n−1) of the rear wheels 3, 3 was controlled by the side slip angle control means 31 in the preceding control cycle.

When the result of this judgment is YES, namely, when the control mode selection means 33 judges that the steering angle Xr(n−1) of the rear wheels 3, 3 was controlled by the side slip angle control means 31 in the preceding control cycle, the control mode selection means 33 outputs only the control effecting signal to the side slip angle control means 31.

On the contrary, when the result of the judgment is NO, the control mode selection means 33 further judges whether or not the steering angle Xr(n−1) of the rear wheels 3, 3 was controlled by the yaw rate feedback control means 30 in the preceding control cycle.

When the result of this judgment is NO, namely, when the control mode selection means 33 judges that the steering angle Xr(n−1) of the rear wheels 3, 3 was controlled by the fuzzy control means 32 in the preceding control cycle, it outputs the first control signal together with the control effecting signal to the side slip angle control means 31.

On the contrary, when the control mode selection means 33 judges that the steering angle Xr(n−1) of the rear wheels 3, 3 was controlled by the yaw rate feedback control means 30 in the preceding control cycle, it outputs the second control signal together with the control effecting signal to the side slip angle control means 31.

When the side slip angle control means 31 receives the control effecting signal from the control mode selection means 33, similarly to the embodiment shown in FIG. 3, it calculates the side slip angle control value Rz(n) in accordance with the formula (6). Then, when only the control effecting signal is input, the side slip angle control means 31 produces the side slip angle control signal and outputs it to the motor 24 so that the steering angle Xr(n) of the rear wheels 3, 3 is made equal to the side slip angle control value Rz(n). Therefore, in the state where the turning radius of the vehicle is large and the yaw rate Y(n) is low, it is possible to prevent the rear wheels 3, 3 from being steered in the reverse phase with respect to that of the front wheels 2, 2 and reliably prevent the driving stability from being lowered.

On the contrary, when the side slip angle control means 31 receives the first control signal together with the control effecting signal, it further judges whether or not the absolute value of the difference between the side slip angle control value Rz(n) calculated in the current control cycle and the steering angle Xr(n−1) of the rear wheels 3, 3 in the preceding control cycle is greater than the first limit value XrL1(n).

When the absolute value of the difference between the side slip angle control value Rz(n) calculated in the current control cycle and the steering angle Xr(n−1) of the rear wheels 3, 3 in the preceding control cycle is not greater than the first limit value XrL1(n), the side slip angle control means 31 produces the side slip angle control signal and outputs it to the motor 24 so that the steering angle Xr(n) of the rear wheels 3, 3 can be controlled so as to become equal to the side slip angle control value Rz(n).

On the contrary, when the absolute value of the difference between the side slip angle control value Rz(n) calculated in the current cycle and the steering angle Xr(n−1) of the rear wheels 3, 3 in the preceding control cycle is greater than the first limit value XrL1(n), if the side slip angle control value Rz(n) calculated in the current cycle is greater than the steering angle Xr(n−1) of the rear wheels 3, 3 in the preceding control cycle, the side slip angle control means 31 produces the side slip angle control signal and outputs it to the motor 24 so that the steering angle Xr(n) of the rear wheels 3, 3 is controlled so as to become equal to {Xr(n−1)+XrL1(n)} and if the side slip angle control value Rz(n) calculated in the current cycle is not greater than the steering angle Xr(n−1) of the rear wheels 3, 3 in the preceding control cycle, the side slip angle control means 31 produces the side slip angle control signal and outputs it to the motor 24 so that the steering angle Xr(n) of the rear wheels 3, 3 is controlled so as to become equal to {Xr(n−1)−XrL1(n)}.

On the contrary, when the side slip angle control means 31 receives the second control signal together with the control effecting signal, it further judges whether or not the absolute value of the difference between the side slip angle control value Rz(n) calculated in the current control cycle and the steering angle Xr(n−1) of the rear wheels 3, 3 in the preceding control cycle is greater than the second limit value XrL2(n).

When the absolute value of the difference between the side slip angle control value Rz(n) calculated in the current control cycle and the steering angle Xr(n−1) of the rear wheels 3, 3 in the preceding control cycle is not greater than the second limit value XrL2(n), the side slip angle control means 31 produces the side slip control signal and outputs it to the motor 24 so that the steering angle Xr(n) of the rear wheels 3, 3 can be controlled so as to become equal to the side slip angle control value Rz(n).

On the contrary, when the absolute value of the difference between the side slip angle control value Rz(n) calculated in the current cycle and the steering angle Xr(n−1) of the rear wheels 3, 3 in the preceding control cycle is greater than the second limit value XrL2(n), if the side slip angle control value Rz(n) calculated in the current cycle is greater than the steering angle Xr(n−1) of the rear wheels 3, 3 in the preceding control cycle, the side slip angle control means 31 produces the side slip angle control signal and outputs it to the motor 24 so that the steering angle Xr(n) of the rear wheels 3, 3 is controlled so as to become equal to {Xr(n−1)+XrL2(n)} and if the side slip angle control value Rz(n) calculated in the current cycle is not greater than the steering angle Xr(n−1) of the rear wheels 3, 3 in the preceding control cycle, the side slip angle control means 31 produces the side slip angle control signal and outputs it to the motor 24 so that the steering angle Xr(n) of the rear wheels 3, 3 is controlled so as to become equal to {Xr(n−1)−XrL2(n)}. The control mode selection means 33 stores maps corresponding to the graphs shown in FIGS. 8 and 9 and determines the second limit value XrL2(n) from the stored maps based upon the vehicle speed V(n), the steering angle Xf(n) of the front wheels 2, 2 and the lateral acceleration GL(n).

On the contrary, when the absolute value of the estimated value z(n) of the side slip angle is not greater than the predetermined value z0, similarly to the embodiment shown in FIG. 3, the control mode selection means 33 produces a control effecting signal and further judges whether or not the steering angle Xr(n) of the rear wheels 3, 3 was controlled by the yaw rate feedback control means 30 in the preceding control cycle.

When the result of this judgment is YES, the control mode selection means 33 outputs only the control effecting signal to the yaw rate feedback control means 30.

On the other hand, when the result of the judgment is NO, namely, when the control mode selection means 33 judges that the steering angle Xr(n) of the rear wheels 3, 3 was controlled by the side slip angle control means 31 or the fuzzy control means 32 in the preceding control cycle, it outputs a first control signal together with the control effecting signal to the yaw rate feedback control means 30.

When the yaw rate feedback control means 30 receives only the control effecting signal from the control mode selection means 33, it produces the yaw rate feedback control signal and outputs it to the motor 24 so that the steering angle Xr(n) of the rear wheels 3, 3 can be controlled so as to become equal to the yaw rate feedback control value Ry(n).

On the contrary, when the yaw rate feedback control means 30 receives the first control signal together with the control effecting signal, it further judges whether or not the absolute value of the difference between the yaw rate feedback control value Ry(n) calculated in the current control cycle and the steering angle Xr(n−1) of the rear wheels 3, 3 in the preceding control cycle is greater than the first limit value XrL1(n).

When the absolute value of the difference between the yaw rate feedback control value Ry(n) calculated in the current control cycle and the steering angle Xr(n−1) of the rear wheels 3, 3 in the preceding control cycle is not greater than the first limit value XrL1(n), the yaw rate feedback control means 30 produces the yaw rate feedback control signal and outputs it to the motor 24 so that the steering angle Xr(n) of the rear wheels 3, 3 can be controlled so as to become equal to the yaw rate feedback control value Ry(n).

On the contrary, when the absolute value of the difference between the yaw rate feedback control value Ry(n) calculated in the current control cycle and the steering angle Xr(n−1) of the rear wheels 3, 3 in the preceding control cycle is greater than the first limit value XrL1(n), if the yaw rate feedback control value Ry(n) is greater than the steering angle Xr(n−1) of the rear wheels 3, 3 in the preceding control cycle, the yaw rate feedback control means 30 produces the yaw rate feedback control signal and outputs it to the motor 24 so that the steering angle Xr(n) of the rear wheels 3, 3 is controlled so as to become equal to {Xr(n−1)+XrL1(n)} and if the yaw rate feedback control value Ry(n) calculated in the current control cycle is not greater than the steering angle Xr(n−1) of the rear wheels 3, 3 in the preceding control cycle, the yaw rate feedback control means 30 produces the yaw rate feedback control signal and outputs it to the motor 24 so that the steering angle Xr(n) of the rear wheels 3, 3 is controlled so as to become equal to {Xr(n−1)−XrL1(n)}.

The above described control is repeated at predetermined time intervals and the rear wheels 3, 3 are steered accordingly.

According to this embodiment, since the rear wheels 3, 3 are steered by the yaw rate feedback control means 30 in the stable driving state corresponding to the area S1 so as to make the detected yaw rate Y(n) become equal to the target yaw rate Yo(n) determined based upon the steering angle of the steering wheel 1, it is possible to steer the rear wheels 3, 3 in a desired manner. On the other hand, since the rear wheels 3, 3 are steered by the side slip angle control means 31 in the state where the estimated absolute value z(n) of the side slip angle is greater than the predetermined value z0 and the vehicle is being sharply turned and subjected to a large lateral acceleration GL(n), in such a manner that the greater the estimated absolute value z(n) of the side slip angle is, the more the rear wheels 3, 3 are steered in the same phase as that of the front wheels 2, 2, namely, in the same direction as that of the front wheels 2, 2 with respect to the longitudinal center line of the vehicle, it is possible to prevent the rear wheels 3, 3 from being steered in the reverse phase with respect to that of the front wheels 2, 2 by the yaw rate feedback control means 30 and to prevent the driving stability from being lowered. Furthermore, in the state corresponding to the area S3 where the absolute value of the deviation E(n) between the target yaw rate Yo(n) and the detected yaw rate Y(n) is greater than the predetermined value E0 and the rate of change dE(n) in the deviation E(n) is greater than the predetermined value dE0, in other words, when the vehicle is turning extremely sharply and there is considerable risk of excessive oversteering, since the rear wheels 3, 3 are steered by the fuzzy control means 32 so as to reduce the rate of change dY(n) in the detected yaw rate Y(n), it is possible to improve the driving stability even in this unstable state without a large computer. Moreover, although there is a considerable risk of the steering angle Xr(n) of the rear wheels 3, 3 being suddenly and greatly changed when the control means for controlling the steering angle Xr(n) of the rear wheels 3, 3 is changed and that the driver will feel uncomfortable as a result, according to this embodiment, when the control means for controlling the steering angle Xr(n) of the rear wheels 3, 3 is changed from the yaw rate feedback control means 30 to the fuzzy control means 32, from the side slip angle control means 31 to the yaw rate feedback control means 30, from the fuzzy control means 32 to the yaw rate feedback control means 30 or from the fuzzy control means 32 to the side slip angle control means 31, the steering angle Xr(n) of the rear wheels 3, 3 is controlled so that the amount of change in the steering angle Xr of the rear wheels 3, 3 between the preceding control cycle and the current cycle becomes equal to the first limit value XrL1(n), and when the control means for controlling the steering angle Xr(n) of the rear wheels 3, 3 is changed from the yaw rate feedback control means 30 to the side slip angle control means 31, which may cause the driver to feel very uncomfortable, the steering angle Xr(n) of the rear wheels 3, 3 is controlled so that the amount of change in the steering angle Xr of the rear wheels 3, 3 between the preceding control cycle and the current cycle becomes equal to the second limit value XrL2(n) which is smaller than the first limit value XrL1(n). Further, the first limit value XrL1(n) and the second limit value XrL2(n) increase under unstable driving conditions in accordance with the maps shown in FIGS. 8 and 9. Therefore, according to this embodiment, it is possible to prevent the driving stability from being lowered and the driver from feeling uncomfortable.

Figure 10:
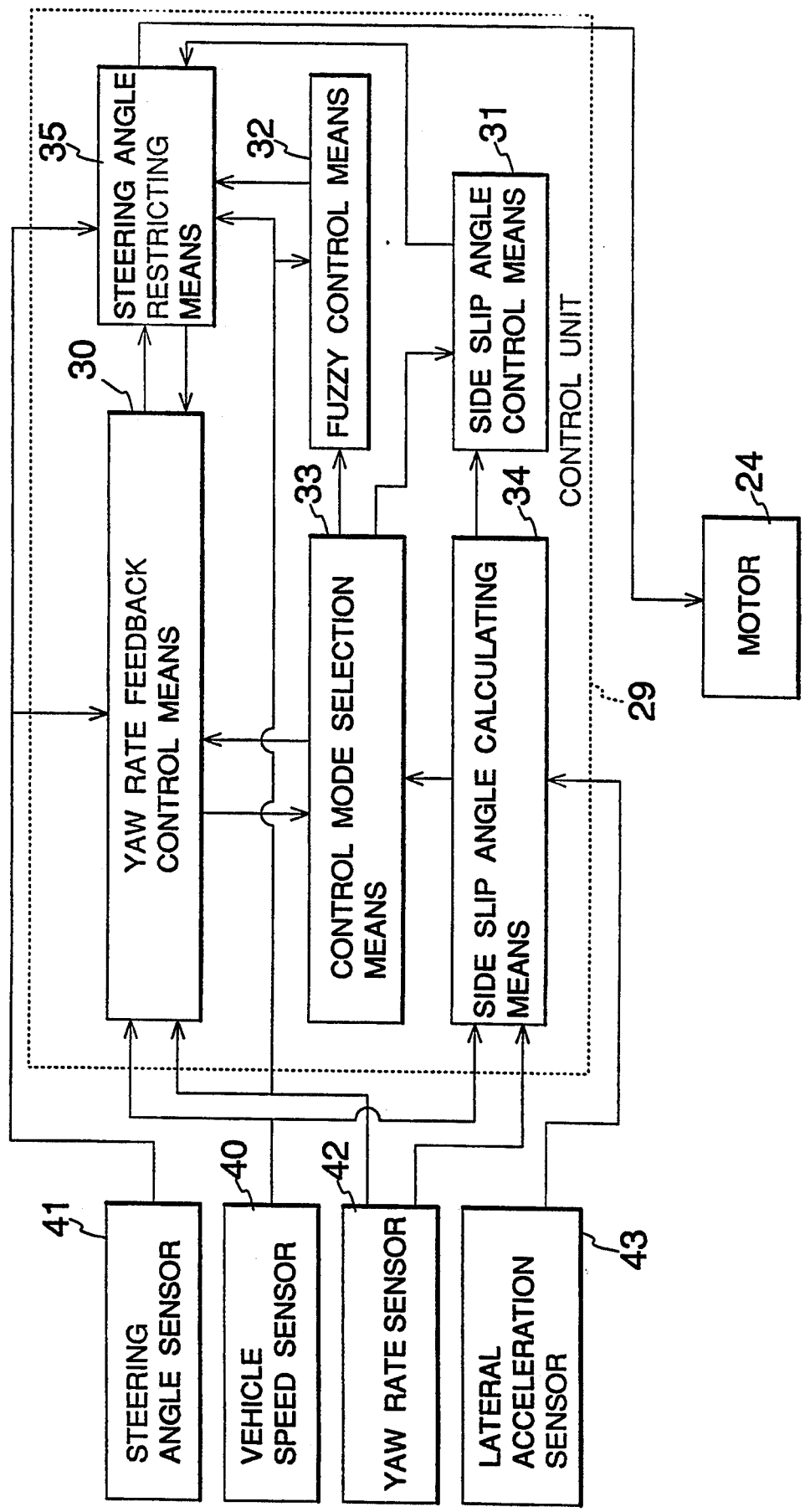
FIG. 10 is a block diagram showing a control unit of a rear wheel steering system which is another embodiment of the present invention and a detection system provided in a vehicle.

FIG. 10 is a block diagram showing a control unit of a rear wheels steering system which is another embodiment of the present invention and a detection system provided in a vehicle.

Referring to FIG. 10, the control unit 29 comprises a steering angle restricting means 35 in addition to the yaw rate feedback control means 30, the side slip angle control means 31, the fuzzy control means 32, the control mode selection means 33 and the side slip angle calculating means 34, and receives detection signals from the vehicle speed sensor 40 for detecting the vehicle speed V, the steering angle sensor 41 for detecting the steering angle of the steering hand wheel 1, namely, the steering angle Xf of the front wheels 2, 2, the yaw rate sensor 42 for detecting the yaw rate Y of the vehicle and the lateral acceleration sensor 43 for detecting the lateral acceleration GL acting on the vehicle.

The yaw rate feedback control means 30 is constituted so as to calculate a target yaw rate Yo(n) based on the vehicle speed V(n) input from the vehicle speed sensor 40 and the steering angle Xf(n) of the front wheels 2, 2 input from the steering angle sensor 41, to further calculate the deviation E(n) between the target yaw rate Yo(n) and a detected yaw rate Y(n) input from the yaw rate sensor 42, to calculate the yaw rate feedback value Ry(n) using the I-PD control calculation formula (4) stored therein and to output the thus calculated yaw rate feedback value Ry(n) to the control mode selection means 33. Further, the yaw rate feedback control means 30 is constituted so that when a control effecting signal is input thereto from the control mode selection means 33, it outputs a yaw rate feedback control signal to the steering angle restricting means 35.

The control mode selection means 33 is constituted the same as that of the embodiment shown in FIG. 2.

The side slip angle control means 31 is constituted so that when the control effecting signal is input thereto from the control mode selection means 33, it calculates a side slip angle control value Rz(n) in accordance with the calculation formula (6) stored therein and outputs a side slip angle control signal to the steering angle restricting means 35.

The fuzzy control means 32 is constituted so that when the control effecting signal is input from the control mode selection means 33, it calculates the rate of change dY(n) in the detected yaw rate Y(n) input from the yaw rate sensor 42 and also calculates a fuzzy control value Rf(n) in accordance with the calculation formula (5) stored therein when a control effecting signal is input thereto from the control mode selection means 33, thereby to output the fuzzy control signal to the steering angle restricting means 35.

The side slip angle calculating means 34 is constituted similarly to the previous embodiments so as to estimate the value of the side slip angle z in accordance with the formula (1) and output it to the control mode selection means 33.

The steering angle restricting means 35 is constituted so that when the absolute value of the deviation E(n) between the target yaw rate Yo(n) and the detected yaw rate Y(n) input from the yaw rate feedback control means 30 is greater than a predetermined value E1 and it judges based on the steering angle Xf(n) of the front wheels 2, 2 that the steering wheel 1 has been turned back and also judges that the absolute value of the detected yaw rate Y(n) is increasing, it outputs a steering angle restriction signal to the motor 24 so as to fix the steering angle Xr(n) of the rear wheels 3, 3 to the steering angle Xr(n−1) in the preceding control cycle, and is further constituted so that when the absolute value of the deviation E(n) is not greater than the predetermined value E1 or even if it is if it judges that the steering wheel 1 has not been turned back, it outputs the yaw rate feedback control signal, the side slip angle control signal or the fuzzy control signal input from the control means selected by the control mode selection means 33 to the motor 24, whereas if the absolute value of the deviation E(n) is not greater than the predetermined value E1 but it judges that the steering wheel 1 has been turned back, when it judges that the absolute value of the detected yaw rate Y(n) is decreasing, it causes the yaw rate feedback control means 30 to output the yaw rate feedback control signal and outputs it to the motor 24 even if the side slip angle control means 31 or the fuzzy control means 32 has been selected by the control mode selection means 33 and the side slip angle control signal or the fuzzy control signal has been input.

Figure 11B:
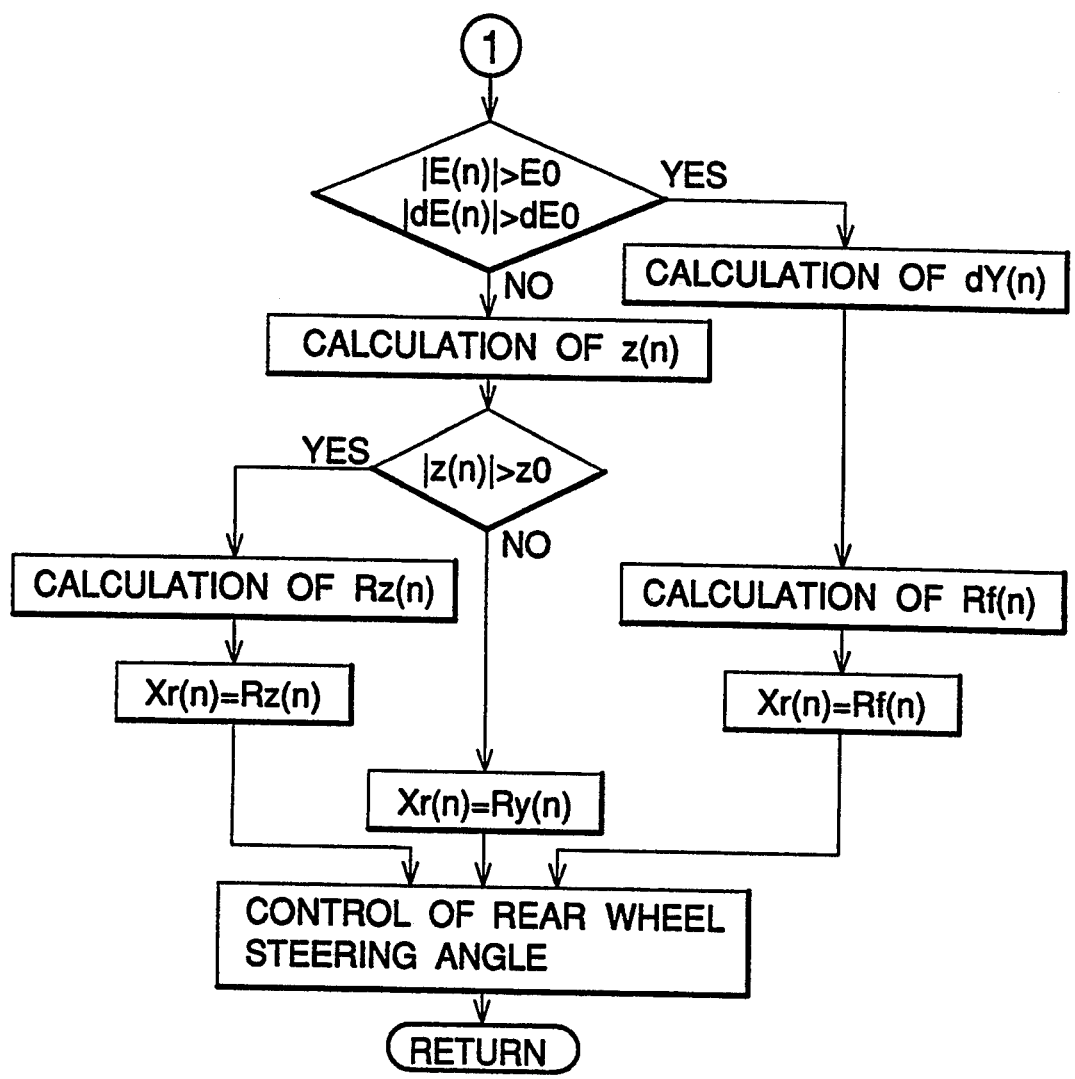
Figure 12:
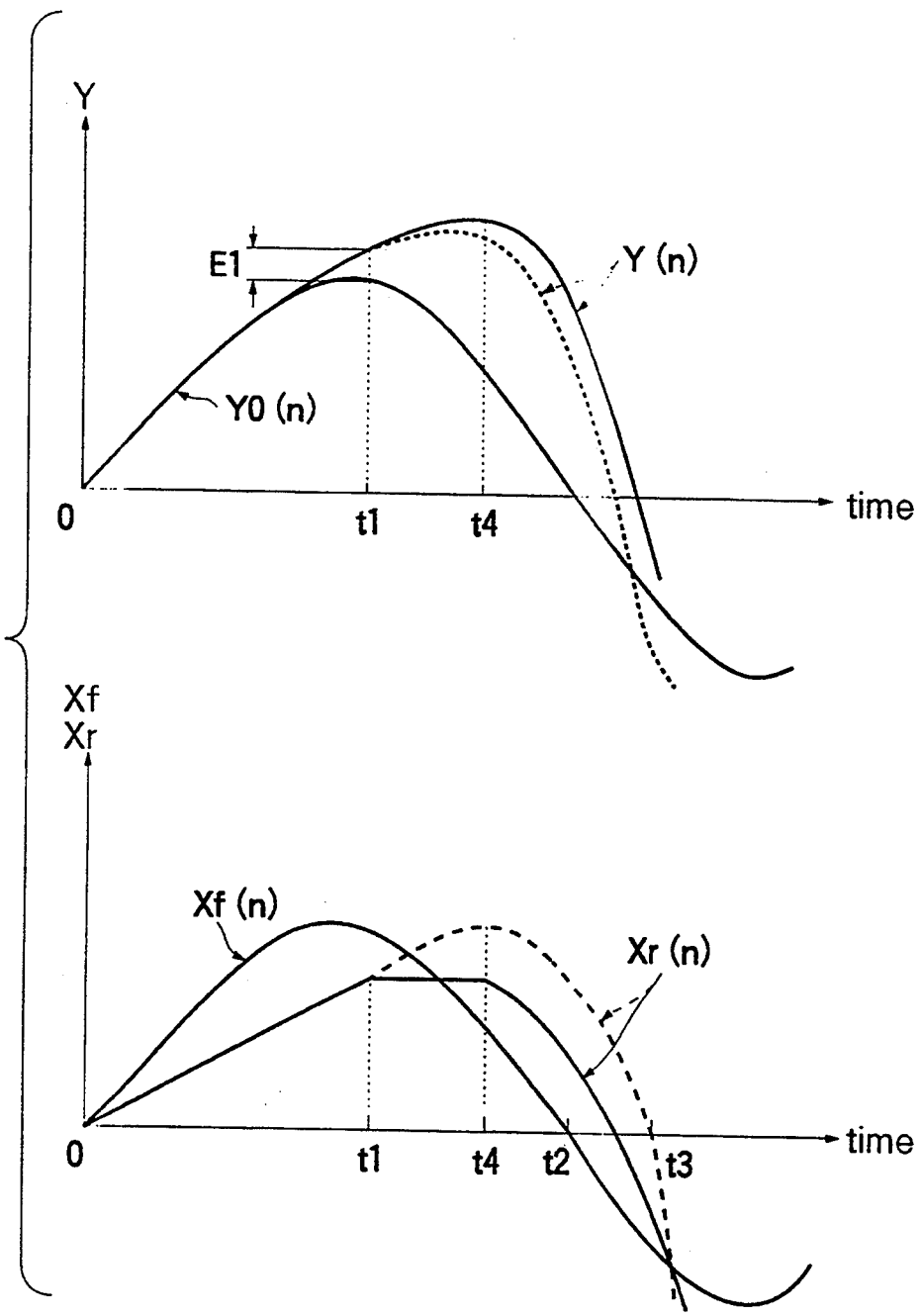
FIG. 12 is a graph showing the relationship between a detected yaw rate and a target yaw rate, and a steering angle of front wheels and time.

FIG. 11 is a flow chart showing a further embodiment of the steering angle control of rear wheels 3, 3 effected by the thus constituted control unit 29 and FIG. 12 is a graph showing the relationship between the target yaw rate Yo(n) and the detected yaw rate Y(n), and the steering angle Xf(n) of the front wheels 2, 2 and time.

Referring to FIG. 11, the control unit 29 receives the vehicle speed V(n) detected by the vehicle speed sensor 40, the steering angle Xf(n) of the front wheels 2, 2 detected by the steering angle sensor 41, the detected yaw rate Y(n) detected by the yaw rate sensor 42 and the lateral acceleration GL(n) detected by the lateral acceleration sensor 43.

Similarly to the previous embodiments, the yaw rate feedback control means 30 calculates a target yaw rate Yo(n) in the current control cycle in accordance with the formula (2) and further calculates the deviation E(n) between the thus calculated target yaw rate Yo(n) and the detected yaw rate Y(n) input from the yaw rate sensor 42 in accordance with the formula (3). Further, the yaw rate feedback control means 30 calculates a yaw rate feedback control value Ry(n) in the current control cycle in accordance with the formula (4).

The thus calculated yaw rate feedback control value Ry(n) and the deviation E(n) are output to the control mode selection means 33 and the deviation E(n) is also output to the steering angle restricting means 35.

The steering angle restricting means 35 judges whether or not the absolute value of the deviation E(n) is greater than a predetermined value E1.

When the result of this judgment is YES, the steering angle restricting means 35 further judges whether or not the absolute value of the steering angle Xf(n) of the front wheels 2, 2 input from the steering angle sensor 41 is smaller than the absolute value of the steering angle Xf(n−1) of the front wheels 2, 2 in the preceding control cycle, namely, whether or not the steering wheel 1 has been turned back.

When the result of this judgment is YES, namely, when the steering angle restricting means 35 judges that the steering wheel 1 has been turned back, it further judges whether or not the absolute value of the detected yaw rate Y(n) input from the yaw rate sensor 42 is greater than the absolute value of the detected yaw rate Y(n−1) input in the preceding control cycle, namely, whether the absolute value of the detected yaw rate Y is increasing.

When the result of this judgment is YES, it can be considered that after the steering wheel 1 was turned in one direction and the target yaw rate Yo(n) and the detected yaw rate Y(n) began to increase, the steering wheel 1 was turned back in the other direction and the target yaw rate Yo(n) has begun to decrease but the detected yaw rate Y(n) is still increasing due to the delay of control so that the absolute value of the deviation E(n) between the target yaw rate Yo(n) and the detected yaw rate Y(n) is greater than the predetermined value E1 and is further increasing. This state can be considered to correspond to the state at time t1 in FIG. 12.

Under this state, if the steering angle Xr(n) of the rear wheels 3, 3 is controlled so as to become equal to the yaw rate feedback control value Ry(n), the side slip angle control value Rz(n) or the fuzzy control value Rf(n) calculated by the yaw rate feedback control means 30, the side slip angle control means 31 or the fuzzy control means 32, which is ever selected by the control mode selecting means 33 in accordance with the driving conditions, the rear wheels 3, 3 will be excessively steered in the same phase as the front wheels 2, 2 as indicated by a dotted line in FIG. 12 and, as a result, since the phase of the steering angle Xr(n) of the rear wheels 2, 2 and that of the front wheels 2, 2 are reverse to each other during time period from the time t2 when the sign of the steering angle Xf(n) of the front wheels 2, 2 changes to the time t3 when the sign of the steering angle Xr(n) of the rear wheels 3, 3 changes after the detected yaw rate Y(n) went over its peak value and began to decrease, there is a considerable risk that the yaw will be suddenly and greatly changed and that the driving stability will be lowered.

So, in this embodiment, the steering angle restricting means 35 outputs a steering angle restriction signal to the motor 24 for fixing the steering angle Xr(n) of the rear wheels 3, 3 in the current control cycle to the steering angle Xr(n−1) of the rear wheels 3, 3 input from the yaw rate feedback control means 30, the side slip angle control means 31 or the fuzzy control means 32, whichever is selected by the control mode selection means 33, and stored therein in the preceding control cycle so that the rear wheels 3, 3 can be prevented from being excessively steered in the same direction as the front wheels 2, 2. As a result, the steering angle Xr(n) of the rear wheels 3, 3 is fixed to be constant from the time t1, as indicated by a solid line in FIG. 12.

On the other hand, when the absolute value of the deviation E(n) is not greater than the predetermined value E1 or even if it is if the absolute value of the steering angle Xf(n) of the front wheels 2, 2 is equal to or greater than the absolute value of the steering angle Xf(n−1) of the front wheels 2, 2 in the preceding control cycle and it is judged that the steering wheel 1 has not been turned back, the steering angle restricting means 35 does not output the steering angle restriction signal but outputs the yaw rate feedback control signal, the side slip angle control signal or the fuzzy control signal input from the yaw rate feedback control means 30, the side slip angle control means 31 or the fuzzy control means 32 which is selected by the control mode selecting means 33 to the motor 24.

On the contrary, even though the absolute value of the deviation E(n) is greater than the predetermined value E1 and it is judged that the steering wheel 1 has been turned back since the absolute value of the steering angle Xf(n) of the front wheels 2, 2 is smaller than the absolute value of the steering angle Xf(n−1) of the front wheels 2, 2 in the preceding control cycle, when the absolute value of the detected yaw rate Y(n) is not greater than the absolute value of the detected yaw rate Y(n−1) input in the preceding control cycle, it can be considered that the vehicle is being driven in the state where, owing to the fact that the steering wheel 1 has been turned back, the detected yaw rate Y(n) has reached its peak value and the absolute value thereof is not increasing. This state corresponds to the state at the time t4 in FIG. 12. Since it should be considered that this shows that the steering angle Xr(n) of the rear wheels 3, 3 will be controlled by the yaw rate feedback control means 30 in a short time, even though the control mode selection means 33 has selected the side slip angle control means 31 or the fuzzy control means 32 and the steering angle restricting means 35 has received the side slip angle control signal or the fuzzy control signal, the control mode selection means 33 causes the yaw rate feedback control means 30 to output the yaw rate feedback control signal and outputs it to the motor for preventing the steering angle Xr(n) of the rear wheels 3, 3 from being suddenly and greatly changed when the yaw rate feedback control is effected, thereby to prevent the driving stability from being lowered.

When the absolute value of the deviation E(n) is not greater than the predetermined value E1 or even if it is if the absolute value of the steering angle Xf(n) of the front wheels 2, 2 is equal to or greater than the absolute value of the steering angle Xf(n−1) of the front wheels 2, 2 in the preceding control cycle and it is judged that the steering wheel 1 has not been turned back, the control mode selection means 33 calculates the rate of change dE(n) in the deviation E(n) and judges whether or not the absolute value of the deviation E(n) is greater than a predetermined value E0 which is smaller than the predetermined value E1 and the rate of change dE(n) in the deviation E(n) is greater than a predetermined value dE0 for determining whether the steering angle Xr(n) of the rear wheels 3, 3 should be controlled by the yaw rate feedback control means 30, the side slip angle control means 31 or the fuzzy control means 32.

When the result of this judgment is YES, namely, when the absolute value of the deviation E(n) is greater than the predetermined value E0 and the absolute value of the rate of change dE(n) in the deviation E(n) is greater than the predetermined value dE0, it can be considered that the vehicle is being driven in a state corresponding to the area S3 in FIG. 4 where the vehicle is being turned extremely sharply and there is a considerable risk of excessive over-steering, so that the driving condition of the vehicle is unstable. Therefore, similarly to the embodiment shown in FIG. 3, the control mode selection means 33 outputs a control effecting signal to the fuzzy control means 32 for controlling the steering angle Xr(n) of the rear wheels 3, 3 based upon fuzzy control.

When the fuzzy control means 32 receives the control effecting signal from the control mode selection means 33, similarly to the embodiment shown in FIG. 3, it calculates the rate of change dY(n) in the detected yaw rate Y(n) and further calculates a fuzzy control value Rf(n) based on a membership function which is experimentally determined so as to reduce the absolute value of the rate of change dY(n) in the detected yaw rate Y(n) and which depends upon the deviation E(n) and the rate dE(n) of change in accordance with the formula (5). Then, the fuzzy control means 32 outputs a fuzzy control signal to the motor 24, thereby controlling the steering angle Xr(n) of the rear wheels 3, 3 so that the steering angle Xr(n) of the rear wheels 3, 3 becomes equal to the fuzzy control value Rf(n) and the absolute value of the rate of change dY(n) in the detected yaw rate Y(n) is reduced.

On the contrary, when the absolute value of the deviation E(n) is not greater than a predetermined value E0 or when the absolute value of the rate of change dE(n) in the deviation E(n) is not greater than a predetermined value dE0, the control mode selection means 33 judges whether or not the absolute value of the estimated value z(n) of the side slip angle input from the side slip angle calculating means 34 is greater than a predetermined value z0.

When the result of this judgment is YES, namely, when the absolute value of the estimated value z(n) of the side slip angle is greater than a predetermined value z0, since it can be considered that the vehicle is being driven in a state corresponding to the area S2 in FIG. 4, the control mode selection means outputs a control effecting signal to the side slip angle control means 31, thereby to cause the side slip angle control means 31 to control the steering angle Xr(n) of the rear wheels 3, 3.

When the side slip angle control means 31 receives the control effecting signal from the control mode selection means 33, similarly to the embodiment shown in FIG. 3, it calculates the side slip angle control value Rz(n) in accordance with the formula (6) and outputs a side slip angle control signal to the motor 24 so that the steering angle Xr(n) of the rear wheels 3, 3 becomes equal to the side slip angle control value Rz(n) and the absolute value of the estimated value of the side slip angle z(n) is reduced. Therefore, in the state where the turning radius of the vehicle is large and the yaw rate Y(n) is low, it is possible to prevent the rear wheels 3, 3 from being steered in the reverse phase with respect to that of the front wheels 2, 2 and reliably prevent the driving stability from being lowered.

On the contrary, when the absolute value of the estimated value z(n) of the side slip angle is not greater than the predetermined value z0, since it can be considered that the vehicle is being driven in a state corresponding to the area S1 shown in FIG. 4 where the tire cornering force C.F. is substantially proportional to the absolute value of the estimated value z(n) of the side slip angle and that the driving condition is stable, the control mode selection means 33 outputs a control effecting signal to the yaw rate feedback control means 30.

When the yaw rate feedback control means 30 receives the control effecting signal from the control mode selection means 33, it outputs a yaw rate feedback control signal to the motor 24, thereby controlling the steering angle Xr(n) of the rear wheels 3, 3 so as to become equal to the yaw rate feedback control value Ry(n) calculated in accordance with the formula (4).

The above described control is repeated at predetermined time intervals and the rear wheels 3, 3 are steered accordingly.

According to this embodiment, since the rear wheels 3, 3 are steered by the yaw rate feedback control means 30 in the stable driving state corresponding to the area S1 so as to make the detected yaw rate Y(n) become equal to the target yaw rate Yo(n) determined based upon the steering angle of the steering wheel 1, it is possible to steer the rear wheels 3, 3 in a desired manner. On the other hand, since the rear wheels 3, 3 are steered by the side slip angle control means 31 in the state where the estimated absolute value z(n) of the side slip angle is greater than the predetermined value z0 and the vehicle is being sharply turned and subjected to a large lateral acceleration GL(n), in such a manner that the greater the estimated absolute value z(n) of the side slip angle is, the more the rear wheels 3, 3 are steered in the same phase as that of the front wheels 2, 2, namely, in the same direction as that of the front wheels 2, 2 with respect to the longitudinal center line of the vehicle, it is possible to prevent the rear wheels 3, 3 from being steered in the reverse phase with respect to that of the front wheels 2, 2 by the yaw rate feedback control means 30 and to prevent the driving stability from being lowered. Furthermore, in the state corresponding to the area S3 where the absolute value of the deviation E(n) between the target yaw rate Yo(n) and the detected yaw rate Y(n) is greater than the predetermined value E0 and the rate of change dE(n) in the deviation E(n) is greater than the predetermined value dE0, in other words, when the vehicle is turning extremely sharply and there is considerable risk of excessive oversteering, since the rear wheels 3, 3 are steered by the fuzzy control means 32 so as to reduce the rate of change dY(n) in the detected yaw rate Y(n), it is possible to improve the driving stability even in this unstable state without a large computer. Moreover, if after the steering wheel 1 is once turned in one direction and the absolute values of the target yaw rate Yo(n) and the detected yaw rate Y(n) begin to increase, the steering wheel 1 is turned back in the other direction, the absolute value of the target yaw rate Yo(n) will begin to decrease but the absolute value of the detected yaw rate Y(n) will continue to increase due to the delay of control so that the absolute value of the deviation E(n) between the target yaw rate Yo(n) and the detected yaw rate Y(n) will be greater than the predetermined value E1 and still be further increasing. In such a situation, if the steering angle Xr(n) of the rear wheels 3, 3 is controlled so as to make it equal to the yaw rate feedback control value Ry(n), the side slip angle control value Rz(n) or the fuzzy control value Rf(n) calculated by the yaw rate feedback control means 30, the side slip angle control means 31 or the fuzzy control means 32, whichever is selected by the control mode selection means 33 in accordance with the driving conditions, the rear wheels 3, 3 will be excessively steered in the same phase as that of the front wheels 2, 2 and, as a result, since the phase of the steering angle Xr(n) of the rear wheels 2, 2 and that of the front wheels 2, 2 will be reverse to each other during the time period from the time t2 when the sign of the steering angle Xf(n) of the front wheels 2, 2 changes to the time t3 when the sign of the steering angle Xr(n) of the rear wheels 3, 3 changes after the absolute value of the detected yaw rate Y(n) goes over its peak value and begins to decrease, there is a considerable risk that the yaw will be suddenly and greatly changed and that the driving stability will be lowered. According to this embodiment, however, since the steering angle Xr(n) of the rear wheels 3, 3 is fixed to the steering angle Xr(n−1) of the rear wheels in the preceding control cycle, this problem can be effectively solved. Further, after the steering angle Xr(n) has started to be restricted in the above described manner, when the absolute value of the detected yaw rate Y(n) increases and it is judged that the yaw rate feedback control will be started in a short time, since the yaw rate feedback control is immediately carried out irrespective of the judgment of the control mode selection means 33, it is possible to prevent the steering angle Xr(n) of the rear wheels 3, 3 from being suddenly and greatly changed when the yaw rate feedback control is started, thereby to prevent the driving stability from being lowered.

Figure 13B:
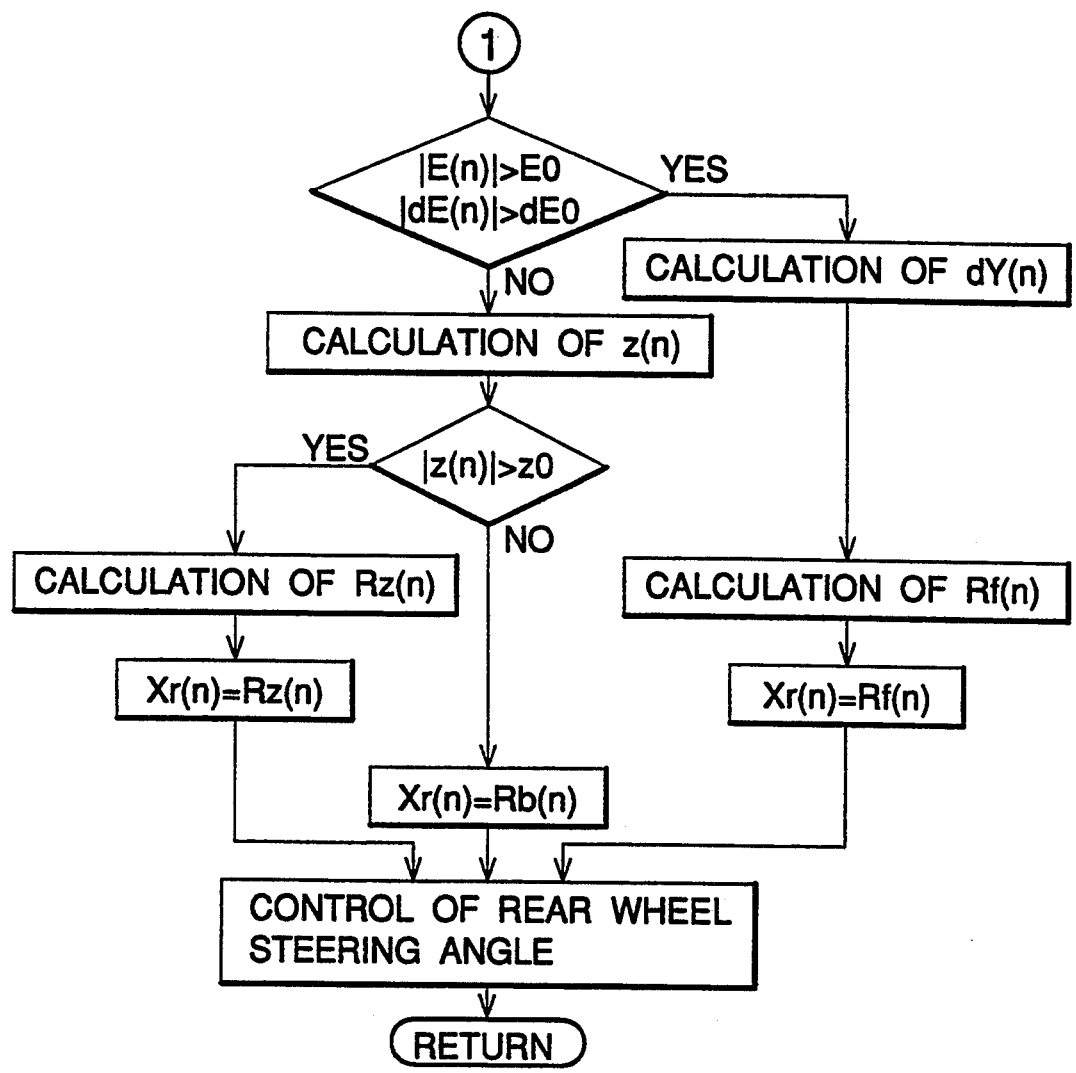

FIG. 13 is a flow chart showing a further embodiment of the steering angle control of rear wheels effected by a control unit of a rear wheels steering system according to the present invention.

In this embodiment, similarly to the embodiment shown in FIG. 10, the control unit 29 comprises the yaw rate feedback control means 30, the side slip angle control means 31, the fuzzy control means 32, the control mode selection means 33, the side slip angle calculating means 34 and the steering angle restricting means 35, and receives detection signals from the vehicle speed sensor 40 for detecting the vehicle speed V, the steering angle sensor 41 for detecting the steering angle of the steering hand wheel 1, namely, the steering angle Xf of the front wheels 2, 2, the yaw rate sensor 42 for detecting the yaw rate Y of the vehicle and the lateral acceleration sensor 43 for detecting the lateral acceleration GL applied to the vehicle laterally.

The yaw rate feedback control means 30, the side slip angle control means 31, the fuzzy control means 32 and the side slip angle calculating means 34 are constituted similarly to the embodiment shown in FIG. 10.

The control mode selection means 33 is constituted similarly to the previous embodiments.

The steering angle restricting means 35 is constituted so that when it judges based upon the steering angle Xf(n) of the front wheels 2, 2 that the steering wheel 1 has been turned back and also judges that the absolute value of the detected yaw rate Y(n) is increasing, it calculates the rate of change dE(n) in the deviation E(n) based upon the deviation E(n) between the target yaw rate Yo(n) and the detected yaw rate Y(n) input from the yaw rate feedback control means 30 and when it judges that the absolute value of the deviation E(n) is greater than a predetermined value E2 and the absolute value of the rate of change dE(n) in the deviation E(n) is greater than a predetermined value dE1, it outputs a steering angle restriction signal to the motor for restricting the steering angle Xr(n) of the rear wheels 3, 3 to make the amount of the steering of the rear wheels 3, 3 become maximum so as to reduce the absolute value of the detected yaw rate Y(n). On the other hand, when the absolute value of the detected yaw rate Y(n) is not increasing, when the steering wheel 1 has not been turned back although the absolute value of the detected yaw rate Y(n) is increasing, when the absolute value of the deviation E(n) is not greater than the predetermined value E2 although the absolute value of the detected yaw rate Y(n) is increasing and the steering wheel 1 has been turned back, or when the absolute value of the rate of change dE(n) in the deviation E(n) is not greater than the predetermined value dE1 although the absolute value of the detected yaw rate Y(n) is increasing, the steering wheel 1 has been turned back and the absolute value of the deviation E(n) is greater than the predetermined value E2, if the steering angle restriction signal was not output in the preceding control cycle, the steering angle restricting means 35 outputs to the motor 24 the yaw rate feedback control signal, the side slip angle control signal or the fuzzy control signal input from whichever the control means is selected by the control mode selection means 33, whereas when the steering angle restriction signal was output in the preceding control cycle and the absolute value of the detected yaw rate Y(n) is not increasing, it causes the yaw rate feedback control means 30 to output the yaw rate feedback control signal and outputs it to the motor 24 even if the side slip angle control means 31 or the fuzzy control means 32 has been selected by the control mode selection means 33 and the side slip angle control signal or the fuzzy control signal has been input.

Referring to FIG. 13, similarly to the embodiment shown in FIG. 11, the control unit 29 receives the vehicle speed $V(n)$ detected by the vehicle speed sensor 40, the steering angle $Xf(n)$ of the front wheels 2, 2 detected by the steering angle sensor 41, the detected yaw rate $Y(n)$ detected by the yaw rate sensor 42 and the lateral acceleration $GL(n)$ detected by the lateral acceleration sensor 43 and the yaw rate feedback control means 30 calculates a target yaw rate $Yo(n)$ in the current control cycle in accordance with the formula (2).

Then, the yaw rate feedback control means 30 calculates the deviation $E(n)$ between the thus calculated target yaw rate $Yo(n)$ and the detected yaw rate $Y(n)$ input from the yaw rate sensor 42 in accordance with the formula (3) and further calculates a yaw rate feedback control value $Ry(n)$ in the current control cycle in accordance with the formula (4).

The thus calculated yaw rate feedback control value $Ry(n)$ and the deviation $E(n)$ are output to the control mode selection means 33 and the deviation $E(n)$ is also output to the steering angle restricting means 35.

The steering angle restricting means 35 judges whether or not the absolute value of the detected yaw rate $Y(n)$ input from the yaw rate sensor 42 is greater than the detected yaw rate $Y(n-1)$ input in the preceding control cycle, namely, whether or not the absolute value of the detected yaw rate $Y(n)$ is increasing and has not reached its peak value $Ymax$.

When the result of this judgment is YES, the steering angle restricting means 35 further judges whether or not the absolute value of the steering angle $Xf(n)$ of the front wheels 2, 2 input from the steering angle sensor 41 is smaller than the absolute value of the steering angle $Xf(n-1)$ of the front wheels 2, 2 input in the preceding control cycle, namely, whether or not the steering wheel 1 has been turned back.

When the result of this judgment is YES, namely, when the steering angle restricting means 35 judges that the steering wheel 1 has been turned back, it further judges whether or not the absolute value of the deviation $E(n)$ is greater than the predetermined value $E2$.

When the result of this judgment is YES, the steering angle restricting means 35 calculates the rate of change $dE(n)$ in the deviation $E(n)$ and judges whether or not the absolute value of the rate of change $dE(n)$ in the deviation $E(n)$ is greater than the predetermined value $dE1$.

Figure 14:
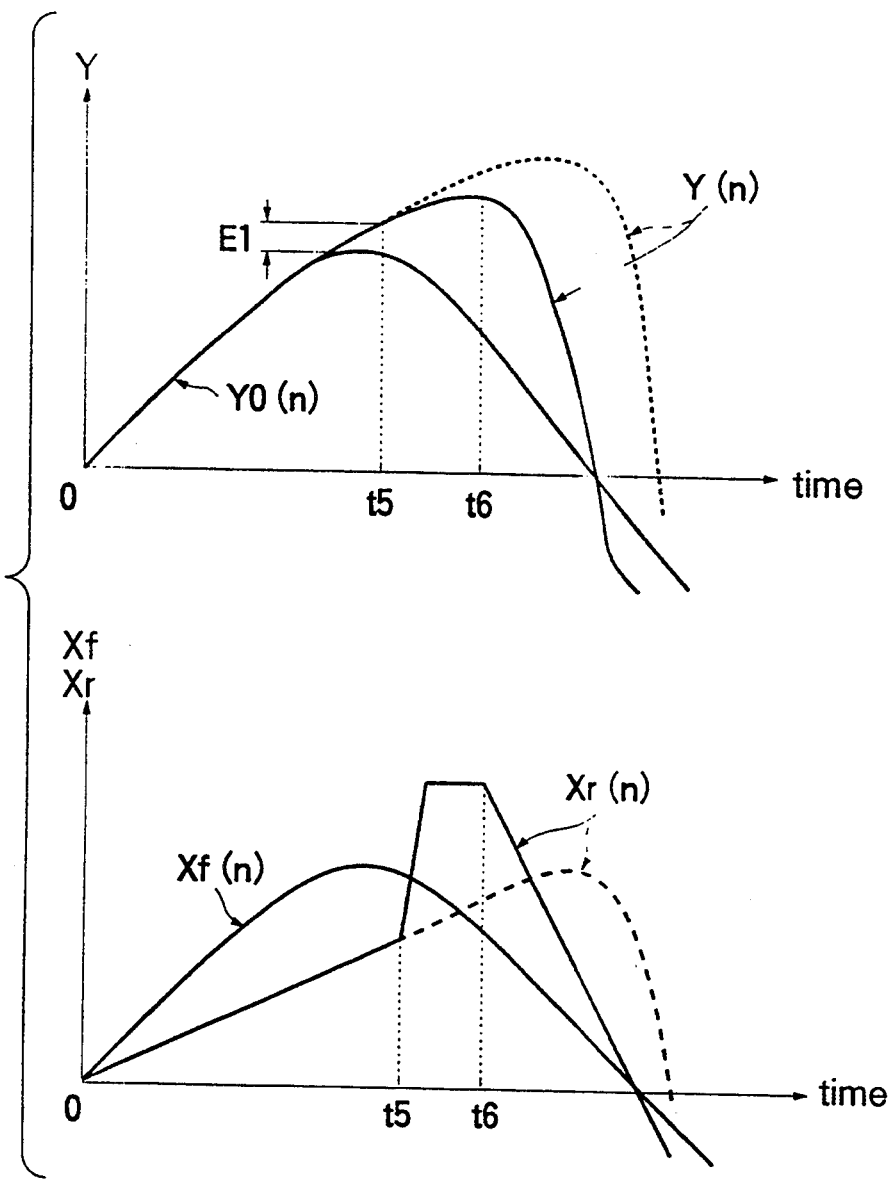
FIG. 14 is a graph showing the relationship between a detected yaw rate and a target yaw rate, and a steering angle of front wheels and time.

When YES, it can be considered that the vehicle is being driven in the state where after the steering wheel 1 was turned in one direction and the absolute values of the target yaw rate $Yo(n)$ and the detected yaw rate $Y(n)$ began to increase, the steering wheel 1 has been turned back in the other direction and the absolute value of the target yaw rate $Yo(n)$ has begun to decrease but the absolute value of the detected yaw rate $Y(n)$ is still increasing due to the delay of control so that the absolute value of the deviation $E(n)$ between the target yaw rate $Yo(n)$ and the detected yaw rate $Y(n)$ is greater than the predetermined value $E1$ and the absolute value of the rate of change $dE(n)$ in the deviation $E(n)$ is greater than the predetermined value $dE1$. In this state, the absolute value of the deviation $E(n)$ between the target yaw rate $Yo(n)$ and the detected yaw rate $Y(n)$ varies suddenly and greatly and there is a considerable risk of oversteering. FIG. 14 is a graph showing the relationship between the target yaw rate $Yo(n)$, the detected yaw rate $Y(n)$, the steering angle $Xf(n)$ of the front wheels 2, 2 and time. The aforesaid state corresponds to the state at the time t5 in FIG. 14.

Under such state, if the steering angle $Xr(n)$ of the rear wheels 3, 3 is controlled so as to become equal to the yaw rate feedback control value $Ry(n)$, the side slip angle control value $Rz(n)$ or the fuzzy control value $Rf(n)$ calculated by the yaw rate feedback control means 30, the side slip angle control means 31 or the fuzzy control means 32, whichever is selected by the control mode selection means 33 in accordance with the driving conditions, the steering angle $Xr(n)$ of the rear wheels 3, 3 and the detected yaw rate $Y(n)$ will be changed as indicated by the dot wave in FIG. 14 and since the amount of steering of the rear wheels 3, 3 in the same phase as that of the front wheels 2, 2 is relatively small, there will be a considerable risk of oversteering and it will be very difficult to prevent the driving stability from being lowered.

Therefore, in this embodiment, the steering angle restricting means 35 outputs a steering angle restriction signal to the motor 24 for steering the rear wheels 3, 3 so that the amount of steering of the rear wheels 3, 3 becomes maximum so as to decrease the absolute value of the detected yaw rate $Y(n)$, thereby preventing excessive oversteering. As a result, the steering angle $Xr(n)$ of the rear wheels 3, 3 is controlled so as to become great suddenly from the time t5 and the detected yaw rate $Y(n)$ is decreased as indicated by the solid wave in FIG. 14.

On the other hand, when the steering angle restriction signal has been output and the absolute value of the detected yaw rate $Y(n)$ is not increasing, it can be considered that the steering angle $Xr(n)$ of the rear wheels 3, 3 was controlled by the steering angle restricting means 35 but as a result of the steering wheel 1 having been turned back, the absolute value of the detected yaw rate $Y(n)$ has gone over its peak value and begun to decrease, namely, that the vehicle is being driven in the state at the time t6 in FIG. 14. Since this means that the yaw rate feedback control will be started in a short time, the steering angle restricting means 35 causes the yaw rate feedback control means 30 to output the yaw rate feedback control signal and outputs it to the motor 24 for preventing the driving stability from being lowered by preventing the steering angle $Xr(n)$ of the rear wheels 3, 3 from being suddenly and greatly changed on starting the yaw rate feedback control so that the steering angle $Xr(n)$ of the rear wheels 3, 3 is controlled so as to become equal to the yaw rate feedback control value $Ry(n)$, even if the side slip angle control means 31 or the fuzzy control means 32 has been selected by the control mode selection means 33 and the side slip angle control signal or the fuzzy control signal has been input.

On the contrary, when the absolute value of the detected yaw rate $Y(n)$ is not increasing, when the steering wheel 1 has not been turned back although the absolute value of the detected yaw rate $Y(n)$ is increasing, when the absolute value of the deviation $E(n)$ is not greater than the predetermined value $E2$ although the absolute value of the detected yaw rate $Y(n)$ is increasing and the steering wheel 1 has been turned back or when the absolute value of the rate of change $dE(n)$ in the deviation $E(n)$ is not greater than the predetermined value $dE1$ although the absolute value of the detected yaw rate $Y(n)$ is increasing, the steering wheel 1 has been turned back and the absolute value of the deviation E(n) is greater than the predetermined value E2, if the steering angle restriction signal was not output in the preceding control cycle, the control mode selection means 33 judges whether or not the absolute value of the deviation E(n) is greater than the predetermined value E0 which is smaller than the predetermined value E2 and if the absolute value of the rate of change dE(n) in the deviation E(n) is greater than the predetermined value dE0 which is smaller than the predetermined value dE1, for selecting the control means for controlling the steering angle Xr(n) of the rear wheels 3, 3 from among the yaw rate feedback control means 30, the side slip angle control means 31 and the fuzzy control means 32.

When the result of this judgment is YES, namely, when the absolute value of the deviation E(n) is greater than the predetermined value E0 and the absolute value of the rate of change dE(n) in the deviation E(n) is greater than the predetermined value dE0, it can be considered that the vehicle is being driven in a state corresponding to the area S3 in FIG. 4 where the vehicle is being turned extremely sharply and there is a considerable risk of excessive over-steering, so that the driving condition of the vehicle is unstable. Therefore, similarly to the embodiment shown in FIG. 3, the control mode selection means 33 outputs a control effecting signal to the fuzzy control means 32 for controlling the steering angle Xr(n) of the rear wheels 3, 3 based upon the fuzzy control. The reason why the predetermined value dE0 is set smaller than the predetermined value dE1 is that since it is difficult by selection of a particular membership function to prevent the vehicle from being excessively oversteered and to improve the driving stability on roads with greatly differing road surface friction coefficients, the aforesaid predetermined values are selected such that when the vehicle is making frequent and sharp turns on a road with a low road surface friction coefficient, the vehicle can be prevented from being excessively oversteered by the steering angle restricting means 35, and when the vehicle is making frequent and sharp turns on a road with a medium or higher road surface friction coefficient, the vehicle can be prevented from being oversteered by the fuzzy control means 32.

When the fuzzy control means 32 receives the control effecting signal from the control mode selection means 33, it calculates the rate of change dY(n) in the detected yaw rate Y(n) and further calculates a fuzzy control value Rf(n) based on a membership function which is experimentally determined so as to reduce the absolute value of the rate of change dY(n) in the detected yaw rate Y(n) and which depends upon the deviation E(n) and the rate of change dE(n) in accordance with the formula (5). Then, the fuzzy control means 32 outputs a fuzzy control signal to the motor 24, thereby controlling the steering angle Xr(n) of the rear wheels 3, 3 so that the steering angle Xr(n) of the rear wheels 3, 3 becomes equal to the fuzzy control value Rf(n) and the rate of change in the detected yaw rate Y(n) is reduced.

On the contrary, when the absolute value of the deviation E(n) is not greater than a predetermined value E0 or when the absolute value of the rate dE(n) of change in the deviation E(n) is not greater than a predetermined value dE0, the control mode selection means 33 judges whether or not the absolute value of the estimated value z(n) of the side slip angle input from the side slip angle calculating means 34 is greater than a predetermined value z0.

When the result of this judgment is YES, namely, when the absolute value of the estimated value z(n) of the side slip angle is greater than a predetermined value z0, since it can be considered that the vehicle is being driven in a state corresponding to the area S2 in FIG. 4, the control mode selection means outputs a control effecting signal to the side slip angle control means 31, thereby to cause the side slip angle control means 31 to control the steering angle Xr(n) of the rear wheels 3, 3.

When the side slip angle control means 31 receives the control effecting signal from the control mode selection means 33, similarly to the embodiment shown in FIG. 3, it calculates the side slip angle control value Rz(n) in accordance with the formula (6) and outputs a side slip angle control signal to the motor 24 so that the steering angle Xr(n) of the rear wheels 3, 3 becomes equal to the side slip angle control value Rz(n) and the absolute value of the estimated value of the side slip angle z(n) is reduced. Therefore, in the state where the turning radius of the vehicle is large and the yaw rate Y(n) is low, it is possible to prevent the rear wheels 3, 3 from being steered in the reverse phase with respect to that of the front wheels 2, 2 and reliably prevent the driving stability from being lowered.

On the contrary, when the absolute value of the estimated value z(n) of the side slip angle is not greater than the predetermined value z0, since it can be considered that the vehicle is being driven in a state corresponding to the area S1 shown in FIG. 4 where the tire cornering force C.F. is substantially proportional to the absolute value of the estimated value z(n) of the side slip angle and that the driving condition is stable, the control mode selection means 33 outputs a control effecting signal to the yaw rate feedback control means 30.

When the yaw rate feedback control means 30 receives the control effecting signal from the control mode selection means 33, it outputs a yaw rate feedback control signal to the motor 24, thereby controlling the steering angle Xr(n) of the rear wheels 3, 3 so as to become equal to the yaw rate feedback control value Ry(n) calculated in accordance with the formula (4).

The above described control is repeated at predetermined time intervals and the rear wheels 3, 3 are steered accordingly.

According to this embodiment, since the rear wheels 3, 3 are steered by the yaw rate feedback control means 30 in the stable driving state corresponding to the area S1 so as to make the detected yaw rate Y(n) become equal to the target yaw rate Yo(n) determined based upon the steering angle of the steering wheel 1, it is possible to steer the rear wheels 3, 3 in a desired manner. On the other hand, since the rear wheels 3, 3 are steered by the side slip angle control means 31 in the state where the estimated absolute value z(n) of the side slip angle is greater than the predetermined value z0 and the vehicle is being sharply turned and subjected to a large lateral acceleration GL(n), in such a manner that the greater the estimated absolute value z(n) of the side slip angle is, the more the rear wheels 3, 3 are steered in the same phase as that of the front wheels 2, 2, namely, in the same direction as that of the front wheels 2, 2 with respect to the longitudinal center line of the vehicle, it is possible to prevent the rear wheels 3, 3 from being steered in the reverse phase with respect to that of the front wheels 2, 2 by the yaw rate feedback control means 30 and to prevent the driving stability from being lowered. Furthermore, in the state corresponding to the area S3 where the absolute value of the deviation E(n)

between the target yaw rate Yo(n) and the detected yaw rate Y(n) is greater than the predetermined value E0 and the rate of change dE(n) in the deviation E(n) is greater than the predetermined value dE0, in other words, when the vehicle is turning extremely sharply and there is considerable risk of excessive oversteering, since the rear wheels 3, 3 are steered by the fuzzy control means 32 so as to reduce the rate of change dY(n) in the detected yaw rate Y(n), it is possible to improve the driving stability even in this unstable state without a large computer. Moreover, in the case where when the vehicle is being driven on a road with a low road friction surface coefficient, the absolute value of the deviation E(n) between the target yaw rate Yo(n) and the detected yaw rate Y(n) becomes greater than the predetermined value E2 which is greater than the predetermined value E0 and the absolute value of the rate of change dE(n) in the deviation E(n) becomes greater than the predetermined value dE1 which is greater than the predetermined value dE0, whereby it is difficult to prevent the vehicle from being excessively oversteered by the fuzzy control means 32 which selects the membership function suitable for a road with a medium or greater road surface friction coefficient. However, since the steering angle restricting means 35 controls the steering angle Xr(n) of the rear wheels 3, 3 so that the amount of steering of the rear wheels 3, 3 becomes maximum so as to decrease the absolute value of the detected yaw rate Y(n), it is possible to prevent the vehicle from being excessively oversteered and to improve the driving stability irrespective of the road surface friction coefficients of road. Further, if the absolute value of the detected yaw rate Y(n) has not increased, after the steering angle restricting means 35 starts controlling the steering angle Xr(n) of the rear wheels 3, 3, since it will be judged that the yaw rate feedback control will be started in a short time and the yaw rate feedback control is immediately effected in spite of the judgment of the control mode selection means 33, it is possible to prevent the steering angle Xr(n) of the rear wheels 3, 3 from being suddenly and greatly changed and to prevent the driving stability being lowered when the yaw rate feedback control is started.

Figure 15:
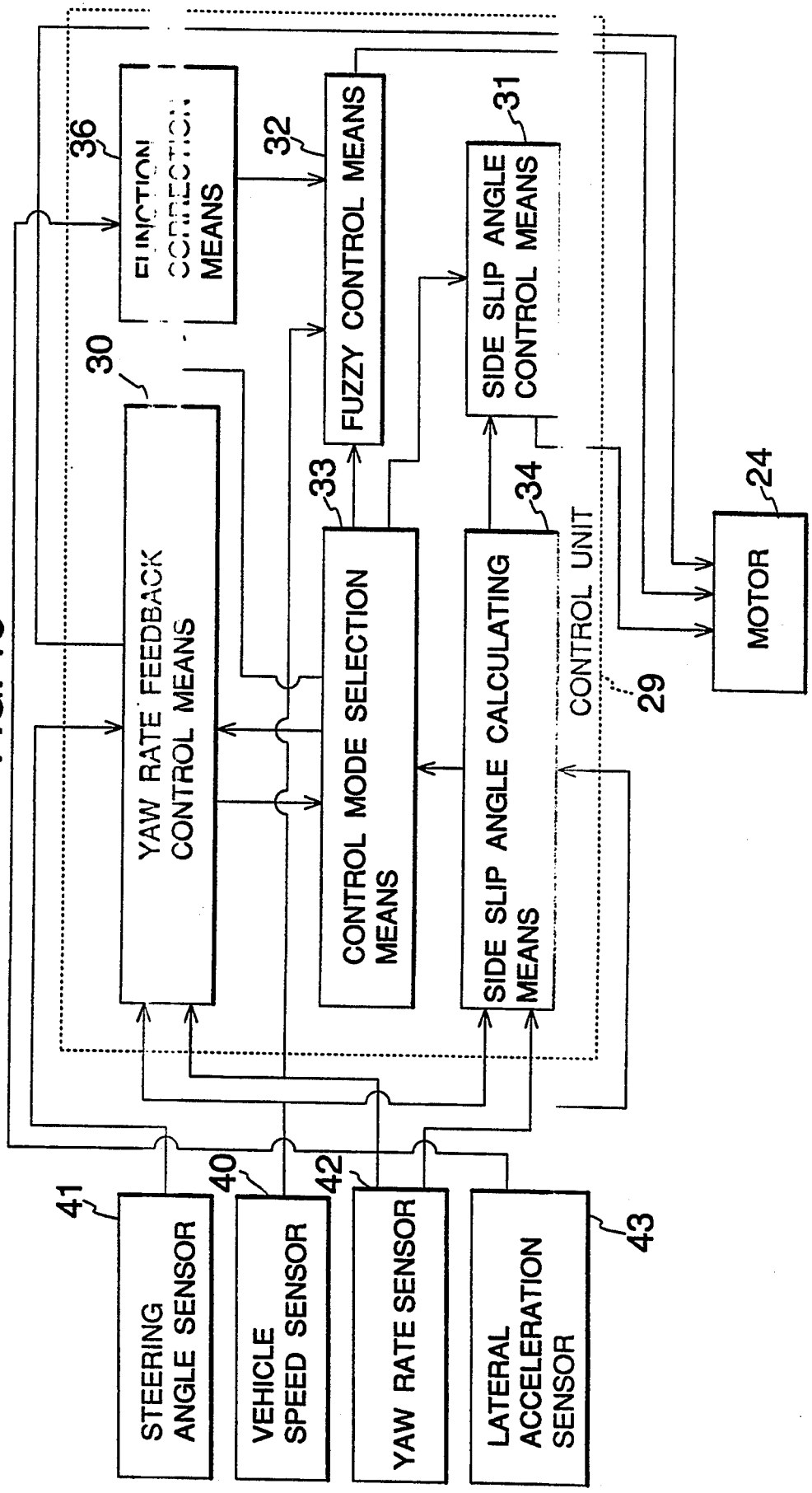
FIG. 15 is a block diagram showing a control unit of a rear wheel steering system which is a further embodiment of the present invention and a detection system provided in a vehicle.

FIG. 15 is a block diagram showing a control unit 29 of a rear wheels steering system which is further embodiment of the present invention and a detection system provided in a vehicle.

Referring to FIG. 15, the control unit 29 comprises a function correcting means 36 in addition to the yaw rate feedback control means 30, the side slip angle control means 31, the fuzzy control means 32, the control mode selection means 33 and the side slip angle calculating means 34, and receives detection signals from the vehicle speed sensor 40 for detecting the vehicle speed V, the steering angle sensor 41 for detecting the steering angle of the steering hand wheel 1, namely, the steering angle Xf of the front wheels 2, 2, the yaw rate sensor 42 for detecting the yaw rate Y of the vehicle and the lateral acceleration sensor 43 for detecting the lateral acceleration GL acting on the vehicle.

In this embodiment, the yaw rate feedback control means 30, the side slip angle control means 31 and the side slip angle calculating means 34 are constituted in the same manner as those in the embodiment shown in FIG. 2.

The control mode selection means 33 is constituted so as to calculate the rate of change dE(n) in the deviation E(n), output a control effecting signal to the fuzzy control means 32 and the function correcting means 36 when the absolute value of the deviation E(n) is greater than the predetermined value E0 and the absolute value of the rate of change dE(n) in the deviation E(n) is greater than the predetermined value dE0, namely, under the state where the vehicle is turning extremely sharply, output a control effecting signal to the side slip angle control means 31 when the absolute value of the deviation E(n) is not greater than the predetermined value E0 and the absolute value of the rate of change dE(n) in the deviation E(n) is not greater than the predetermined value dE0 and when the absolute value of the estimated value z(n) of the side slip angle calculated by the side slip angle calculating means 34 is greater than the predetermined value z0, namely, under the state where the vehicle is turning sharply, and output a control effecting signal to the yaw rate feedback control means 30 in other cases, namely, under the normal turning condition.

The fuzzy control means 32 is constituted so that when the control effecting signal is input thereto from the control mode selection means 33, it calculates the rate dY(n) of change in the detected yaw rate Y(n) input from the yaw rate sensor 42 and also calculates a fuzzy control value Rf(n) in accordance with the membership function and a correction signal input from the function correcting means 36 and outputs the fuzzy control signal for controlling the steering angle Xr(n) of the rear wheels 3, 3 to become equal to the fuzzy control value Rf(n).

The function correcting means 36 is constituted so that when the control effecting signal is input thereto from the control mode selection means 33, it calculates a correction value for correcting the membership function stored in the fuzzy control means 32 based on the lateral acceleration GL(n) input from the lateral acceleration sensor 43 in accordance with maps or tables stored therein and outputs a correction signal to the fuzzy control means 32.

Figures 16, 16A:
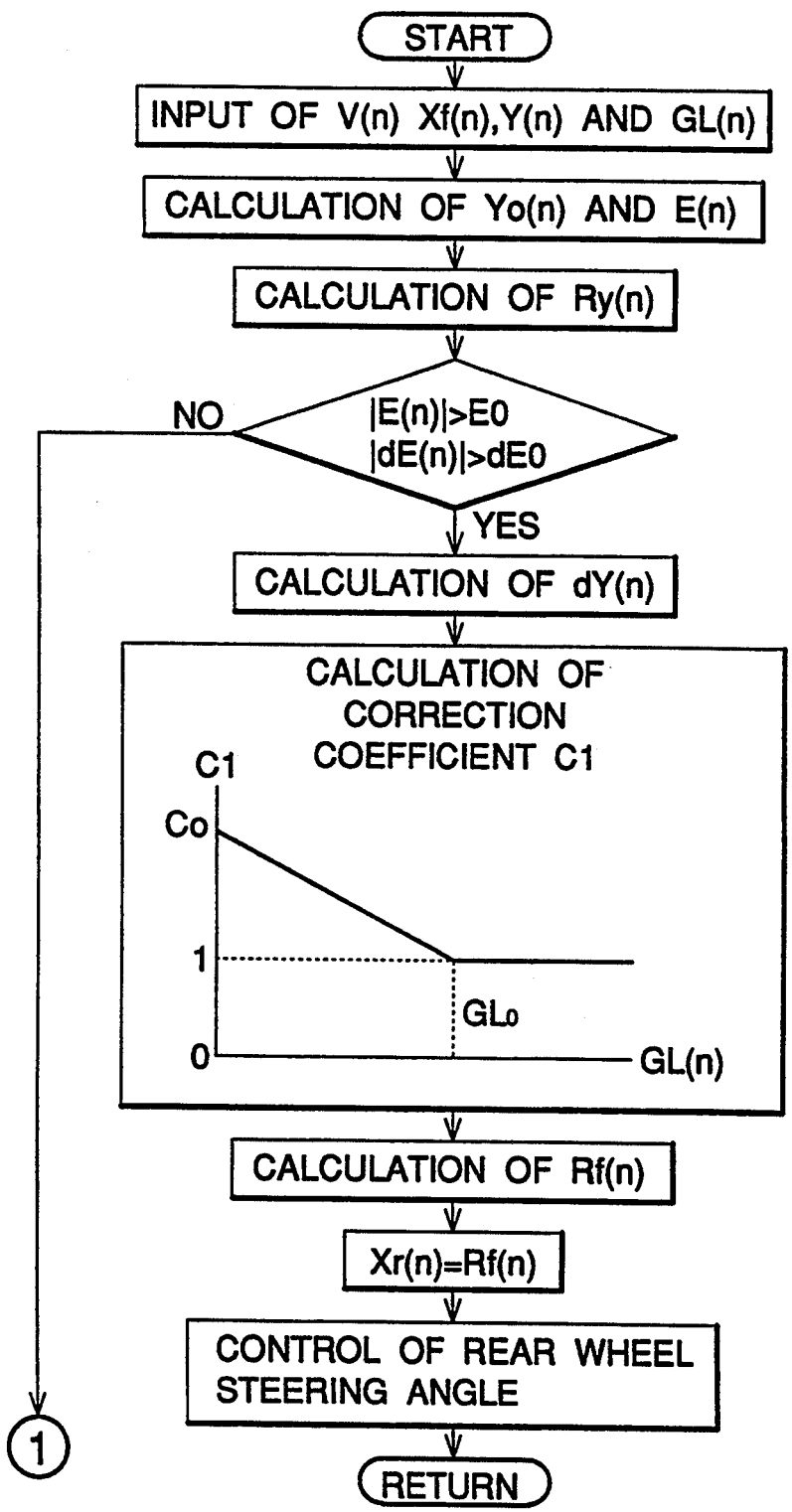
FIGS. 16, 16A-16B is a flow chart showing a further embodiment of the rear wheel steering angle control effected by the control unit shown in FIG. 15.
Figure 16B:
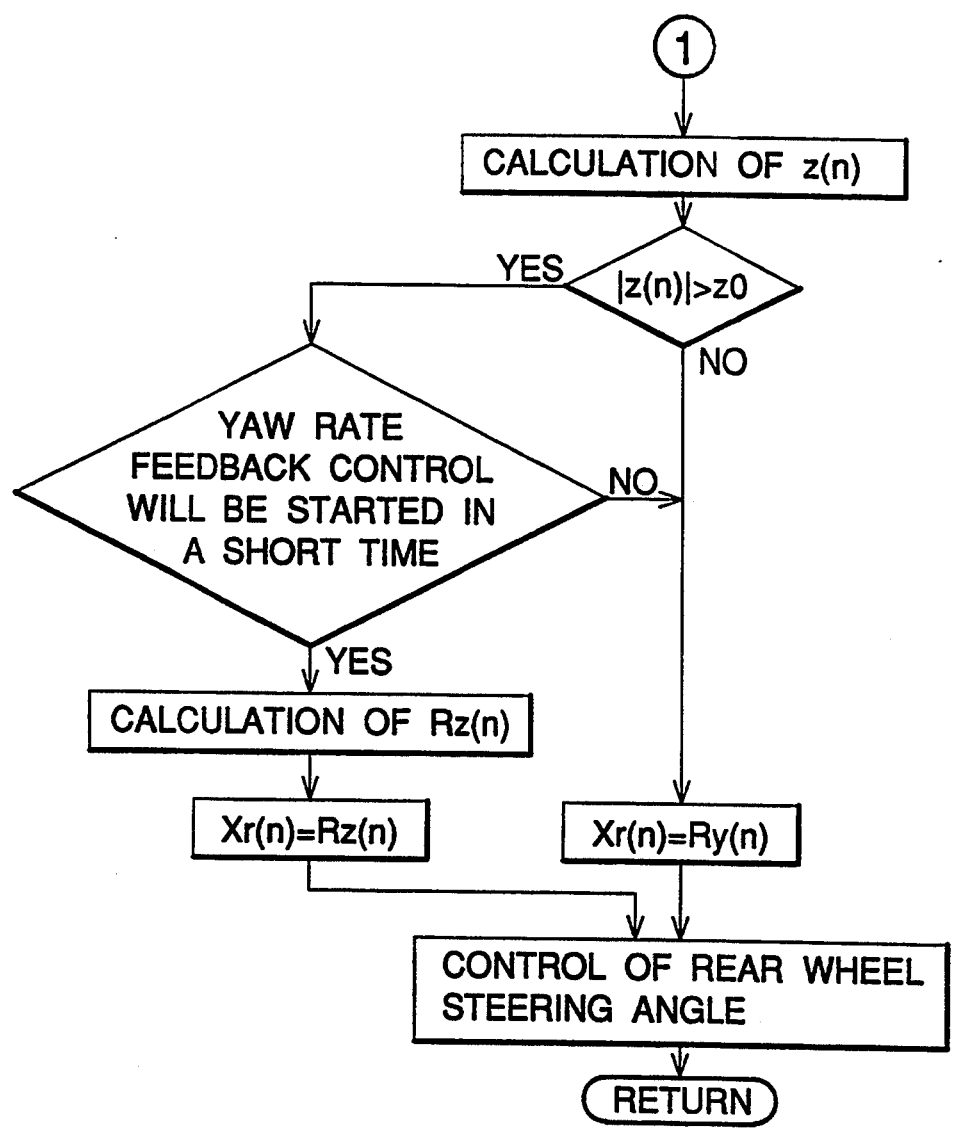

FIG. 16 is a flow chart showing a further embodiment of the steering angle control of rear wheels effected by the thus constituted control unit 29.

Referring to FIG. 16, similarly to the embodiment shown in FIG. 3, the control unit 29 receives the vehicle speed V(n) detected by the vehicle speed sensor 40, the steering angle Xf(n) of the front wheels 2, 2 detected by the steering angle sensor 41, the detected yaw rate Y(n) detected by the yaw rate sensor 42 and the lateral acceleration GL(n) detected by the lateral acceleration sensor 43 and the yaw rate feedback control means 30 calculates a target yaw rate Yo(n) in this control cycle in accordance with the formula (2).

The yaw rate feedback means 30 calculates the deviation E(n) between the thus calculated target yaw rate Yo(n) and the detected yaw rate Y(n) input from the yaw rate sensor 42 in accordance with the formula (3) and further calculates the yaw rate feedback control value Ry(n) in the current control cycle in accordance with the formula (4).

The thus calculated yaw rate feedback control value Ry(n) and the deviation E(n) are output to the control mode selection means 33.

The control mode selection means 33 calculates the rate of change dE(n) in the deviation E(n) and judges whether or not the absolute value of the deviation E(n) is greater than the predetermined value E0 and the absolute value of the rate of change dE(n) in the deviation E(n) is greater than the predetermined value dE0, for selecting the control means for controlling the steering angle $Xr(n)$ of the rear wheels 3, 3 from among the yaw rate feedback control means 30, the side slip angle control means 31 and the fuzzy control means 32.

When the result of this judgment is YES, namely, when the absolute value of the deviation $E(n)$ is greater than the predetermined value E0 and the absolute value of the rate of change $dE(n)$ in the deviation $E(n)$ is greater than the predetermined value dE0, it can be considered that the vehicle is being driven in a state corresponding to the area S3 in FIG. 4 where the vehicle is being turning extremely sharply and there is a considerable risk of excessive over-steering, so that the driving condition of the vehicle is unstable. Therefore, the control mode selection means 33 outputs a control effecting signal to the fuzzy control means 32 and the function correcting means 36 for controlling the steering angle $Xr(n)$ of the rear wheels 3, 3 based on the fuzzy control.

When the function correcting means 37 receives the control effecting signal from the control mode selection means 33, it calculates a correction coefficient C1 based upon the lateral acceleration $GL(n)$ input from the lateral acceleration sensor 43 in accordance with maps or tables stored therein and outputs a correction signal to the fuzzy control means 32. In this embodiment, as shown in FIG. 16, the correction coefficient C1 is set to be 1 when the absolute value of the lateral acceleration $GL(n)$ is equal to or greater than a predetermined value GL0 and linearly increases as the absolute value of the lateral acceleration $GL(n)$ decreases within the area where the absolute value of the lateral acceleration $GL(n)$ is lower than the predetermined value GL0 so that it is equal to C0 when the lateral acceleration $GL(n)$ is equal to zero.

When the fuzzy control means 32 receives a control effecting signal from the control mode selection means 33, it calculates the rate of change $dY(n)$ in the detected yaw rate $Y(n)$ input from the yaw rate sensor 42 and makes a judgment regarding the antecedent portion of the membership function, namely, it judges how great the absolute value of the deviation $E(n)$ between the target yaw rate $Yo(n)$ and the detected yaw rate $Y(n)$ is and how great the absolute value of the rate of change $dE(n)$ in the deviation $E(n)$ is. In accordance with the result of this judgment, the fuzzy control means 32 calculates the fuzzy control value $Rf(n)$ based upon the membership function stored therein and the correction signal input from the function correcting means 36, using the formula (7) below, and then outputs the fuzzy control signal to the motor 24 so that the steering angle $Xr(n)$ of the rear wheels 3, 3 is controlled so as to become equal to the fuzzy control value and that the rate of change $dY(n)$ in the detected yaw rate $Y(n)$ becomes zero.

$$Rf(n) = C1 \times f(E(n), dE(n)) \quad (7)$$

As apparent from FIG. 16, since the correction coefficient C1 is set to be greater than 1 within an area where the absolute value of the lateral acceleration $GL(n)$ is lower than the predetermined value GL0 and is made larger as the absolute value of the lateral acceleration $GL(n)$ decreases, the rear wheels 3, 3 are more greatly steered as the absolute value of the lateral acceleration $GL(n)$ decreases within the area where the absolute value of the lateral acceleration $GL(n)$ is lower than the predetermined value GL0 and the detected yaw rate $Y(n)$ quickly converges on the target yaw rate $Yo(n)$ when the vehicle is being driven on a road with a low road surface friction coefficient and the absolute value of the lateral acceleration $GL(n)$ acting on the vehicle is low, whereby it is possible to prevent excessive oversteering and improve the driving stability in the state where driving stability should be emphasized. On the other hand, when the vehicle is being driven on a road with a high road surface friction coefficient and the absolute value of the lateral acceleration $GL(n)$ acting on the vehicle is great, if the rear wheels 3, 3 are steered so that the detected yaw rate $Y(n)$ quickly converges on the target yaw rate $Yo(n)$, the vehicle is apt to vibrate and there is a considerable risk of the riding comfort being lowered. However, according to this embodiment, since the correction coefficient C1 is set to be 1 in the area where the absolute value of the lateral acceleration $GL(n)$ is equal to or greater than the predetermined value GL0, the rate at which the detected yaw rate $Y(n)$ converges on the target yaw rate $Yo(n)$ is low so that it is possible to improve the driving stability and the riding comfort simultaneously under this state.

On the contrary, when the absolute value of the deviation $E(n)$ is not greater than a predetermined value E0 or when the absolute value of the rate of change $dE(n)$ in the deviation $E(n)$ is not greater than a predetermined value dE0, the control mode selection means 33 judges whether or not the absolute value of the estimated value $z(n)$ of the side slip angle input from the side slip angle calculating means 34 is greater than a predetermined value z0.

When the result of this judgment is YES, namely, when the absolute value of the estimated value $z(n)$ of the side slip angle is greater than a predetermined value z0, since it can be considered that the vehicle is being driven in a state corresponding to the area S2 in FIG. 4, the control mode selection means outputs a control effecting signal to the side slip angle control means 31, thereby to cause the side slip angle control means 31 to control the steering angle $Xr(n)$ of the rear wheels 3, 3.

When the side slip angle control means 31 receives the control effecting signal from the control mode selection means 33, similarly to the embodiment shown in FIG. 3, it calculates the side slip angle control value $Rz(n)$ in accordance with the formula (6) and outputs a side slip angle control signal to the motor 24 so that the steering angle $Xr(n)$ of the rear wheels 3, 3 is made equal to the side slip angle control value $Rz(n)$ and the absolute value of the estimated value of the side slip angle $z(n)$ is reduced. Therefore, in the state where the turning radius of the vehicle is large and the yaw rate $Y(n)$ is low, it is possible to prevent the rear wheels 3, 3 from being steered in the reverse phase with respect to that of the front wheels 2, 2 and to reliably prevent the driving stability from being lowered.

On the contrary, when the absolute value of the estimated value $z(n)$ of the side slip angle is not greater than the predetermined value z0, since it can be considered that the vehicle is being driven in a state corresponding to the area S1 shown in FIG. 4 where the tire cornering force C.F. is substantially proportional to the absolute value of the estimated value $z(n)$ of the side slip angle and that the driving condition is stable, the control mode selection means 33 outputs a control effecting signal to the yaw rate feedback control means 30.

When the yaw rate feedback control means 30 receives the control effecting signal from the control mode selection means 33, it outputs a yaw rate feedback control signal to the motor 24, thereby controlling the steering angle Xr(n) of the rear wheels 3, 3 so as to become equal to the yaw rate feedback control value Ry(n) calculated in accordance with the formula (4).

The above described control is repeated at predetermined time intervals and the rear wheels 3, 3 are steered accordingly.

According to this embodiment, since the rear wheels 3, 3 are steered by the yaw rate feedback control means 30 in the stable driving state corresponding to the area S1 so as to make the detected yaw rate Y(n) become equal to the target yaw rate Yo(n) determined based upon the steering angle of the steering wheel 1, it is possible to steer the rear wheels 3, 3 in a desired manner. On the other hand, since the rear wheels 3, 3 are steered by the side slip angle control means 31 in the state where the absolute value of the estimated value z(n) of the side slip angle is greater than the predetermined value z0 and the vehicle is being sharply turned and subjected to a large lateral acceleration GL(n), in such a manner that the greater the estimated value z(n) of the side slip angle is, the more the rear wheels 3, 3 are steered in the same phase as that of the front wheels 2, 2, namely, in the same direction as that of the front wheels 2, 2 with respect to the longitudinal center line of the vehicle, it is possible to prevent the rear wheels 3, 3 from being steered in the reverse phase with respect to that of the front wheels 2, 2 by the yaw rate feedback control means 30 and prevent the driving stability from being lowered. Furthermore, in the state corresponding to the area S3 where the absolute value of the deviation E(n) between the target yaw rate Yo(n) and the detected yaw rate Y(n) is greater than the predetermined value E0 and the absolute value of the rate of change dE(n) in the deviation E(n) is greater than the predetermined value dE0, in other words, when the vehicle is turning extremely sharply and there is considerable risk of excessive oversteering, since the rear wheels 3, 3 are steered by the fuzzy control means 32 so as to reduce the absolute value of the rate of change dY(n) in the detected yaw rate Y(n), it is possible to improve the driving stability even in this unstable state without a large computer. Moreover, since the correction coefficient C1 which is calculated by the function correcting means 37 and output to the fuzzy control means 32 is set to be greater than 1 within an area where the absolute value of the lateral acceleration GL(n) is lower than the predetermined value GL0 and is increased as the absolute value of the lateral acceleration GL(n) decreases, the rear wheels 3, 3 are more greatly steered as the absolute value of the lateral acceleration GL(n) decreases within the area where the absolute value of the lateral acceleration GL(n) is lower than the predetermined value GL0 and the detected yaw rate Y(n) quickly converges on the target yaw rate Yo(n) when the vehicle is being driven on a road with a low road surface friction coefficient and the absolute value of the lateral acceleration GL(n) acting on the vehicle is low, whereby it is possible to prevent excessive oversteering and improve the driving stability under the state where the driving stability should be emphasized. On the other hand, when the vehicle is being driven on a road with a high road surface friction coefficient and the absolute value of the lateral acceleration GL(n) acting on the vehicle is great, if the rear wheels 3, 3 are steered so that the detected yaw rate Y(n) quickly converges on the target yaw rate Yo(n), the vehicle is apt to vibrate and there is a considerable risk of the riding comfort being lowered. However, according to this embodiment, since the correction coefficient C1 is set to be 1 in the area where the absolute value of the lateral acceleration GL(n) is equal to or greater than the predetermined value GL0, the rate at which the detected yaw rate Y(n) converges on the target yaw rate Yo(n) is low and it is possible to improve the driving stability and the riding comfort simultaneously under this state.

Figure 17A:
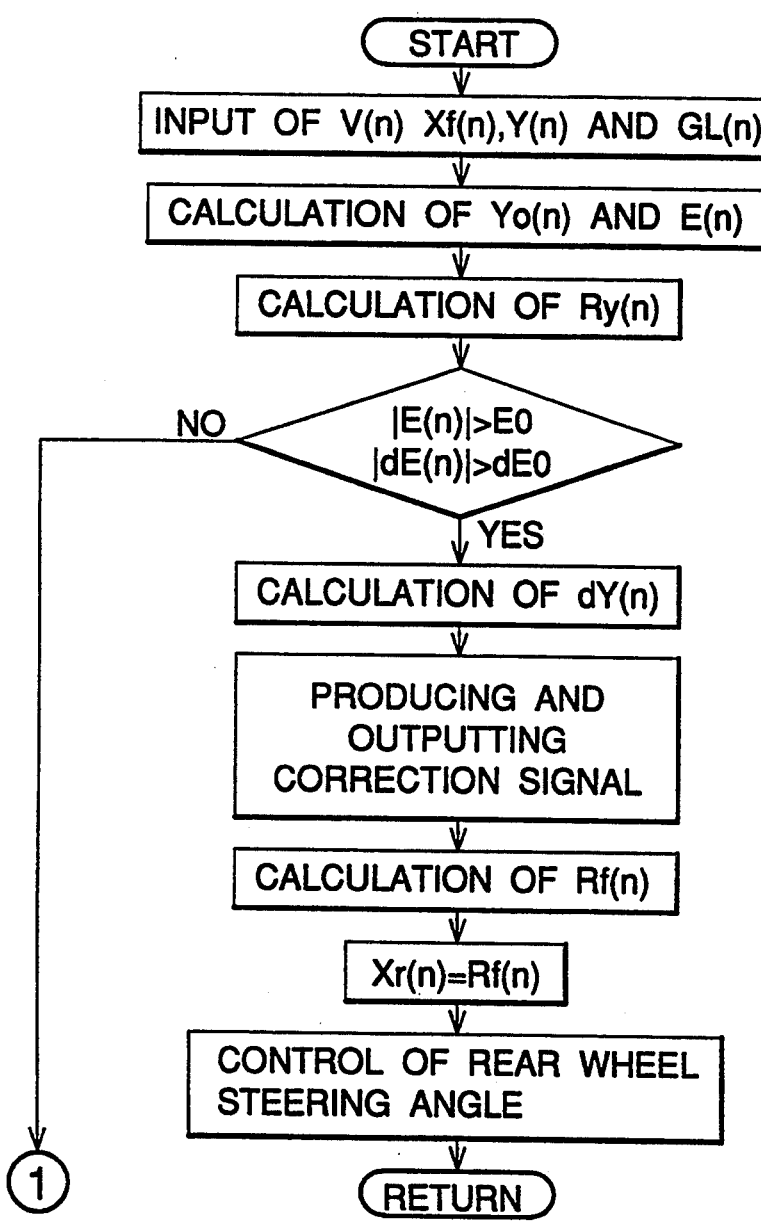
FIGS. 17, 17A-17B is a flow chart showing a further embodiment of the rear wheel steering angle control effected by a control unit of a vehicle rear wheel steering system.
Figure 17:
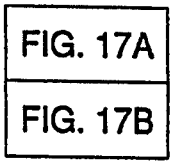
Figure 17B:
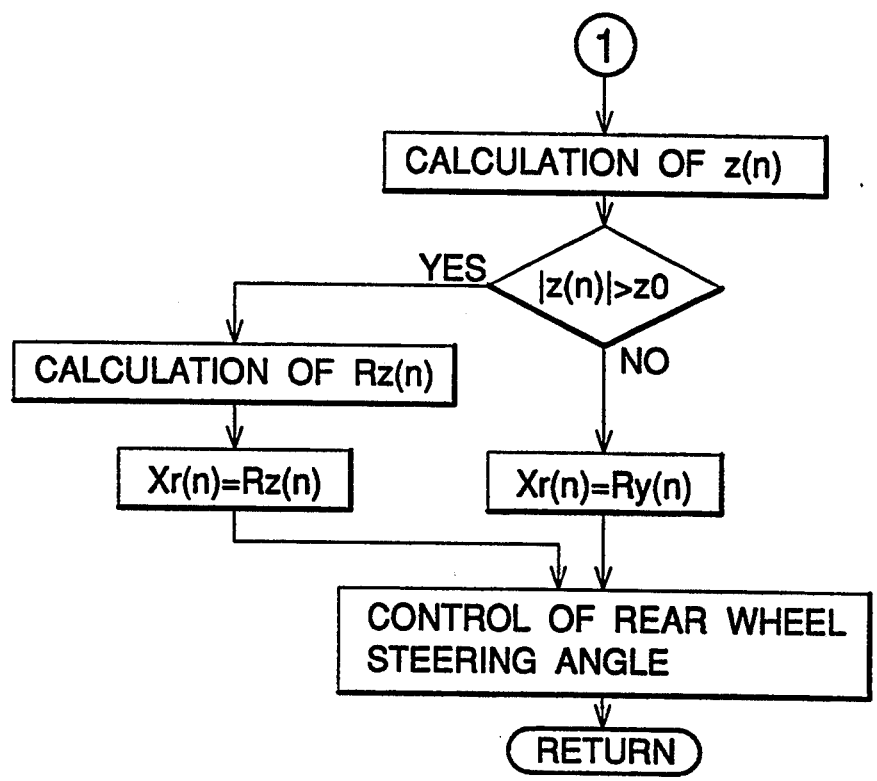

FIG. 17 is a flow chart showing another embodiment of the steering angle control of rear wheels effected by the control unit 29 shown in FIG. 15.

Referring to FIG. 17, the function correcting means 37 is different from that of the embodiment shown in FIG. 16 in that it does not calculate the correction coefficient C1 and output a correction signal for correcting the conclusion portion of the membership function but in accordance with the absolute value of the lateral acceleration GL(n), outputs a correction signal for correcting the judgment in the antecedent portion of the membership function as to how great the absolute value of the deviation E(n) between the target yaw rate Yo(n) and the detected yaw rate Y(n) is and how great the absolute value of the rate of change dE(n) in the deviation E(n) is.

More specifically, in this embodiment, the function correcting means 36 is constituted so that even when the absolute value of the deviation E(n) between the target yaw rate Yo(n) and the detected yaw rate Y(n) is the same and the absolute value of the rate of change dE(n) in the deviation E(n) is the same, it judges that the absolute value of the deviation E(n) between the target yaw rate Yo(n) and the detected yaw rate Y(n) is greater and the absolute value of the rate of change dE(n) in the deviation E(n) is greater, as the absolute value of the lateral acceleration GL(n) decreases, and, as the absolute value of the lateral acceleration GL(n) decreases, outputs a correction signal for correcting the antecedent portion of the membership function stored in the fuzzy control means 32 to the fuzzy control means 32 so as to make it judge that t he absolute value of the deviation E(n) between the target yaw rate Yo(n) and the detected yaw rate Y(n) is greater and the absolute value of the rate of change dE(n) in the deviation E(n) is greater, even when the absolute value of the deviation E(n) between the target yaw rate Yo(n) and the detected yaw rate Y(n) is the same and the absolute value of the rate of change dE(n) in the deviation E(n) is the same.

Therefore, similarly to the embodiment shown in FIG. 16, when the vehicle is being driven on a road with a low road surface friction coefficient and the absolute value of the lateral acceleration GL(n) acting on the vehicle is low, the detected yaw rate Y(n) quickly converges on the target yaw rate Yo(n), whereby it is possible to prevent excessive oversteering and improve the driving stability under the state where the driving stability should be emphasized. On the other hand, when the vehicle is being driven on a road with a high road surface friction coefficient and the absolute value of the lateral acceleration GL(n) acting on the vehicle is great, the rate at which the detected yaw rate Y(n) converges on the target yaw rate Yo(n) is low and it is possible to improve the driving stability and the riding comfort simultaneously under this state.

FIG. 18 is a block diagram showing a control unit 29 of a rear wheels steering system which is a further embodiment of the present invention and a detection system provided in a vehicle.

Referring to FIG. 18, similarly to the embodiment shown in FIG. 2, the control unit 29 comprises the yaw rate feedback control means 30, the side slip angle control means 31, the fuzzy control means 32, the control mode selection means 33 and the side slip angle calculating means 34, and receives detection signals from the vehicle speed sensor 40 for detecting the vehicle speed V, the steering angle sensor 41 for detecting the steering angle of the steering hand wheel 1, namely, the steering angle Xf of the front wheels 2, 2, the yaw rate sensor 42 for detecting the yaw rate Y of the vehicle and the lateral acceleration sensor 43 for detecting the lateral acceleration GL acting on the vehicle.

The yaw rate feedback control means 30 is constituted so as to calculate the target yaw rate Yo(n) based on the vehicle speed V(n) input from the vehicle speed sensor 40 and the steering angle Xf(n) of the front wheels 2, 2 input from the steering angle sensor 41, to further calculate the deviation E(n) between the target yaw rate Yo(n) and the detected yaw rate Y(n) input from the yaw rate sensor 42, to calculate the yaw rate feedback control value Ry(n) using the I-PD calculation formula stored therein, and output the thus calculated yaw rate feedback control value Ry(n) to the control mode selection means 33 and the side slip angle control means 31. Further, when a control effecting signal is input thereto from the control mode selection means 33, it outputs the yaw rate feedback control signal to the motor 24.

The control mode selection means 33 is constituted so as to calculate the rate of change dE(n) in the deviation E(n), output a control effecting signal to the fuzzy control means 32 when the absolute value of the deviation E(n) is greater than the predetermined value E0 and the absolute value of the rate of change dE(n) in the deviation E(n) is greater than the predetermined value dE0, namely, under the state where the vehicle is turning extremely sharply, output a control effecting signal to the side slip angle control means 31 when the absolute value of the deviation E(n) is not greater than the predetermined value E0 or the absolute value of the rate of change dE(n) in the deviation E(n) is not greater than the predetermined value dE0 and when the absolute value of the estimated value z(n) of the side slip angle calculated by the side slip angle calculating means 34 is greater than the predetermined value z0, namely, under the state where the vehicle is turning sharply, and output a control effecting signal to the yaw rate feedback control means 30 when a control reservation signal is input from the side slip angle control means 31 and in other cases, namely, under the normal turning condition.

The side slip angle control means 31 is constituted so that it calculates the side slip angle control value Rz(n) in accordance with the formula stored therein when a control effecting signal is input from the control mode selection means 33, outputs a control reservation signal to the control mode selection means 33 when it judges that the absolute value of the side slip angle control value Rz(n) is smaller than the absolute value of the yaw rate feedback control value Ry(n) and outputs a side slip angle control signal to the motor 24 when it judges that the absolute value of the side slip angle control value Rz(n) is equal to or greater than the absolute value of the yaw rate feedback control value Ry(n).

The fuzzy control means 32 is constituted so that when the control effecting signal is input from the control mode selection means 33, it calculates the rate of change dY(n) in the detected yaw rate Y(n) input from the yaw rate sensor 42 and also calculates a fuzzy control value Rf(n) in accordance with the membership function and outputs the fuzzy control signal for controlling the steering angle Xr(n) of the rear wheels 3, 3 to make it equal to the fuzzy control value Rf(n).

The side slip angle calculating means 34 is constituted the same as in the previous embodiments.

Figure 19:
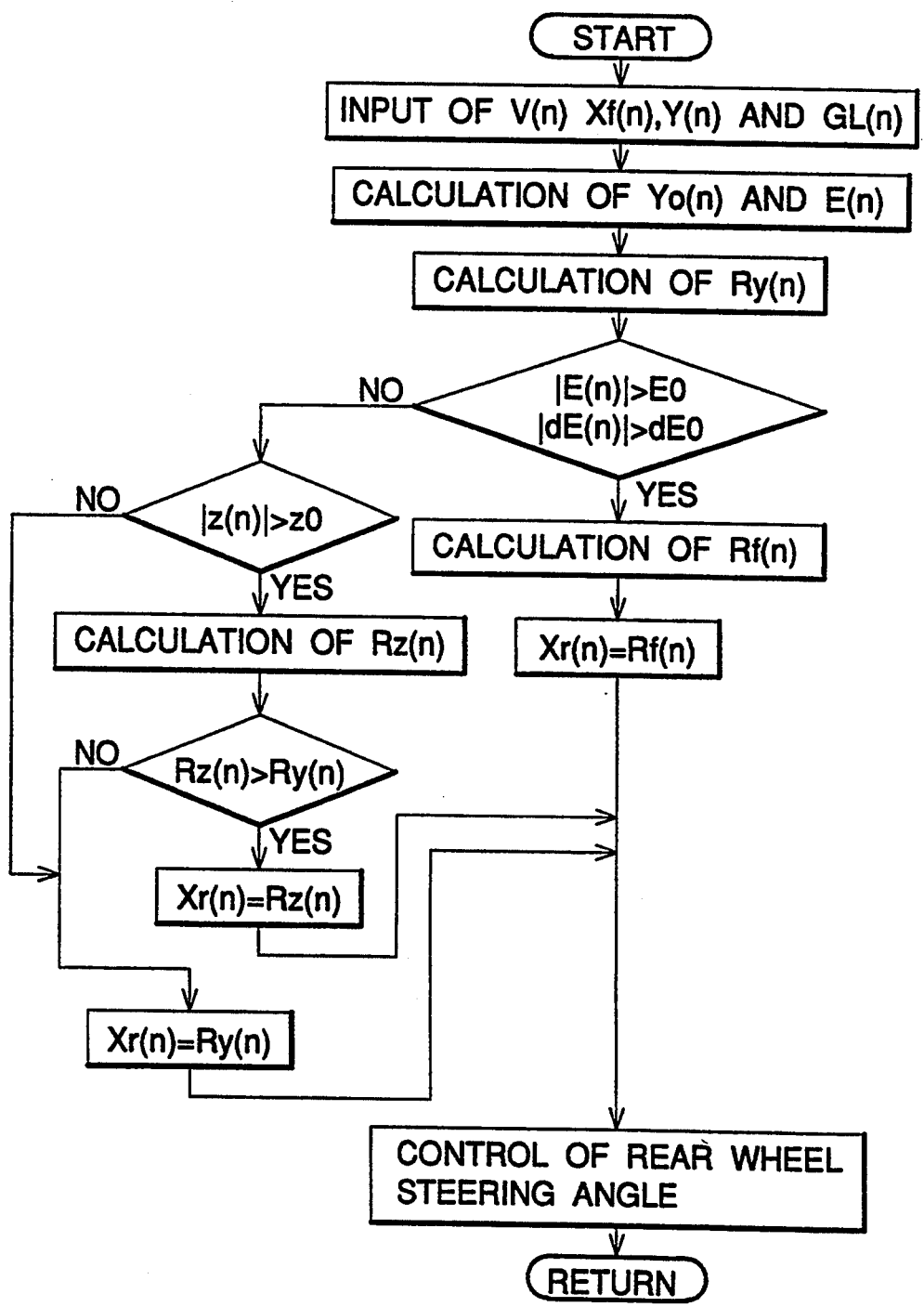
FIG. 19 is a flow chart showing a further embodiment of the rear wheel steering angle control effected by the control unit shown in FIG. 18.

FIG. 19 is a flow chart showing a further embodiment of the steering angle control of rear wheels 3, 3 effected by the thus constituted control unit 29.

Referring to FIG. 19, the control unit 29 receives the vehicle speed V(n) detected by the vehicle speed sensor 40, the steering angle Xf(n) of the front wheels 2, 2 detected by the steering angle sensor 41, the detected yaw rate Y(n) detected by the yaw rate sensor 42 and the lateral acceleration GL(n) detected by the lateral acceleration sensor 43 and the yaw rate feedback control means 30 calculates a target yaw rate Yo(n) in the current control cycle in accordance with the formula (2).

The yaw rate feedback means 30 then calculates the deviation E(n) between the thus calculated target yaw rate Yo(n) and the detected yaw rate Y(n) input from the yaw rate sensor 42 in accordance with the formula (3) and further calculates the yaw rate feedback control value Ry(n) in the current control cycle in accordance with the formula (4).

The thus calculated yaw rate feedback control value Ry(n) and the deviation E(n) are output to the control mode selection means 33.

The control mode selection means 33 calculates the rate of change dE(n) in the deviation E(n) and judges whether or not the absolute value of the deviation E(n) is greater than the predetermined value E0 and the absolute value of the rate of change dE(n) in the deviation E(n) is greater than the predetermined value dE0, for selecting the control means for controlling the steering angle Xr(n) of the rear wheels 3, 3 from among the yaw rate feedback control means 30, the side slip angle control means 31 and the fuzzy control means 32.

When the result of this judgment is YES, namely, when the absolute value of the deviation E(n) is greater than the predetermined value E0 and the absolute value of the rate of change dE(n) in the deviation E(n) is greater than the predetermined value dE0, it can be considered that the vehicle is being driven in a state corresponding to the area S3 in FIG. 4 where the vehicle is being turning extremely sharply and there is a considerable risk of excessive over-steering, so that the driving condition of the vehicle is unstable. Therefore, similarly to the embodiment shown in FIG. 3, the control mode selection means 33 outputs a control effecting signal to the fuzzy control means 32 for controlling the steering angle Xr(n) of the rear wheels 3, 3 based on the fuzzy control.

When the fuzzy control means 32 receives the control effecting signal from the control mode selection means 33, it calculates the rate of change dY(n) in the detected yaw rate Y(n) input from the yaw rate sensor 42 and further calculates the fuzzy control value Rf(n) based upon the membership function depending upon the deviation E(n) and the rate of change dE(n) in the deviation E(n) in accordance with the formula (5) so as to output it to the motor 24 so that the steering angle Xr(n) of the rear wheels 3, 3 can be controlled to make it equal to the fuzzy control value Rf(n).

On the contrary, when the absolute value of the deviation E(n) is not greater than a predetermined value E0 or when the absolute value of the rate of change dE(n) in the deviation E(n) is not greater than a predetermined value dE0, the control mode selection means 33 judges whether or not the absolute value of the estimated value z(n) of the side slip angle input from the side slip angle calculating means 34 is greater than a predetermined value z0.

When the absolute value of the estimated value z(n) of the side slip angle is not greater than the predetermined value z0, since it can be considered that the vehicle is being driven in a state corresponding to the area S1 shown in FIG. 4 where the tire cornering force C.F. is substantially proportional to the absolute value of the estimated value z(n) of the side slip angle and that the driving condition is stable, the control mode selection means 33 outputs a control effecting signal to the yaw rate feedback control means 30.

On the other hand, when the result of this judgment is YES, namely, when the absolute value of the estimated value z(n) of the side slip angle is greater than a predetermined value z0, since it can be considered that the vehicle is being driven in a state corresponding to the area S2 in FIG. 4, the control mode selection means outputs a control effecting signal to the side slip angle control means 31.

When the side slip angle control means 31 receives the control effecting signal from the control mode selection means 33, it calculates the side slip angle control value Rz(n) in accordance with the formula (6).

However, in a case where sudden acceleration or braking during turning of the vehicle causes the rear portion of the vehicle to swing laterally and excessive oversteering occurs, since the yaw rate Y(n) becomes extremely great, the yaw rate feedback control value Ry(n) calculated by the yaw rate feedback control means 30 can become greater than the side slip angle control value Rz(n) calculated by the side slip angle control means 31. In this case, if the steering angle Xr(n) of the rear wheels 3, 3 is controlled by the side slip angle control means 31, the rear wheels 3, 3 will be steered in the reverse direction with respect to the front wheels 2, 2 and even though the phase of the steering angle Xr(n) of the rear wheels 3, 3 is the same as that of the front wheels 2, 2. In such a case, since the yaw rate Y(n) is increased and the driving stability can be lowered, the side slip angle control means 31 judges whether or not the absolute value of the side slip angle control value Rz(n) is equal to or greater than the absolute value of the yaw rate feedback control value Ry(n).

When the result of this judgment is YES, even if the side slip angle control is effected, since there is no risk of the rear wheels 3, 3 being steered in the reverse direction with respect to the front wheels 2, 2 or of the yaw rate Y(n) being increased, the side slip angle control means 31 outputs the side slip angle control signal to the motor 24 so that the steering angle Xr(n) of the rear wheels 3, 3 is controlled so as to make it equal to the side slip angle control value Rz(n).

On the contrary, when the result of the judgment is NO, since effecting the side slip angle control would lead to a considerable risk of the rear wheels 3, 3 being steered in the reverse direction with respect to the front wheels 2, 2 and the yaw rate Y(n) being increased, thus lowering the driving stability, the side slip angle control means 31 outputs a control reservation signal to the control mode selection means 33, without outputting the side slip angle control signal to the motor 24.

When the control mode selection means 33 receives the control reservation signal from the side slip angle control means 31, it outputs the control effecting signal to the yaw rate feedback control means 30.

When the yaw rate feedback control means 30 receives the control effecting signal from the control mode selection means 33, it outputs a yaw rate feedback control signal to the motor 24, thereby controlling the steering angle Xr(n) of the rear wheels 3, 3 so as to make it equal to the yaw rate feedback control value Ry(n) calculated in accordance with the formula (4).

The above described control is repeated at predetermined time intervals and the rear wheels 3, 3 are steered accordingly.

According to this embodiment, since the rear wheels 3, 3 are steered by the yaw rate feedback control means 30 in the stable driving state corresponding to the area S1 so as to make the detected yaw rate Y(n) become equal to the target yaw rate Yo(n) determined based upon the steering angle of the steering wheel 1, it is possible to steer the rear wheels 3, 3 in a desired manner. On the other hand, since the rear wheels 3, 3 are steered by the side slip angle control means 31 in the state where the absolute value of the estimated value z(n) of the side slip angle is greater than the predetermined value z0 and the vehicle is being sharply turned and subjected to a large lateral acceleration GL(n), in such a manner that the greater the estimated value z(n) of the side slip angle is, the more the rear wheels 3, 3 are steered in the same phase as that of the front wheels 2, 2, namely, in the same direction as that of the front wheels 2, 2 with respect to the longitudinal center line of the vehicle, it is possible to prevent the rear wheels 3, 3 from being steered in the reverse phase with respect to that of the front wheels 2, 2 by the yaw rate feedback control means 30 and prevent the driving stability from being lowered. Furthermore, in the state corresponding to the area S3 where the absolute value of the deviation E(n) between the target yaw rate Yo(n) and the detected yaw rate Y(n) is greater than the predetermined value E0 and the absolute value of the rate of change dE(n) in the deviation E(n) is greater than the predetermined value dE0, in other words, when the vehicle is turning extremely sharply and there is considerable risk of excessive oversteering, since the rear wheels 3, 3 are steered by the fuzzy control means 32 so as to reduce the absolute value of the rate of change dY(n) in the detected yaw rate Y(n), it is possible to improve the driving stability even in this unstable state without a large computer. Moreover, even in the case where the absolute value of the estimated value z(n) of the side slip angle is greater than the predetermined value z0 and the steering angle Xr(n) of the rear wheels 3, 3 should be controlled by the side slip angle control means 31, if the absolute value of the side slip angle control value Rz(n) is equal to or greater than the absolute value of the yaw rate feedback control value Ry(n), namely, if sudden acceleration or braking during turning of the vehicle causes the rear portion of the vehicle to swing laterally so that the vehicle is excessively oversteered and the yaw rate Y(n) becomes extremely great, then since the steering angle Xr(n) of the rear wheels 3, 3 is not controlled by the side slip angle control means 31 but is controlled by the yaw rate feedback control means 30 until the absolute value of the side slip angle control value Rz(n) becomes greater than the absolute value of the yaw rate feedback control value Ry(n), it is possible, in such state, to prevent the rear wheels 3, 3 from being steered in the reverse direction with respect to the front wheels 2, 2 and to prevent the driving stability from being lowered.

Figure 20:
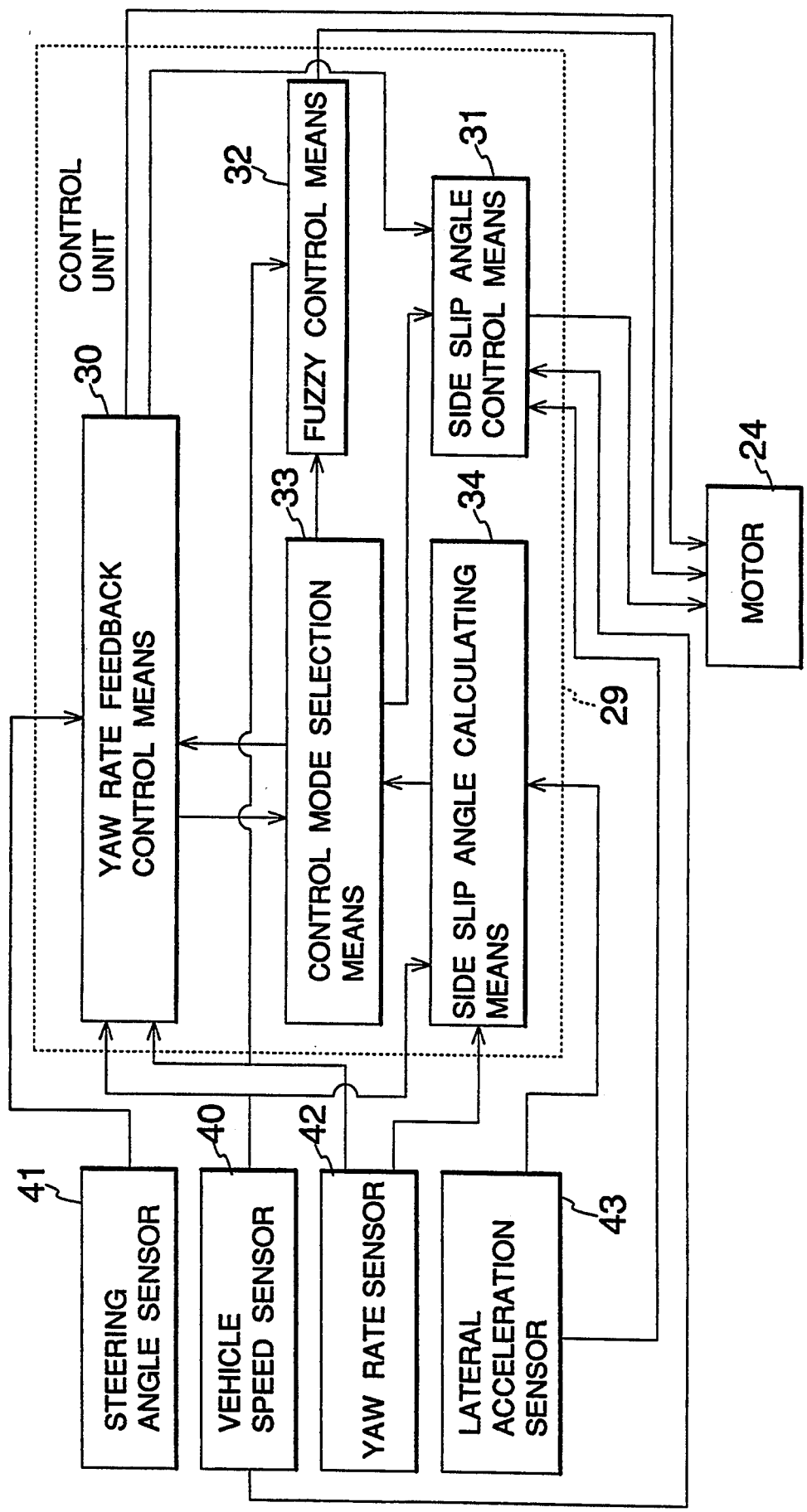
FIG. 20 is a block diagram showing a control unit of a rear wheel steering system which is a further embodiment of the present invention and a detection system provided in a vehicle.
Figure 21B:
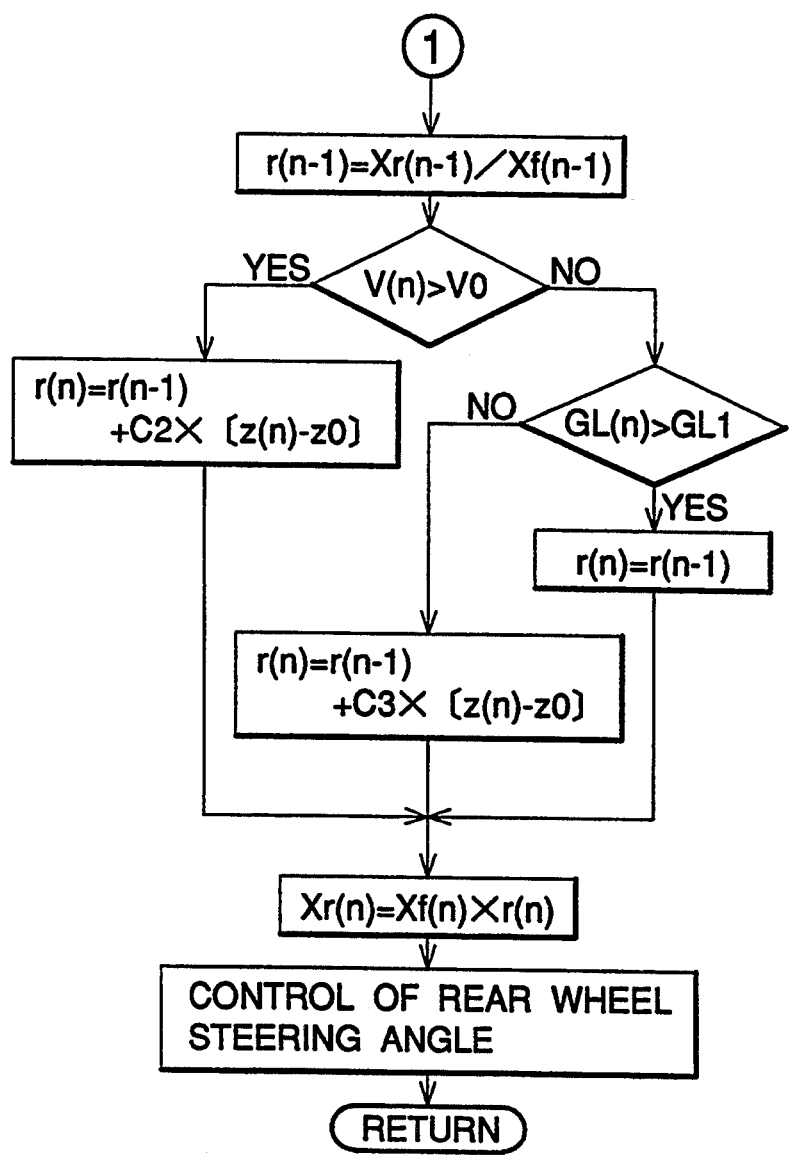

FIG. 20 is a block diagram showing the control unit 29 of a rear wheel steering system which is a further embodiment of the present invention and a detection system provided in a vehicle, and FIG. 21 is a flow chart showing a further embodiment of the steering angle control of rear wheels effected by the control unit shown in FIG. 20.

In the embodiment shown in FIGS. 20 and 21, the side slip angle control means 31 is constituted so that when it receives a control effecting signal from the control mode selection means 33, it calculates the side slip angle control value Rz(n) based on the vehicle speed V(n) input from the vehicle speed sensor 40, the lateral acceleration GL(n) input from the lateral acceleration sensor 43 and the yaw rate feedback control value Ry(n) in accordance with a calculation formula different from the formula (6) and outputs the side slip angle control signal to the motor 24.

More specifically, as shown in FIG. 21, similarly to the embodiment shown in FIG. 19, when the control mode selection means 33 judges that the absolute value of the deviation E(n) is not greater than the predetermined value E0 or that the absolute value of the rate of change dE(n) in the deviation E(n) is not greater than the predetermined value dE0, it further judges whether or not the absolute value of the estimated value z(n) of the side slip angle input from the side slip angle calculating means 34 is greater than a predetermined value z0.

When the absolute value of the estimated value z(n) of the side slip angle is not greater than the predetermined value z0, the control mode selection means 33 outputs a control effecting signal to the yaw rate feedback control means 30.

On the other hand, when the result of this judgment is YES, namely, when the absolute value of the estimated value z(n) of the side slip angle is greater than a predetermined value z0, the control mode selection means outputs a control effecting signal to the side slip angle control means 31.

When the side slip angle control means 31 receives the control effecting signal from the control mode selection means 33, it calculates the steering angle ratio r(n−1) of the steering angle Xr(n−1) of the rear wheels 2, 2 to the steering angle Xf(n−1) of the front wheels 2, 2 in the preceding control cycle and then judges whether or not the vehicle speed V(n) is greater than a predetermined vehicle speed V0.

When the result of this judgment is YES, namely, when the vehicle speed V(n) is greater than a predetermined vehicle speed V0, since this makes it necessary to emphasize driving stability, the side slip angle control means 31 sets the steering angle Xr(n−1) of the rear wheels 3, 3 obtained from the steering angle ratio r(n−1) in the preceding control cycle, namely, in the control cycle immediately before the side slip angle control is effected and in which the yaw rate feedback control was effected, as the minimum steering angle Xr(n) of the rear wheels 3, 3 in the current control cycle and when the absolute value of the estimated value z(n) of the side slip angle further increases, it calculates a steering angle ratio r(n) in the current control cycle in accordance with the following formula (8), so that the steering angle Xr(n) of the rear wheels 3, 3 increases as the absolute value of the estimated value z(n) of the side slip angle increases.

$$r(n) = r(n-1) + C2 \times \{z(n) - z0\} \quad (8)$$

In this formula, C2 is a predetermined constant.

On the other hand, when the vehicle speed V(n) is not greater than the predetermined vehicle speed V0, the side slip angle control means 31 judges whether or not the absolute value of the lateral acceleration GL(n) input from the lateral acceleration sensor 43 is greater than a predetermined value GL1.

When the result of this judgment is YES, since it can be considered that the vehicle is being driven at a low speed on a road having a high road surface friction coefficient. Under such circumstances, if the driver should let up on the accelerator pedal, the grip force of the tires will increase, so that the vehicle will temporarily be excessively understeered. There is thus some risk of the driving stability being lowered unless the steering wheel 1 is sharply turned. Therefore, in this embodiment, the side slip angle control means 31 holds the steering angle ratio r(n) in the current control cycle equal to the steering ratio r(n−1) in the preceding control cycle, namely, in the control cycle immediately before the side slip angle control is effected, for bringing the movement direction of the vehicle and the orientation of the vehicle into coincide with each other as much as possible.

On the contrary, when the result of the judgment is NO, it can be considered that the vehicle is running on a road having a low road surface friction coefficient and that it is necessary to emphasize driving stability. Therefore, the side slip angle control means 31 sets the steering angle Xr(n−1) of the rear wheels 3, 3 obtained from the steering angle ratio r(n−1) in the preceding control cycle, namely, in the control cycle immediately before the side slip angle control is effected and in which the yaw rate feedback control was effected, as the minimum steering angle Xr(n) of the rear wheels 3, 3 in the current cycle and when the absolute value of the estimated value z(n) of the side slip angle further increases, it calculates a steering angle ratio r(n) in the current cycle in accordance with the following formula (9), so that the steering angle Xr(n) of the rear wheels 3, 3 increases as the absolute value of the estimated value z(n) of the side slip angle increases.

$$r(n) = r(n-1) + C3 \times \{z(n) - z0\} \quad (9)$$

In this formula, C3 is a predetermined constant.

The above described control is repeated at predetermined time intervals and the rear wheels 3, 3 are steered accordingly.

According to this embodiment, since the rear wheels 3, 3 are steered by the yaw rate feedback control means 30 in the stable driving state corresponding to the area S1 so as to make the detected yaw rate Y(n) become equal to the target yaw rate Yo(n) determined based upon the steering angle of the steering wheel 1, it is possible to steer the rear wheels 3, 3 in a desired manner. On the other hand, since the rear wheels 3, 3 are steered by the side slip angle control means 31 in the state where the absolute value of the estimated value z(n) of the side slip angle is greater than the predetermined value z0 and the vehicle is being sharply turned and subjected to a large lateral acceleration GL(n), in such a manner that the greater the estimated value z(n)

of the side slip angle is, the more the rear wheels 3, 3 are steered in the same phase as that of the front wheels 2, 2, namely, in the same direction as that of the front wheels 2, 2 with respect to the longitudinal center line of the vehicle, it is possible to prevent the rear wheels 3, 3 from being steered in the reverse phase with respect to that of the front wheels 2, 2 by the yaw rate feedback control means 30 and prevent the driving stability from being lowered. Furthermore, in the state corresponding to the area S3 where the absolute value of the deviation $E(n)$ between the target yaw rate $Yo(n)$ and the detected yaw rate $Y(n)$ is greater than the predetermined value E0 and the absolute value of the rate of change $dE(n)$ in the deviation $E(n)$ is greater than the predetermined value dE0, in other words, when the vehicle is turning extremely sharply and there is considerable risk of excessive oversteering, since the rear wheels 3, 3 are steered by the fuzzy control means 32 so as to reduce the absolute value of the rate of change $dY(n)$ in the detected yaw rate $Y(n)$, it is possible to improve the driving stability even in this unstable state without a large computer. Moreover, even in the case where the absolute value of the estimated value $z(n)$ of the side slip angle is greater than the predetermined value z0 and the steering angle $Xr(n)$ of the rear wheels 3,3 should be controlled by the side slip angle control means 31, when sudden acceleration or braking during turning of the vehicle causes the rear portion of the vehicle to swing laterally so that the vehicle is excessively oversteered and the absolute value of the yaw rate $Y(n)$ becomes extremely great, the steering angle $Xr(n-1)$ of the rear wheels 3, 3 obtained from the steering angle ratio $r(n-1)$ in the preceding control cycle, namely, in the control cycle immediately before the side slip angle control is effected and in which the yaw rate feedback control was effected is set as the minimum steering angle $Xr(n)$ of the rear wheels 3, 3 in the current control cycle and when the vehicle speed $V(n)$ is greater than the predetermined value V0 or when the absolute value of the lateral acceleration $GL(n)$ is not greater than the predetermined value GL1 even though the vehicle speed $V(n)$ is not greater than the predetermined value V0, the rear wheels 3, 3 are controlled for improving the driving stability by increasing the steering angle $Xr(n)$ as the absolute value of the estimated value $z(n)$ of the side slip angle increases. Therefore, even when the side slip angle control is started under the condition where sudden acceleration or braking during turning of the vehicle causes the rear portion of the vehicle to swing laterally so that the vehicle is excessively oversteered and the yaw rate $Y(n)$ becomes extremely great, it is possible to prevent the absolute value of the yaw rate $Y(n)$ from increasing and to improve the driving stability. Further, when the vehicle speed $V(n)$ is not greater than the predetermined value V0 and the absolute value of the lateral acceleration $GL(n)$ is greater than the predetermined value GL1, since the steering angle ratio $r(n)$ in this control cycle is held equal to the steering ratio $r(n-1)$ in the preceding control cycle, namely, in the control cycle immediately before the side slip angle control is effected, it is possible to prevent the vehicle from being temporarily excessively understeered and to effectively prevent the driving stability from being lowered without need for the driver to continue turning the steering wheel 1 sharply.

FIG. 22 is a block diagram showing the control unit 29 of a rear wheel steering system which is a further embodiment of the present invention and a detection system provided in a vehicle.

Referring to FIG. 22, the control unit 29 comprises a control value correcting means 38 in addition to the yaw rate feedback control means 30, the side slip angle control means 31, the fuzzy control means 32, the control mode selection means 33 and the side slip angle calculating means 34, and receives detection signals from the vehicle speed sensor 40 for detecting the vehicle speed V, the steering angle sensor 41 for detecting the steering angle of the steering hand wheel 1, namely, the steering angle Xf of the front wheels 2, 2, the yaw rate sensor 42 for detecting the yaw rate Y of the vehicle and the lateral acceleration sensor 43 for detecting the lateral acceleration GL acting on the vehicle.

In this embodiment, the yaw rate feedback control means 30 and the fuzzy control means 32 are constituted the same as those in the embodiment shown in FIG. 2.

The control mode selection means 33 is constituted so as to calculate the rate of change $dE(n)$ in the deviation $E(n)$, output a control effecting signal to the fuzzy control means 32 and the control value correcting means 38 when the absolute value of the deviation $E(n)$ is greater than the predetermined value E0 and the absolute value of the rate of change $dE(n)$ in the deviation $E(n)$ is greater than the predetermined value dE0, namely, under the state where the vehicle is turning extremely sharply, output a control effecting signal to the side slip angle control means 31 and the control value correcting means 38 when the absolute value of the deviation $E(n)$ is not greater than the predetermined value E0 or the absolute value of the rate of change $dE(n)$ in the deviation $E(n)$ is not greater than the predetermined value dE0 and when the absolute value of the estimated value $z(n)$ of the side slip angle calculated by the side slip angle calculating means 34 is greater than the predetermined value z0, namely, under the state where the vehicle is turning sharply, and output a control effecting signal to the yaw rate feedback control means 30 in other cases, namely, under the normal turning condition.

The side slip angle control means 31 is constituted so as to calculate the side slip angle control value $Rz(n)$ based on a correction signal input from the control value correcting means 38 in accordance with the calculation formula stored therein when a control effecting signal is input from the control mode selection means 33 and output the side slip angle control signal to the motor 24.

The side slip angle calculating means 34 is constituted so as to calculate the estimated value $z(n)$ of the side slip angle based upon the vehicle speed $V(n)$ input from the vehicle speed sensor 40, the detected yaw rate $Y(n)$ input from the yaw rate sensor 42 and the lateral acceleration $GL(n)$ input from the lateral acceleration sensor 43, in accordance with the formula (1) and output it to the side slip angle control means 31, the control mode selection means 33 and the control value correcting means 38.

The control value correcting means 38 is constituted so that it calculates a differential value $dz(n)$ of the estimated value $z(n)$ of the side slip angle based on the estimated value $z(n)$ of the side slip angle input from the side slip angle calculating means 34 and also calculates the rate of change $dXf(n)$ in the steering angle $Xf(n)$ of the front wheels 2, 2 input from the steering angle sensor 41 and outputs a correction signal to the side slip angle control means 31 when the sign of the estimated value $z(n)$ of the side slip angle and that of the differential value $dz(n)$ are the same, the absolute value of the differential value $dz(n)$ of the estimated value $z(n)$ of the side slip angle is equal to or greater than a predetermined value $dz0$ and the absolute value of the rate of change $dXf(n)$ in the steering angle $Xf(n)$ of the front wheels 2, 2 is equal to or smaller than a predetermined value $dXf0$.

Figure 23B:
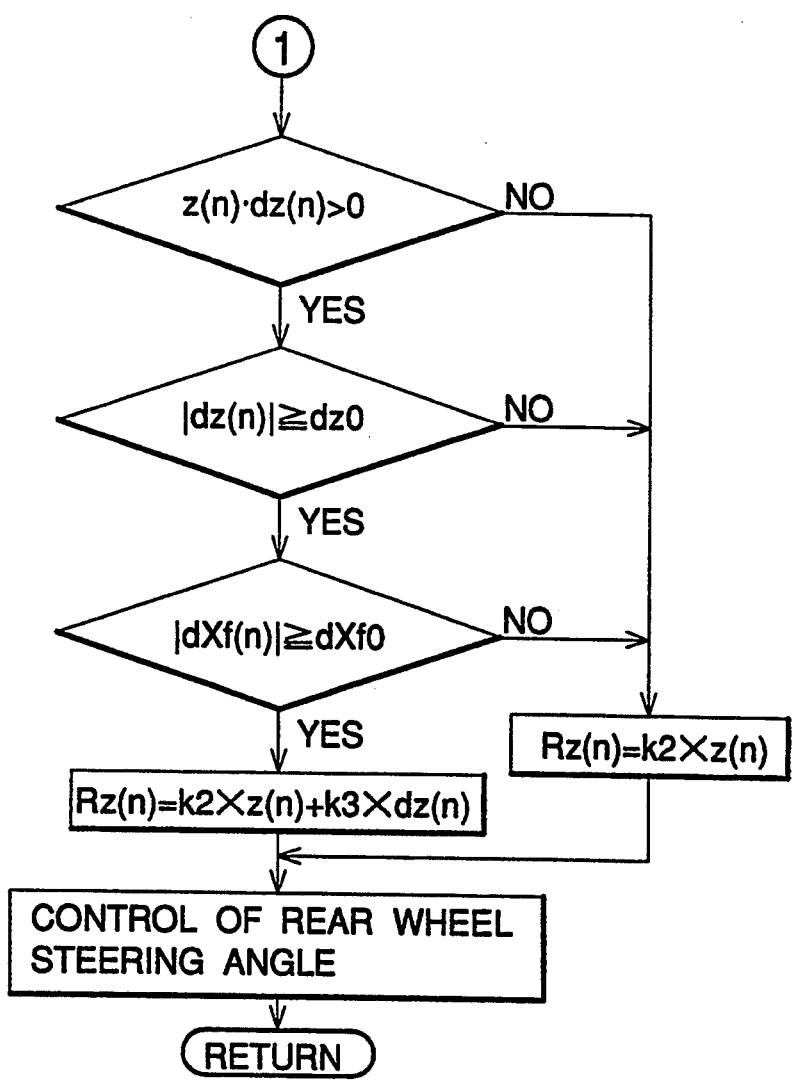

FIG. 23 is a flow chart showing an embodiment of the steering angle control of rear wheels effected by the thus constituted control unit 29.

Referring to FIG. 23, the control unit 29 receives the vehicle speed $V(n)$ detected by the vehicle speed sensor 40, the steering angle $Xf(n)$ of the front wheels 2, 2 detected by the steering angle sensor 41, the detected yaw rate $Y(n)$ detected by the yaw rate sensor 42 and the lateral acceleration $GL(n)$ detected by the lateral acceleration sensor 43, and the yaw rate feedback control means 30 calculates a target yaw rate $Yo(n)$ in the current control cycle in accordance with the formula (2).

The yaw rate feedback means 30 then calculates the deviation $E(n)$ between the thus calculated target yaw rate $Yo(n)$ and the detected yaw rate $Y(n)$ input from the yaw rate sensor 42 in accordance with the formula (3) and further calculates the yaw rate feedback control value $Ry(n)$ in the current control cycle in accordance with the formula (4).

The thus calculated yaw rate feedback control value $Ry(n)$ and the deviation $E(n)$ are output to the control mode selection means 33.

The control mode selection means 33 calculates the rate of change $dE(n)$ in the deviation $E(n)$ and judges whether or not the absolute value of the deviation $E(n)$ is greater than the predetermined value $E0$ and whether or not the absolute value of the rate of change $dE(n)$ in the deviation $E(n)$ is greater than the predetermined value $dE0$, for selecting the control means for controlling the steering angle $Xr(n)$ of the rear wheels 3, 3 from among the yaw rate feedback control means 30, the side slip angle control means 31 and the fuzzy control means 32.

When the result of this judgment is YES, namely, when the absolute value of the deviation $E(n)$ is greater than the predetermined value $E0$ and the absolute value of the rate of change $dE(n)$ in the deviation $E(n)$ is greater than the predetermined value $dE0$, it can be considered that the vehicle is being driven in a state corresponding to the area S3 in FIG. 4 where the vehicle is being turning extremely sharply and there is a considerable risk of excessive oversteering, so that the driving condition of the vehicle is unstable. Therefore, similarly to the embodiment shown in FIG. 3, the control mode selection means 33 outputs a control effecting signal to the fuzzy control means 32 for controlling the steering angle $Xr(n)$ of the rear wheels 3, 3 based upon fuzzy control.

When the fuzzy control means 32 receives the control effecting signal from the control mode selection means 33, it calculates the rate of change $dY(n)$ in the detected yaw rate $Y(n)$ input from the yaw rate sensor 42 and further calculates the fuzzy control value $Rf(n)$ based on the membership function depending upon the deviation $E(n)$ and the rate of change $dE(n)$ in the deviation $E(n)$ in accordance with the formula (5), and outputs it to the motor 24 so that the steering angle $Xr(n)$ of the rear wheels 3, 3 can be controlled to make it equal to the fuzzy control value $Rf(n)$.

On the contrary, when the absolute value of the deviation $E(n)$ is not greater than a predetermined value $E0$ or when the absolute value of the rate of change $dE(n)$ in the deviation $E(n)$ is not greater than a predetermined value $dE0$, the control mode selection means 33 judges whether or not the absolute value of the estimated value $z(n)$ of the side slip angle input from the side slip angle calculating means 34 is greater than a predetermined value $z0$.

When the absolute value of the estimated value $z(n)$ of the side slip angle is not greater than the predetermined value $z0$, since it can be considered that the vehicle is being driven in a state corresponding to the area S1 shown in FIG. 4 where the tire cornering force C.F. is substantially proportional to the absolute value of the estimated value $z(n)$ of the side slip angle and that the driving condition is stable, the control mode selection means 33 outputs a control effecting signal to the yaw rate feedback control means 30.

When the yaw rate feedback control means 30 receives the control effecting signal from the control mode selection means 33, it produces the yaw rate feedback control signal and outputs it to the motor 24 so that the steering angle $Xr(n)$ of the rear wheels 3, 3 is controlled so as to make it the yaw rate feedback control value $Ry(n)$ calculated in accordance with the formula (4).

On the other hand, when the result of this judgment is YES, namely, when the absolute value of the estimated value $z(n)$ of the side slip angle is greater than a predetermined value $z0$, since it can be considered that the vehicle is being driven in a state corresponding to the area S2 in FIG. 4, the control mode selection means outputs a control effecting signal to the side slip angle control means 31 and the control value correcting means 38.

When the control value correcting means 38 receives the control effecting signal from the control mode selection means 33, it differentiates the estimated value $z(n)$ of the side slip angle input from the side slip angle calculating means 34 to calculate the rate of change $dz(n)$ and judges whether or not the sign of the estimated value $z(n)$ of the side slip angle and that of the rate of change $dz(n)$ in the estimated value $z(n)$ of the side slip angle are the same.

When the result of this judgment is NO, namely, when the sign of the estimated value $z(n)$ of the side slip angle and that of the rate of change $dz(n)$ in the estimated value $z(n)$ of the side slip angle are different, since it can be considered that the estimated value $z(n)$ of the side slip angle is converging on zero, the control value correcting means 38 does not output any correction signal.

On the contrary, when the result of the judgment is YES, namely, when the sign of the estimated value $z(n)$ of the side slip angle and that of the rate of change $dz(n)$ in the estimated value $z(n)$ of the side slip angle are the same, since it can be considered that the estimated value $z(n)$ of the side slip angle is increasing or decreasing, the control value correcting means 38 further judges whether or not the absolute value of the rate of change $dz(n)$ in the estimated value $z(n)$ of the side slip angle is equal to or greater than a predetermined value $dz0$.

When the result of this judgment is NO, namely, when the absolute value of the rate of change $dz(n)$ in the estimated value $z(n)$ of the side slip angle is smaller than the predetermined value $dz0$, it can be considered that the rate of increase or decrease thereof is small and that notwithstanding that the estimated value z(n) of the side slip angle is increasing or decreasing, it suffices to control the steering angle Xr(n) of the rear wheels 3, 3 in proportion to the estimated value z(n) of the side slip angle. Therefore, the control value correcting means 38 does not output any correction signal.

On the other hand, when the result of the judgment is YES, namely, when the absolute value of the rate of change dz(n) in the estimated value z(n) of the side slip angle is equal to or greater than the predetermined value dz0, the control value correcting means 38 further judges whether or not the absolute value of the rate of change dXf(n) in the steering angle Xf(n) of the front wheels 2, 2 is equal to or smaller than a predetermined value dXf0.

When the result of this judgment is NO, namely, when the absolute value of the rate of change dXf(n) in the steering angle Xf(n) of the front wheels 2, 2 is greater than the predetermined value dXf0, since this means that the steering wheel 1 is being steered at a rate greater than a predetermined rate, it can be considered to be sufficient to control the steering angle Xr(n) of the rear wheels 3, 3 in proportion to the estimated value z(n) of the side slip angle and to be unnecessary to correct the control value of the steering angle Xr(n) of the rear wheels 3, 3 so as to steer the rear wheels 3, 3 in the same phase as that of the front wheels 2, 2, even when the absolute value of the rate of change dz(n) in the estimated value z(n) of the side slip angle is not smaller than the predetermined value dz0. Therefore, the control value correcting means 38 does not output any correction signal.

On the contrary, when the result of the judgment is YES, namely, when the absolute value of the rate of change dXf(n) in the steering angle Xf(n) of the front wheels 2, 2 is equal to or smaller than a predetermined value dXf0, it can be considered that the estimated value z(n) of the side slip angle is considerably changing, even though the steering wheel 1 is hardly being steered, in other words, that the absolute value of the estimated value z(n) of the side slip angle exceeds the predetermined value z0 and the estimated value z(n) of the side slip angle is increasing or decreasing at greater than a predetermined rate. Therefore, since there is a considerable risk of the driving stability being lowered unless the steering angle Xr(n) of the rear wheels 3, 3 is corrected greatly by steering the rear wheels 3, 3 in the same phase as that of the front wheel 2, 2, the control value correcting means 38 outputs a correction signal to the side slip angle control means 31.

When the side slip angle control means 31 receives a control effecting signal from the control mode selecting means 33 but does not receive any correction signal from the control value correcting means 38, it calculates the side slip angle control value Rz(n) in accordance with the following formula (11).

$$Rz(n) = k2 \times z(n) \quad (11)$$

In this formula, k2 is a control constant and positive. Therefore, when the estimated value z(n) of the side slip angle is positive, the side slip angle control value Rz(n) increases as the estimated value z(n) of the side slip angle increases and, on the other hand, when the estimated value z(n) of the side slip angle is negative, the side slip angle control value Rz(n) decreases as the estimated value z(n) of the side slip angle decreases. As a consequence, if the steering angle Xr(n) of the rear wheels 3, 3 is controlled so as to make it equal to the side slip angle control value Ry(n), then since the rear wheels 3, 3 are steered in the same phase as the front wheels 2, 2, it is possible to prevent the rear wheels 3, 3 from being steered in the reverse phase with respect to the front wheels 2, 2 when the turning radius of the vehicle is great and the yaw rate Y(n) is being lowered, and to improve the driving stability.

On the contrary, when the side slip angle control means 31 receives a control effecting signal from the control mode selection means 33 and a correction signal from the control value correcting means 38, it calculates the side slip angle control value Rz(n) in the following formula (12).

$$Rz(n) = k2 \times z(n) + k3 \times dz(n) \quad (12)$$

In this formula, k2 is a control constant and positive. Therefore, when the estimated value z(n) of the side slip angle is positive, the side slip angle control value Rz(n) increases as the rate of change dz(n) in the estimated value z(n) of the side slip angle increases and, on the other hand, when the estimated value z(n) of the side slip angle is negative, the side slip angle control value Rz(n) decreases as the rate of change dz(n) in the estimated value z(n) of the side slip angle decreases. As a consequence, even in the case where there is some risk of the driving stability becoming lowered if the steering angle Xr(n) of the rear wheels 3, 3 is controlled only so as to make it equal to the side slip angle control value Rz(n) determined in proportion to the estimated value z(n) of the side slip angle since the absolute value of the rate of change dz(n) in the estimated value z(n) of the side slip angle is equal to or greater than the predetermined value dz0 even though the steering hand wheel 1 is hardly being steered, in other words, in the case where the estimated value z(n) of the side slip angle is increasing or decreasing at a rate greater than a predetermined one, it is possible to improve the driving stability even under such unstable condition since the rear wheels 3, 3 are more greatly steered in the same phase as the front wheels 2, 2 by an amount proportional to the rate of change dz(n) in the estimated value z(n) of the side slip angle.

The side slip angle control means 31 calculates the side slip angle control value Rz(n) in the above described manner and outputs it to the motor 24 so that the steering angle Xr(n) of the rear wheels 3, 3 is made equal to the side slip angle control value Rz(n).

The above described control is repeated at predetermined time intervals and the rear wheels 3, 3 are steered accordingly.

According to this embodiment, since the rear wheels 3, 3 are steered by the yaw rate feedback control means 30 in the stable driving state corresponding to the area S1 so as to make the detected yaw rate Y(n) become equal to the target yaw rate Yo(n) determined based upon the steering angle of the steering wheel 1, it is possible to steer the rear wheels 3, 3 in a desired manner. On the other hand, since the rear wheels 3, 3 are steered by the side slip angle control means 31 in the state where the absolute value of the estimated value z(n) of the side slip angle is greater than the predetermined value z0 and the vehicle is being sharply turned and subjected to a large lateral acceleration GL(n), in such a manner that the greater the estimated value z(n) of the side slip angle is, the more the rear wheels 3, 3 are steered in the same phase as that of the front wheels 2, 2, namely, in the same direction as that of the front wheels 2, 2 with respect to the longitudinal center line of the vehicle, it is possible to prevent the rear wheels 3, 3 from being steered in the reverse phase with respect to that of the front wheels 2, 2 by the yaw rate feedback control means 30 and prevent the driving stability from being lowered. Furthermore, in the state corresponding to the area S3 where the absolute value of the deviation E(n) between the target yaw rate Yo(n) and the detected yaw rate Y(n) is greater than the predetermined value E0 and the absolute value of the rate of change dE(n) in the deviation E(n) is greater than the predetermined value dE0, in other words, when the vehicle is turning extremely sharply and there is considerable risk of excessive oversteering, since the rear wheels 3, 3 are steered by the fuzzy control means 32 so as to reduce the absolute value of the rate of change dY(n) in the detected yaw rate Y(n), it is possible to improve the driving stability even in this unstable state without a large computer. Moreover, this embodiment is able to cope with the case where the absolute value of the estimated value z(n) of the side slip angle is greater than the predetermined value z0 and the steering angle Xr(n) of the rear wheels 3, 3 should be controlled by the side slip angle control means 31 but there is some risk of the driving stability becoming lowered if the steering angle Xr(n) of the rear wheels 3, 3 is controlled only so as to make it equal to the side slip angle control value Rz(n) determined proportional to the estimated value z(n) of the side slip angle, since the absolute value of the rate of change dz(n) in the estimated value z(n) of the side slip angle is equal to or greater than the predetermined value dz0 even though the sign of the estimated value z(n) of the side slip angle and that of the differential value thereof are the same and the steering rate of the steering wheel 1 is not greater than a predetermined rate, meaning that the rate of change dXf(n) in the steering angle of the front wheels 2, 2 is not greater than the predetermined value dXf0, in other words, when the estimated value z(n) of the side slip angle is increasing or decreasing at a rate greater than a predetermined one even though the steering wheel 1 is hardly being turned. Specifically, it is able to improve the driving stability under such unstable condition because it enables the rear wheels 3, 3 to be more greatly steered in the same phase as the front wheels 2, 2 by an amount proportional to the rate of change dz(n) in the estimated value z(n) of the side slip angle.

Figure 24B:
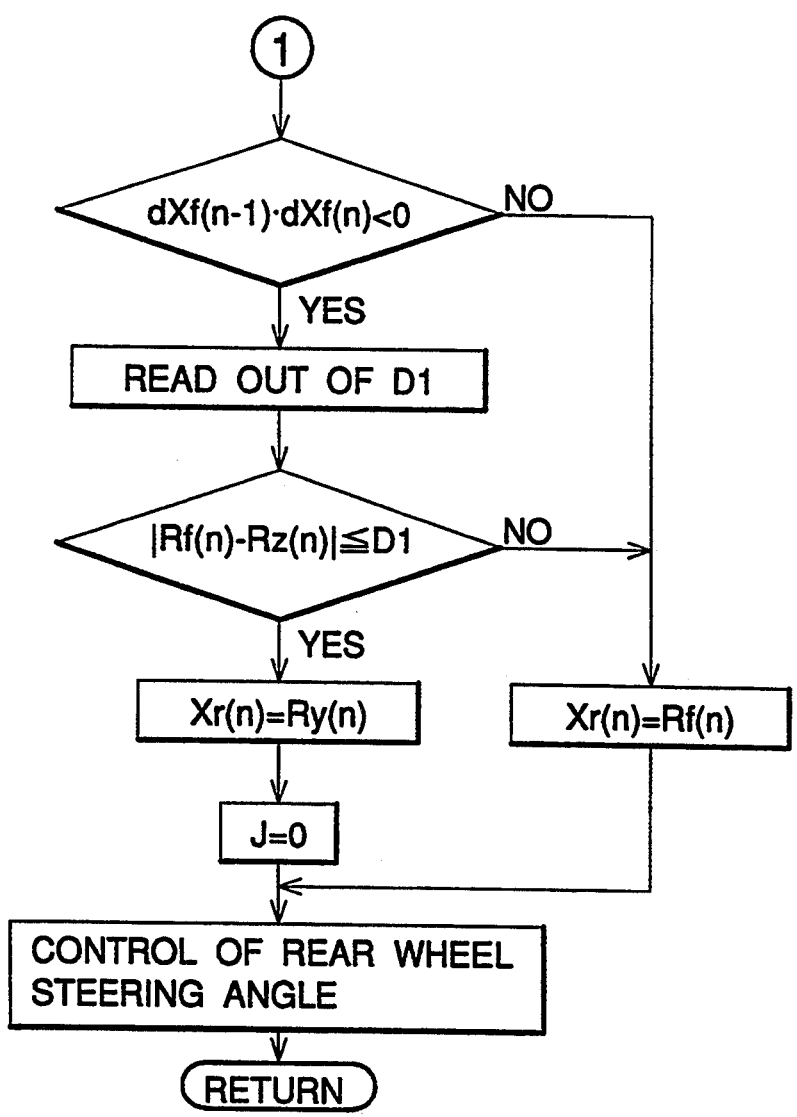
Figure 24C:
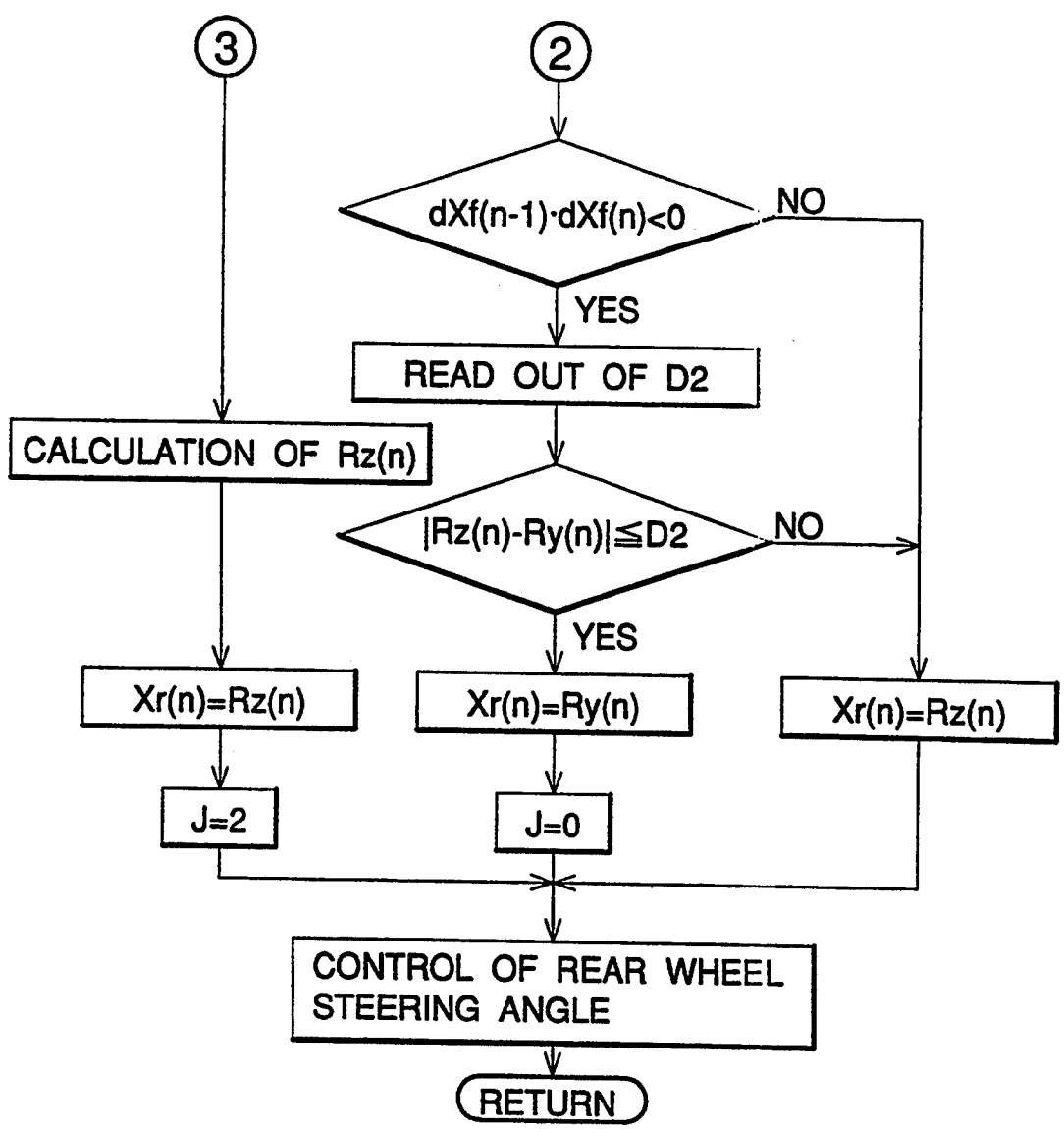

FIG. 24 is a flow chart showing a further embodiment of the steering angle control of rear wheels effected by the control unit 29.

In the embodiment shown in FIG. 24, similarly to the embodiment shown in FIG. 2, the control unit 29 comprises the yaw rate feedback control means 30, the side slip angle control means 31, the fuzzy control means 32, the control mode selection means 33 and the side slip angle calculating means 34, and receives detection signals from the vehicle speed sensor 40 for detecting the vehicle speed V, the steering angle sensor 41 for detecting the steering angle of the steering hand wheel 1, namely, the steering angle Xf of the front wheels 2, 2, the yaw rate sensor 42 for detecting the yaw rate Y of the vehicle and the lateral acceleration sensor 43 for detecting the lateral acceleration GL applied to the vehicle laterally.

In this embodiment, the yaw rate feedback control means 30 and the side slip angle calculating means 34 are constituted the same as those in the embodiment shown in FIG. 2.

The control mode selection means 33 is constituted so as to calculate the rate of change dE(n) in the deviation E(n), output a control effecting signal to the fuzzy control means 32 and the function correcting means 37 when the absolute value of the deviation E(n) is greater than the predetermined value E0 and the absolute value of the rate of change dE(n) in the deviation E(n) is greater than the predetermined value dE0, namely, under the state where the vehicle is turning extremely sharply, output a control effecting signal to the side slip angle control means 31 and the control value correcting means 38 when the absolute value of the deviation E(n) is not greater than the predetermined value E0 or the absolute value of the rate of change dE(n) in the deviation E(n) is not greater than the predetermined value dE0 and when the absolute value of the estimated value z(n) of the side slip angle calculated by the side slip angle calculating means 34 is greater than the predetermined value z0, namely, under the state where the vehicle is turning sharply, and output a control effecting signal to the yaw rate feedback control means 30 in other cases, namely, under the normal turning condition. Further, the control mode selection means 33 receives the steering angle Xf(n) of the front wheels 2, 2 from the steering angle sensor 41, the yaw rate feedback control value Ry(n) from the yaw rate feedback control means 30, the side slip angle control value Rz(n) from the side slip angle control means 31 and the fuzzy control value Rf(n) from the fuzzy control means, and calculates the rate of change in the steering wheel 1, namely, the rate of change dXf(n) in the steering angle Xf(n) of the front wheels 2, 2. In the case where steering angle Xr(n) of the rear wheels 3, 3 was controlled by the fuzzy control means 32 in the preceding control cycle, when the control mode selection means 33 judges based upon the rate of change dXf(n) in the steering angle Xf(n) of the front wheels 2, 2 in the current control cycle and the rate of change dXf(n−1) in the steering angle Xf(n−1) of the front wheels 2, 2 in the preceding control cycle that the steering wheel 1 once turned in one direction has been turned back in the other direction, it calculates the difference between the fuzzy control value Rf(n) and the yaw rate feedback control value Ry(n) and selects a threshold value D1 corresponding to the rate of change dXf(n) in the steering angle Xf(n) of the front wheels 2, 2 in accordance with maps or tables determined experimentally or theoretically and stored therein, whereafter it judges whether or not the absolute value of the difference between the fuzzy control value Rf(n) and the yaw rate feedback control value Ry(n) is equal to or smaller than the thus selected threshold value D1. Further, in the case where the steering angle Xr(n) of the rear wheels 3, 3 was controlled by the side slip angle control means 31 in the preceding control cycle, when the control mode selection means 33 judges that the absolute value of the difference between the fuzzy control value Rf(n) and the yaw rate feedback control value Ry(n) is equal to or smaller than the threshold value D1, it changes the control means for controlling the steering angle Xr(n) of the rear wheels 3, 3 from the fuzzy control means 32 to the yaw rate feedback control means 30. Similarly, when the control mode selection means 33 judges that the steering wheel 1 once turned in one direction has been turned back in the other direction, it calculates the difference between the side slip angle control value Rz(n) and the yaw rate feedback control value Ry(n) and selects a threshold value D2 corresponding to the rate of change dXf(n) in the steering angle Xf(n) of the front wheels 2, 2 in accordance with maps or tables determined experimentally or theoretically and stored therein, whereafter it judges whether or not the absolute value of the difference between the side slip angle control value Rz(n) and the yaw rate feedback control value Ry(n) is equal to or smaller than the thus selected threshold value D2. When the control mode selection means 33 judges that the absolute value of the difference between the side slip angle control value Rz(n) and the yaw rate feedback control value Ry(n) is equal to or smaller than the threshold value D2, it changes the control means for controlling the steering angle Xr(n) of the rear wheels 3, 3 from the side slip angle control means 31 to the yaw rate feedback control means 30.

The side slip angle control means 31 is constituted so that it calculates the side slip angle control value Rz(n) in accordance with the calculation formula stored therein when a control effecting signal is input thereto from the control mode selection means 33, outputs it to the control mode selection means 33 and outputs the side slip angle control signal to the motor 24.

The fuzzy control means 32 is constituted so that when the control effecting signal is input thereto from the control mode selection means 33, it calculates the rate of change dY(n) in the detected yaw rate Y(n) input from the yaw rate sensor 42 and also calculates a fuzzy control value Rf(n) in accordance with the membership function and outputs the fuzzy control signal for controlling the steering angle Xr(n) of the rear wheels 3, 3 to make it equal to the fuzzy control value Rf(n).

Referring to FIG. 24, the control unit 29 receives the vehicle speed V(n) detected by the vehicle speed sensor 40, the steering angle Xf(n) of the front wheels 2, 2 detected by the steering angle sensor 41, the detected yaw rate Y(n) detected by the yaw rate sensor 42 and the lateral acceleration GL(n) detected by the lateral acceleration sensor 43 and the yaw rate feedback control means 30 calculates a target yaw rate Yo(n) in the current control cycle in accordance with the formula (2).

The yaw rate feedback means 30 then calculates the deviation E(n) between the thus calculated target yaw rate Yo(n) and the detected yaw rate Y(n) input from the yaw rate sensor 42 in accordance with the formula (3) and further calculates the yaw rate feedback control value Ry(n) in the current control cycle in accordance with the formula (4).

The thus calculated yaw rate feedback control value Ry(n) and deviation E(n) are output to the control mode selection means 33.

For selecting the control means for controlling the steering angle Xr(n) of the rear wheels 3, 3 from among the yaw rate feedback control means 30, the side slip angle control means 31 and the fuzzy control means 32, the control mode selection means 33 first checks whether or not a flag J is equal to 1. The flag J is set to 1 when the steering angle Xr(n) of the rear wheels 3, 3 has been controlled by the fuzzy control means 32, is set to zero when the control means for controlling the steering angle Xr(n) of the rear wheels 3, 3 has been changed from the fuzzy control means 32 to the yaw rate feedback control means 30 or from the side slip angle control means 31 to the yaw rate feedback control means 31 and is set to 2 when the steering angle Xr(n) of the rear wheels 3, 3 has been controlled by the side slip angle control means 31. Therefore, the result of this judgment is NO in the first control cycle.

The control mode selection means 33 then calculates the rate of change dE(n) in the deviation E(n) and judges whether or not the absolute value of the deviation E(n) is greater than the predetermined value E0 and whether or not the rate of change dE(n) in the deviation E(n) is greater than the predetermined value dE0.

When the result of this judgment is YES, namely, when the absolute value of the deviation E(n) is greater than the predetermined value E0 and the absolute value of the rate of change dE(n) in the deviation E(n) is greater than the predetermined value dE0, it can be considered that the vehicle is being driven in a state corresponding to the area S3 in FIG. 4 where the vehicle is being turned extremely sharply. Therefore, similarly to the embodiment shown in FIG. 3, the control mode selection means 33 outputs a control effecting signal to the fuzzy control means 32 for controlling the steering angle Xr(n) of the rear wheels 3, 3 based upon fuzzy control.

When the fuzzy control means 32 receives the control effecting signal from the control mode selection means 33, it calculates the rate of change dY(n) in the detected yaw rate Y(n) input from the yaw rate sensor 42 and further calculates the fuzzy control value Rf(n) based on the membership function depending upon the deviation E(n) and the rate of change dE(n) in the deviation E(n) in accordance with the formula (5), and outputs it to the motor 24 so that the steering angle Xr(n) of the rear wheels 3, 3 can be controlled to make it equal to the fuzzy control value Rf(n) and then sets the flag J to 1. As a result, the rear wheels 3, 3 are steered so that the rate of change dY(n) in the detected yaw rate Y(n) approaches zero.

On the contrary, when the absolute value of the deviation E(n) is not greater than a predetermined value E0 or when the absolute value of the rate of change dE(n) in the deviation E(n) is not greater than a predetermined value dE0, the control mode selection means 33 judges whether or not the flag J is equal to 2. As explained above, in the first control cycle, the result of this judgment is NO.

Then, the control mode selection means 33 further judges whether or not the absolute value of the estimated value z(n) of the side slip angle input from the side Slip angle calculating means 34 is greater than a predetermined value z0.

when the absolute value of the estimated value z(n) of the side slip angle is not greater than the predetermined value z0, since it can be considered that the vehicle is being driven in a state corresponding to the area S1 shown in FIG. 4 where the tire cornering force C.F. is substantially proportional to the absolute value of the estimated value z(n) of the side slip angle and that the driving condition is stable, the control mode selection means 33 outputs a control effecting signal to the yaw rate feedback control means 30.

When the yaw rate feedback control means 30 receives the control effecting signal from the control mode selection means 33, it produces the yaw rate feedback control signal and outputs it to the motor 24 so that the steering angle Xr(n) of the rear wheels 3, 3 is controlled so as to make it the yaw rate feedback control value Ry(n) calculated in accordance with the formula (4).

On the other hand, when the result of this judgment is YES, namely, when the absolute value of the estimated value z(n) of the side slip angle is greater than a predetermined value z0, since it can be considered that the vehicle is being driven in a state corresponding to the area S2 in FIG. 4, the control mode selection means outputs a control effecting signal to the side slip angle control means 31.

When the side slip angle control means 31 receives the control effecting signal from the control mode selection means 33, it calculates the side slip angle control value Rz(n) in accordance with the formula (6), outputs it to the control mode selection means 33 and outputs the side slip angle control signal to the motor 24. The side slip angle control means 31 then sets the flag J to 2.

In and after the second control cycle, the control mode selection means 33 judges whether or not the flag J is equal to 1, namely, whether or not the steering angle Xr(n) of the rear wheels 3, 3 was controlled by the fuzzy control means 32 in the preceding control cycle.

When the result of this judgment is YES, namely, when the control mode selection means 33 judges that the steering angle Xr(n) of the rear wheels 3, 3 was controlled by the fuzzy control means 32 in the preceding control cycle, it calculates the rate of change dXf(n−1) in the steering angle Xf(n−1) of the front wheels 2, 2 in the preceding control cycle and the rate of change dXf(n) in the steering angle Xf(n) of the front wheels 2, 2 in the current control cycle and judges whether or not the sign has changed between the rate of change dXf(n−1) in the steering angle Xf(n−1) of the front wheels 2, 2 in the preceding control cycle and the rate of change dXf(n) in the steering angle Xf(n) of the front wheels 2, 2 in the current control cycle, namely, whether or not the steering wheel 1 has been turned back. This judgment is made by checking the sign of the product of the rate of change dXf(n−1) and the rate of change dXf(n).

When the sign of the product is positive, the control mode selection means 33 judges that the steering wheel has not been turned back, and since it is therefore considered that the steering angle Xr(n) of the rear wheels 3, 3 should continue to be controlled by the fuzzy control means 32, the control mode selection means 33 outputs a control effecting signal to the fuzzy control means 32.

On the contrary, when the sign of the product of the rate of change dXf(n−1) and the rate of change dXf(n) is negative, since it can be considered that the steering wheel 1 has been turned back, the control mode selection means 33 reads out the threshold value D1 corresponding to the absolute value of the rate of change dXf(n) in the steering angle Xf(n) of the front wheels 2, 2 in accordance with maps or tables determined experimentally or theoretically and stored therein and judges whether or not the absolute value of the difference between the fuzzy control value Rf(n) calculated by the fuzzy control means 32 and the yaw rate feedback control value Ry(n) calculated by the yaw rate feedback control means 30 is equal to or smaller than the threshold value D1.

When the result of this judgment is YES, since it can be considered that the yaw rate feedback control will be started immediately, the control mode selection means 33 outputs the control effecting signal to the yaw rate feedback control means 30 and sets the flag J to zero. The threshold value D1 is increased as the absolute value of the rate of change dXf(n) in the steering angle Xf(n) of the front wheel 2, 2 is increased, namely, as the turning rate of the steering wheel 1 increases so that when the driver is quickly turning the steering wheel 1, the control means for controlling the steering angle Xr(n) of the rear wheels 3, 3 is changed from the fuzzy control means 32 to the yaw rate feedback control means 30 even though the absolute value of the difference between the fuzzy control value Rf(n) and the yaw rate feedback control value Ry(n) is relatively great, and that, on the other hand, when the driver is slowly turning the steering wheel 1, the control means for controlling the steering angle Xr(n) of the rear wheels 3, 3 is not changed from the fuzzy control means 32 to the yaw rate feedback control means 30 until the absolute value of the difference between the fuzzy control value Rf(n) and the yaw rate feedback control value Ry(n) has become extremely small. So, when the turning rate of the steering wheel 1 is great and the absolute value of the rate of change dXf(n) in the steering angle Xf(n) of the front wheel 2, 2 is great, since the control means for controlling the steering angle Xr(n) of the rear wheels 3, 3 is changed from the fuzzy control means 32 to the yaw rate feedback control means 30 while the absolute value of the difference between the fuzzy control value Rf(n) and the yaw rate feedback control value Ry(n) is great, the behavior of the vehicle is greatly changed. However, in this case, since the driver is quickly turning the steering wheel 1 and expects that the behavior of the vehicle will be greatly changed, no problem arises even if the control means for controlling the steering angle Xr(n) of the rear wheels 3, 3 is changed from the fuzzy control means 32 to the yaw rate feedback control means 30 while the absolute value of the difference between the fuzzy control value Rf(n) and the yaw rate feedback control value Ry(n) is great. Rather, since the fact that the steering wheel 1 is being turned back means that the control means for controlling the steering angle Xr(n) of the rear wheels 3, 3 will be changed from the fuzzy control means 32 to the yaw rate feedback control means 30 in a short time, it is desirable to quickly start the yaw rate feedback control for improving the driving stability. On the other hand, the driver is likely to feel uncomfortable and the riding comfort will be lowered, if the behavior of the vehicle is greatly changed when he is slowly turning the steering wheel 1 and the absolute value of the rate of change dXf(n) in the steering angle Xf(n) of the front wheels 2, 2 is small. The threshold value D1 is therefore set to a small value with the intention of enabling the control means for controlling the steering angle Xr(n) of the rear wheels 3, 3 to be smoothly changed from the fuzzy control means 32 to the yaw rate feedback control means 30. Thus, the threshold value D1 is increased as the absolute value of the rate of change dXf(n) in the steering angle Xf(n) of the front wheels 2, 2 increases and the threshold value D1 is decreased as the absolute value of the rate dXf(n) of change in the steering angle Xf(n) of the front wheels 2, 2 decreases.

On the contrary, when the absolute value of the difference between the fuzzy control value Rf(n) and the yaw rate feedback control value Ry(n) is greater than the threshold value D1, since it can be considered that the steering angle Xr(n) of the rear wheels 3, 3 should continue to be controlled by the fuzzy control means 32, the control mode selection means 33 outputs the control effecting signal to the fuzzy control means 32.

On the other hand, when the flag is not equal to 1, similarly to the above, the control mode selection means 33 judges whether or not the absolute value of the deviation E(n) between the target yaw rate Yo(n) and the detected yaw rate Y(n) is greater than the predetermined value E0 and whether or not the absolute value of the rate of change dE(n) in the deviation E(n) is greater than the predetermined value dE0.

When the result of this judgment is YES, similarly to the above, the control mode selection means 33 outputs the control effecting signal to the fuzzy control means 32.

On the contrary, when the control mode selection means 33 judges that the absolute value of the deviation E(n) between the target yaw rate Yo(n) and the detected yaw rate Y(n) is not greater than the predetermined value E0 or that the absolute value of the rate of change dE(n) in the deviation E(n) is not greater than the predetermined value dE0, it further judges whether or not the flag J is equal to 2, namely, whether or not the steering angle Xr(n) of the rear wheels 3, 3 was controlled by the side slip angle control means 31 in the preceding control cycle.

When the result of this judgment is NO, the control mode selection means 33 judges whether or not the absolute value of the estimated value z(n) of the side slip angle input from the side slip angle calculating means 34 is greater than the predetermined value z0 and outputs the control effecting signal to the side slip angle control means 31 or the yaw rate feedback control means 30 depending upon the result of this judgment, so as to cause one of them to control the steering angle Xr(n) of the rear wheels 3, 3.

On the contrary, when the result of the judgment is YES, namely, when the control mode selection means 33 judges that the steering angle Xr(n) of the rear wheels 3, 3 was controlled by the side slip angle control means 31 in the preceding control cycle, it calculates the rate of change dXf(n−1) in the steering angle Xf(n−1) of the front wheels 2, 2 in the preceding control cycle and the rate of change dXf(n) in the steering angle Xf(n) of the front wheels 2, 2 in the current control cycle and judges whether or not the sign has changed between the rate of change dXf(n−1) in the steering angle Xf(n−1) of the front wheels 2, 2 in the preceding control cycle and the rate of change dXf(n) in the steering angle Xf(n) of the front wheels 2, 2 in the current control cycle, namely, whether or not the steering wheel 1 has been turned back, this judgment being made on the basis of the sign of the product of the rate of change dXf(n−1) and the rate of change dXf(n).

When the sign of the product is positive, the control mode selection means 33 judges that the steering wheel 1 has not been turned back, and since it is therefore considered that the steering angle Xr(n) of the rear wheels 3, 3 should continue to be controlled by the side slip angle control means 31, the control mode selection means 33 outputs a control effecting signal to the side slip angle control means 32.

On the contrary, when the sign of the product of the rate of change dXf(n−1) and the rate of change dXf(n) is negative, since it can be considered that the steering wheel 1 has been turned back, the control mode selection means 33 reads out the threshold value D2 corresponding to the absolute value of the rate of change dXf(n) in the steering angle Xf(n) of the front wheels 2, 2 in accordance with maps or tables determined experimentally or theoretically and stored therein and judges whether or not the absolute value of the difference between the side slip angle control value Rz(n) calculated by the side slip angle calculating means 34 and the yaw rate feedback control value Ry(n) calculated by the yaw rate feedback control means 30 is equal to or smaller than the threshold value D2.

When the result of this judgment is YES, since it can be considered that the yaw rate feedback control will be started immediately, the control mode selection means 33 outputs the control effecting signal to the yaw rate feedback control means 30 and sets the flag J to zero. The threshold value D2 is increased as the absolute value of the rate of change dXf(n) in the steering angle Xf(n) of the front wheel 2, 2 increases, namely, as the turning rate of the steering wheel 1 increases so that when the driver is quickly turning the steering wheel 1, the control means for controlling the steering angle Xr(n) of the rear wheels 3, 3 is changed from the side slip angle control means 31 to the yaw rate feedback control means 30 even though the absolute value of the difference between the side slip angle control value Rz(n) and the yaw rate feedback control value Ry(n) is relatively great, and that, on the other hand, when the driver is slowly turning the steering wheel 1, the control means for controlling the steering angle Xr(n) of the rear wheels 3, 3 is not changed from the side slip angle control means 31 to the yaw rate feedback control means 30 until the absolute value of the difference between the side slip angle control value Rz(n) and the yaw rate feedback control value Ry(n) has become extremely small. So, when the turning rate of the steering wheel 1 is great and the absolute value of the rate of change dXf(n) in the steering angle Xf(n) of the front wheel 2, 2 is great, since the control means for controlling the steering angle Xr(n) of the rear wheels 3, 3 is changed from the side slip angle control means 31 to the yaw rate feedback control means 30 while the absolute value of the difference between the side slip angle control value Ry(n) and the yaw rate feedback control value Ry(n) is great, the behavior of the vehicle is greatly changed. However, in this case, since the driver is quickly turning the steering wheel 1 and expects that the behavior of the vehicle will be greatly changed, no problem occurs, even if the control means for controlling the steering angle Xr(n) of the rear wheels 3, 3 is changed from the side slip angle control means 31 to the yaw rate feedback control means 30 while the absolute value of the difference between the side slip angle control value Rz(n) and the yaw rate feedback control value Ry(n) is great. Rather, since the fact that the steering wheel 1 is being turned back means that the control means for controlling the steering angle Xr(n) of the rear wheels 3, 3 will be changed from the side slip angle control means 31 to the yaw rate feedback control means 30 in a short time, it is desirable to quickly start the yaw rate feedback control for improving the driving stability. On the other hand, when the driver is likely to feel uncomfortable and the riding comfort will be lowered, if the behavior of the vehicle is greatly changed when he is slowly turning the steering wheel 1 and the absolute value of the rate of change dXf(n) in the steering angle Xf(n) of the front wheels 2, 2 is small. The threshold value D2 is therefore set to a small value with the intention of enabling the control means for controlling the steering angle Xr(n) of the rear wheels 3, 3 to be smoothly changed from the side slip angle control means 31 to the yaw rate feedback control means 30. Thus, the threshold value D2 is increased as the absolute value of the rate of change $dXf(n)$ in the steering angle $Xf(n)$ of the front wheels 2, 2 increases and the threshold value D2 is decreased as the absolute value of the rate of change $dXf(n)$ in the steering angle $Xf(n)$ of the front wheels 2, 2 decreases.

On the contrary, when the absolute value of the difference between the side slip angle control value $Rz(n)$ and the yaw rate feedback control value $Ry(n)$ is greater than the threshold value D2, since it can be considered that the steering angle $Xr(n)$ of the rear wheels 3, 3 should continue to be controlled by the side slip angle control means 31, the control mode selection means 33 outputs the control effecting signal to the side slip angle control means 31.

The above described control is repeated at predetermined time intervals and the rear wheels 3, 3 are steered accordingly.

According to this embodiment, since the rear wheels 3, 3 are steered by the yaw rate feedback control means 30 in the stable driving state corresponding to the area S1 so as to make the detected yaw rate $Y(n)$ become equal to the target yaw rate $Yo(n)$ determined based upon the steering angle of the steering wheel 1, it is possible to steer the rear wheels 3, 3 in a desired manner. On the other hand, since the rear wheels 3, 3 are steered by the side slip angle control means 31 in the state where the absolute value of the estimated value $z(n)$ of the side slip angle is greater than the predetermined value z0 and the vehicle is being sharply turned and subjected to a large lateral acceleration $GL(n)$, in such a manner that the greater the estimated value $z(n)$ of the side slip angle is, the more the rear wheels 3, 3 are steered in the same phase as that of the front wheels 2, 2, namely, in the same direction as that of the front wheels 2, 2 with respect to the longitudinal center line of the vehicle, it is possible to prevent the rear wheels 3, 3 from being steered in the reverse phase with respect to that of the front wheels 2, 2 by the yaw rate feedback control means 30 and prevent the driving stability from being lowered. Furthermore, in the state corresponding to the area S3 where the absolute value of the deviation $E(n)$ between the target yaw rate $Yo(n)$ and the detected yaw rate $Y(n)$ is greater than the predetermined value E0 and the absolute value of the rate of change $dE(n)$ in the deviation $E(n)$ is greater than the predetermined value dE0, in other words, when the vehicle is turning extremely sharply and there is considerable risk of excessive oversteering, since the rear wheels 3, 3 are steered by the fuzzy control means 32 so as to reduce the absolute value of the rate of change $dY(n)$ in the detected yaw rate $Y(n)$, it is possible to improve the driving stability even in this unstable state without a large computer. Moreover, since when the steering wheel 1 is turned back in the opposite direction while the steering angle $Xr(n)$ of the rear wheels 3, 3 is being controlled by the side slip angle control means 31, it can be considered that the steering angle $Xr(n)$ of the rear wheels 3, 3 will be controlled by the yaw rate feedback control means 30 in a short time, this embodiment is arranged such that, even when the absolute value of the estimated value $z(n)$ of the side slip angle becomes equal to or smaller than the predetermined value z0, if the steering wheel 1 is turned back in the opposite direction and the absolute value of the difference between the side slip angle control value $Rz(n)$ calculated by the side slip angle control means 31 and the yaw feedback control value $Ry(n)$ calculated by the yaw feedback control means 30 becomes lower than the threshold value D2, the control means for controlling the steering angle $Xr(n)$ of the rear wheels 3, 3 is changed from the side slip angle control means 31 to the yaw feedback control means 30 and the threshold value D2 is increases as the absolute value of the rate of change $dXf(n)$ in the steering angle $Xf(n)$ of the front wheels 2, 2 increases and the threshold value D2 is decreased as the absolute value of the rate of change $dXf(n)$ in the steering angle $Xf(n)$ of the front wheels 2, 2 decreases. Therefore, in a situation where the driver is quickly turning the steering wheel 1 and expects that the behavior of the vehicle will be greatly changed, since the yaw rate feedback control is started when the absolute value of the difference between the side slip angle control value $Rz(n)$ and the yaw feedback control value $Ry(n)$ becomes relatively large, it is possible to improve the driving stability. On the other hand, when the driver is slowly turning the steering wheel 1, since the yaw rate feedback control is not started until the absolute value of the difference between the side slip angle control value $Rz(n)$ and the yaw feedback control value $Ry(n)$ becomes extremely small, the behavior of the vehicle can be prevented from being greatly changed on changing the control means for controlling the steering angle $Xr(n)$ of the rear wheels 3, 3 and it is possible to simultaneously improve the driving stability and the riding comfort without making the driver feel uncomfortable. Further, since when the steering wheel 1 is turned back in the opposite direction while the steering angle $Xr(n)$ of the rear wheels 3, 3 is being controlled by the fuzzy control means 32, it can be considered that the steering angle $Xr(n)$ of the rear wheels 3, 3 will be controlled by the yaw rate feedback control means 30 in a short time, this embodiment is arranged such that, even when the absolute value of the deviation $E(n)$ between the target yaw rate $Yo(n)$ and the detected yaw rate $Y(n)$ does not become equal to or smaller than the predetermined value E0 and the rate of change $dE(n)$ in the deviation $E(n)$ does not become equal to or smaller than the predetermined value dE0, if the steering wheel 1 is turned back in the opposite direction and the absolute value of the difference between the side slip angle control value $Rf(n)$ calculated by the fuzzy control means 32 and the yaw feedback control value $Ry(n)$ calculated by the yaw feedback control means 30 becomes lower than the threshold value D1, the control means for controlling the steering angle $Xr(n)$ of the rear wheels 3, 3 is changed from the fuzzy control means 32 to the yaw feedback control means 30 and the threshold value D1 is increased as the absolute value of the rate of change $dXf(n)$ in the steering angle $Xf(n)$ of the front wheels 2, 2 increases and the threshold value D1 is decreased as the absolute value of the rate of change $dXf(n)$ in the steering angle $Xf(n)$ of the front wheels 2, 2 decreases. Therefore, in a situation where the driver is quickly turning the steering hand 1 and expects that the behavior of the vehicle will be greatly changed, since the yaw rate feedback control is started when the absolute value of the difference between the fuzzy control value $Rf(n)$ and the yaw feedback control value $Ry(n)$ becomes relatively large, it is possible to improve the driving stability. On the other hand, when the driver is slowly turning the steering wheel 1, since the yaw rate feedback control is not started until the absolute value of the difference between the fuzzy control value $Rf(n)$ and the yaw feedback control value $Ry(n)$ becomes extremely small, the behavior of the vehicle can be prevented from being greatly changed on changing the control means for controlling the steering angle Xr(n) of the rear wheels 3, 3 and it is possible to simultaneously improve the driving stability and the riding comfort without making the driver feel uncomfortable.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, although the control unit 29 comprises the yaw rate feedback control means 30, the side slip angle control means 31 and the fuzzy control means 32 as the control means for controlling the steering angle of the rear wheels 3, 3, if a computer having a quick response speed is employed, the steering angle of the rear wheels 3, 3 can be controlled by the side slip angle control means 31 under the state where the steering angle of the rear wheels 3, 3 is controlled by the fuzzy control means 32 in the above described embodiments and if an appropriate membership function is determined, the steering angle of the rear wheels 3, 3 can be controlled by the fuzzy control means 32 under the state where the steering angle of the rear wheels 3, 3 is controlled by the side slip angle control means 31 in the above described embodiments.

Further, in the above described embodiments, although the control means for controlling the steering angle of the rear wheels 3, 3 is changed from the yaw rate feedback control means 30 to the side slip angle control means 31 when the absolute value of the estimated value z of the side slip angle becomes greater than the predetermined value z0, the ratio between the steering angle Xr of the rear wheels 3, 3 and the steering angle Xf of the front wheels 2, 2 may be fixed under the state where the absolute value of the estimated value z of the side slip angle becomes greater than the predetermined value z0.

Figure 25:
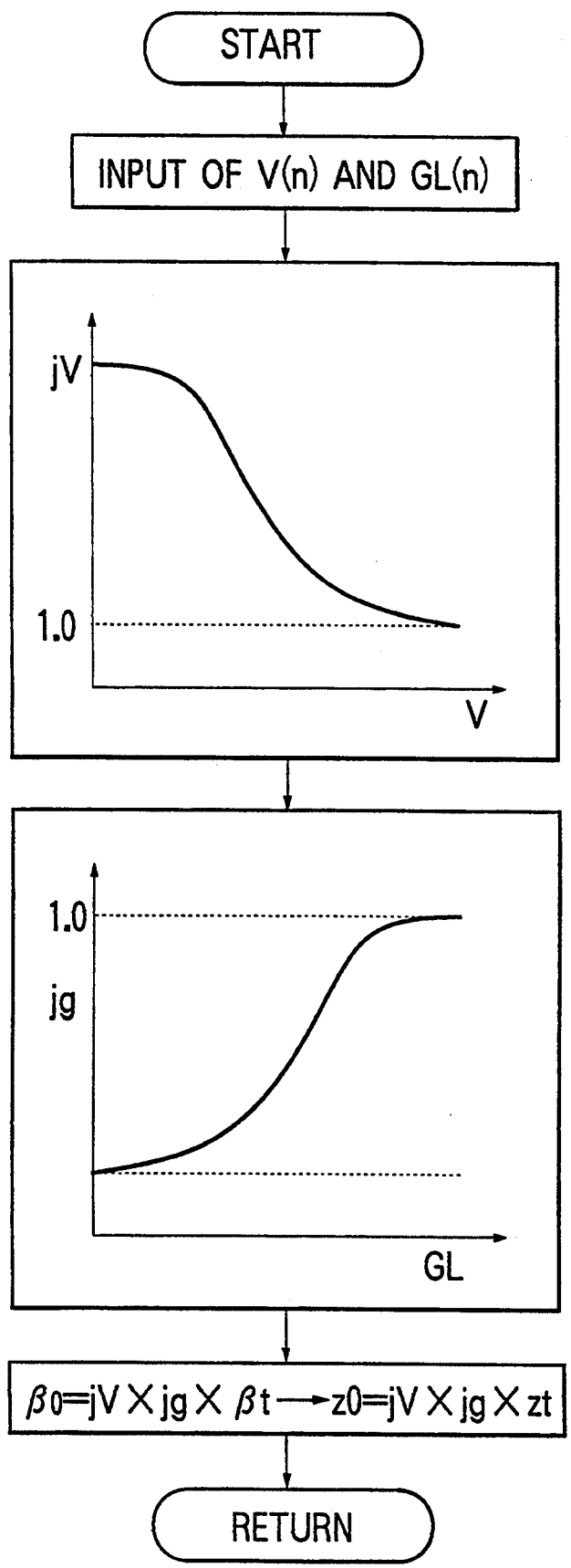
FIG. 25 is a flow chart showing an example of a method for determining a value z0.

Furthermore, in the above described embodiments, although the value z0 is set to be constant, the value z0 may be changed depending upon the vehicle speed V, the lateral acceleration GL and the like. FIG. 25 is a flow chart showing an example of a method for determining the value z0 as a function of the vehicle speed V and the lateral acceleration GL. In FIG. 25, the value z0 is determined by the side slip angle calculating means 34 based on a threshold value zt, a coefficient jv dependent on the vehicle speed V and a coefficient jg dependent on the lateral acceleration GL, in accordance with the following formula (13).

$$z0 = jv \times jg \times zt \tag{13}$$

More specifically, at first, the coefficient jv is determined as a function of the vehicle speed V. The coefficient jv is set so as to converge on 1.0 as the vehicle speed V becomes greater. This is because the side slip angle control can be effected at a low absolute value of the estimated value z(n) of the side slip angle since the driver tends to feel anxious as the vehicle speed becomes greater. The coefficient jg is then determined as a function of the lateral acceleration GL. In FIG. 25, the coefficient jg is set so as to converge on 1.0 as the lateral acceleration GL becomes greater. This is because the side slip angle control can be effected at a low absolute value of the estimated value z(n) of the side slip angle when the vehicle is being driven on a road having a low road surface friction coefficient. In FIG. 25, although the value z0 is determined as a function of the vehicle speed V and the lateral acceleration GL only, it may be determined as a function not only of these but also of other driving parameters or as a function of other driving parameters only.

Moreover, in the above described embodiments, although the yaw rate sensor 42 is used as the turning state detecting means for detecting the yaw rate Y, the yaw rate Y may be calculated from the lateral acceleration GL detected by the lateral acceleration sensor 43, or from the vehicle speed V detected by the vehicle speed sensor 40 and the steering angle Xf of the front wheels 2, 2 detected by the steering angle sensor 41. Further, the yaw rate Y may be calculated from the vehicle speed V detected by the vehicle speed sensor 40 and the steering angle Xf of the front wheels 2, 2 detected by the steering angle sensor 41 without employing the lateral acceleration sensor 43.

Furthermore, the formula (1) for estimating the value z of the slip angle and the formula (2) for calculating the target yaw rate Yo in the above described embodiments are merely examples. The estimated value z of the slip angle can instead be calculated by the Karman filter method, the observer method or the like and the target yaw rate Yo can be calculated using other calculation formulae. Further, as the sensors for detecting the driving conditions of the vehicle, appropriate sensors may be selected as occasion demands and, therefore, it is not absolutely necessary to use all of the vehicle speed sensor 40, the steering angle sensor 41, the yaw rate sensor 42 and the lateral acceleration sensor 43 but other sensors may be used.

Moreover, in the above described embodiments, although control of the steering angle Xr of the rear wheels 3, 3 is effected by fuzzy control when the absolute value of the deviation E between the target yaw rate Yo and the detected yaw rate Y is greater than the predetermined value E0 and the absolute value of the rate of change dE in the deviation E is greater than the predetermined value dE0, control of the steering angle Xr of the rear wheels 3, 3 may be effected by fuzzy control when the absolute value of the deviation E between the target yaw rate Yo and the detected yaw rate Y is greater than the predetermined value E0 or when the absolute value of the rate of change dE in the deviation E is greater than the predetermined value dE0. Further, in the above described embodiments, although the membership function for the fuzzy control is determined as a function of the deviation E between the target yaw rate Yo and the detected yaw rate Y and the rate of change dE in the deviation E, it is sufficient to determine the membership function as a function of the target yaw rate Yo and the detected yaw rate Y and the membership function may be determined as a function of one of the deviation E and the rate of change dE in the deviation E. Still further, control of the steering angle Xr of the rear wheels 3, 3 may be effected by fuzzy control when the absolute value of the lateral acceleration GL is greater than a predetermined value irrespective of the deviation E and the rate of change dE in the deviation E. Moreover, the membership function may be determined as a function of the lateral acceleration GL and/or the rate of change thereof, or the steering angle Xf, the changing speed of the steering angle Xr and the rate of change in the changing speed of the steering angle Xf.

Further, in the embodiment shown in FIG. 5, even in the case where the control mode selection means 33 judges that the fuzzy control or the side slip angle control should be effected, if the absolute value of the detected yaw rate Y(n) in the current control cycle is smaller than that of the detected yaw rate Y(n−1) in the preceding control cycle and the absolute value of the steering angle Xf(n) in the current control cycle is smaller than that of the steering angle Xf(n−1) in the preceding control cycle, the control mode selection means 33 judges that the control means for controlling the steering angle Xr(n) of the rear wheels 3, 3 will be changed from the fuzzy control or the side slip angle control to the yaw rate feedback control means 30 in a short time and causes the yaw rate feedback control means 30 to immediately control the steering angle Xr(n) of the rear wheels 3, 3. However, it is alternatively possible to use an arrangement wherein, if the absolute value of the detected yaw rate Y(n) in the current control cycle is smaller than that of the detected yaw rate Y(n−1) in the preceding control cycle, the control mode selection means 33 judges that the control means for controlling the steering angle Xr(n) of the rear wheels 3, 3 will be changed from the fuzzy control or the side slip angle control to the yaw rate feedback control means 30 in a short time and causes the yaw rate feedback control means 30 to immediately control the steering angle Xr(n) of the rear wheels 3, 3, or if the absolute value of the deviation E(n) between the target yaw rate Yo(n) and the detected yaw rate Y(n) in the current control cycle is smaller than that of the deviation E(n−1) in the preceding control cycle, the control mode selection means 33 judges that the control means for controlling the steering angle Xr(n) of the rear wheels 3, 3 will be changed from the fuzzy control or the side slip angle control to the yaw rate feedback control means 30 in a short time and causes the yaw rate feedback control means 30 to immediately control the steering angle Xr(n) of the rear wheels 3, 3.

Furthermore, in the above described embodiments, it was explained that the steering angle Xr of the rear wheels 3, 3 is controlled by the fuzzy control means 32 in the area S3 in FIG. 4. However, the relationship between the tire cornering force C.F. and the absolute value of the estimated value z of the side slip angle is changed depending on the road surface friction coefficient as shown in FIG. 4 and, therefore, when the vehicle is driven on a road having a medium or greater road surface friction coefficient, it can be driven only in the areas S1 and S2 and cannot be driven in the area S3. As a result, the fuzzy control is not necessarily effected. On the other hand, if the vehicle is driven on a road having a low road surface friction coefficient, the area S2 where the side slip angle control is effected is very narrow, as shown in FIG. 4, and, as a result, the fuzzy control can be immediately effected without effecting the side slip angle control since there is adequate time to effect the side slip angle control.

Moreover, in the embodiment shown in FIG. 7, XrL1(n) is used indiscriminately as the first limit value when the control means for controlling the steering angle Xr(n) of the rear wheels 3, 3 is changed from the yaw rate feedback control means 30 to the fuzzy control means 32, from the side slip angle control means 31 to the fuzzy control means 32, from the side slip angle control means 31 to the yaw rate feedback control means 30, from the fuzzy control means 32 to the yaw rate feedback control means 30, or from the fuzzy control means 32 to the side slip angle control means 31 in the current control cycle. However, different limit values may be used for each individual case or different limit values may be used only in some cases. Further, the graphs of FIGS. 8 and 9 merely show examples of the relationship between the first limit value XrL1(n), the second limit value XrL2(n), the lateral acceleration GL, the road surface friction coefficient and the rate of change dXf in the steering angle Xf of the front wheels 2, 2. Therefore, it is not absolutely necessary to determine the relationship therebetween as shown in FIGS. 8 and 9 and the relationship may be determined in some other desired manner.

Furthermore, in the embodiment shown in FIG. 7, although the first limit value XrL1(n) and the second limit value XrL2(n) are determined based on the lateral acceleration GL, the road surface friction coefficient and the rate of change dXf in the steering angle Xf of the front wheels 2, 2, alternatively the first limit value XrL1(n) and the second limit value XrL2(n) may be determined based partly or wholly on other driving conditions.

Further, in the embodiment shown in FIGS. 10 and 11, when the steering angle restricting means 35 judges that the steering wheel 1 once turned in one direction, causing the target yaw rate Yo(n) and the detected yaw rate Y(n) to begin to increase, has been turned back in the other direction, causing the target yaw rate Yo(n) to begin to decrease, but further judges that since the detected yaw rate Y(n) is still increasing due to the delay of control, the absolute value of the deviation E(n) between the target yaw rate Yo(n) and the detected yaw rate Y(n) is greater than the predetermined value E1 and the absolute value of deviation E(n) is further increasing, it then controls the steering angle Xr(n) of the rear wheels 3, 3 so as to make it equal to the steering angle Xr(n−1) in the preceding control cycle. However, it is sufficient for the rear wheels 3, 3 to be steered at a steering rate lower than the steering rate calculated by the yaw rate feed back control means 30, the side slip angle control means 31 or the fuzzy control means 32, whichever is selected by the control mode selection means 33, and it is not absolutely necessary to hold the steering angle Xr(n) constant.

Furthermore, in the embodiment shown in FIGS. 10 and 11, when the steering angle restricting means 35 judges that the steering wheel 1 once turned in one direction, causing the target yaw rate Yo(n) and the detected yaw rate Y(n) to begin to increase, has been turned back in the other direction, causing the target yaw rate Yo(n) to begin to decrease, but further judges that since the detected yaw rate Y(n) is still increasing due to the delay of control, the absolute value of the deviation E(n) between the target yaw rate Yo(n) and the detected yaw rate Y(n) is greater than the predetermined value E1 and the absolute value of deviation E(n) is further increasing, it then controls the steering angle Xr(n) of the rear wheels 3, 3 so as to make it equal to the steering angle Xr(n−1) in the preceding control cycle and when the detected yaw rate Y(n) thereafter goes over its peak value and stops increasing, the yaw rate feedback control is immediately effected even though the control mode selection means 33 has output a control signal to the side slip angle control means 31 or the fuzzy control means 32. Alternatively, however, the steering angle Xr(n) of the rear wheels 3, 3 may be controlled by the control means selected by the control mode selection means 33 at the time the detected yaw rate Y(n) begins to decrease and it is not absolutely necessary to force the yaw rate feedback control means 30 to control the steering angle Xr(n) of the rear wheels 3, 3, if there is little risk of the driving stability being lowered.

Moreover, in the embodiment shown in FIG. 13, after the steering wheel 1 once turned in one direction, causing the target yaw rate Yo(n) and the detected yaw rate Y(n) to begin to increase, has been turned back in the other direction, causing the target yaw rate Yo(n) to begin to decrease, but, owing to the delay of control, not causing the increase in the detected yaw rate Y(n) to stop, so that the absolute value of the deviation E(n) between the target yaw rate Yo(n) and the detected yaw rate Y(n) is greater than the predetermined value E2 and the absolute value of the rate dE(n) of change of the deviation E(n) is greater than the predetermined value dE1, the steering angle restricting means 35 controls the steering angle Xr(n) of the rear wheels 3, 3 so that the steering amount of the rear wheels 3, 3 becomes maximum and the detected yaw rate Y(n) decreases and thereafter when the detected yaw rate Y(n) goes over its peak value and stops increasing, the yaw rate feedback control is immediately effected even though the control mode selection means 33 has output a control signal to the side slip angle control means 31 or the fuzzy control means 32. Alternatively, however, the steering angle Xr(n) of the rear wheels 3, 3 may be controlled by the control means selected by the control mode selection means 33 at the time the detected yaw rate Y(n) begins to decrease and it is not absolutely necessary to force the yaw rate feedback control means 30 to control the steering angle Xr(n) of the rear wheels 3, 3, if there is little risk of the driving stability being lowered.

Further, in the embodiment shown in FIG. 13, although it is made a condition for controlling the steering angle Xr(n) of the rear wheels 3, 3 by the steering angle restricting means 35 and also for controlling it by the fuzzy control means 32 that the absolute value of the deviation E(n) exceeds the predetermined value E0, it is sufficient to make it a condition for controlling the steering angle Xr(n) of the rear wheels 3, 3 by the fuzzy control means 32 that the rate of change dE(n) in the deviation E(n) between the target yaw rate Yo(n) and the detected yaw rate Y(n) is greater than the predetermined value dE0 and make it a condition for controlling the steering angle Xr(n) of the rear wheels 3, 3 by the steering angle restricting means 35 that the rate dE(n) of change in the deviation E(n) between the target yaw rate Yo(n) and the detected yaw rate Y(n) is greater than the predetermined value dE1 greater than the predetermined value dE0. Therefore, it is possible to make it a condition for controlling the steering angle Xr(n) of the rear wheels 3, 3 by fuzzy control means 32 that the rate of change dE(n) in the deviation E(n) between the target yaw rate Yo(n) and the detected yaw rate Y(n) is greater than the predetermined value dE3 and make it a condition for controlling the steering angle Xr(n) of the rear wheels 3, 3 by the steering angle restricting means 35 that the rate of change dE(n) in the deviation E(n) between the target yaw rate Yo(n) and the detected yaw rate Y(n) is greater than the predetermined value dE4 greater than the predetermined value dE3.

Furthermore, in the embodiment shown in FIG. 16, although the correction coefficient C1 is set in accordance with the map shown in FIG. 16, this is only one example and the method for setting the correction coefficient C1 is not limited to that shown in FIG. 16. Therefore, the correction coefficient C1 may be set to correct the membership function of the fuzzy control means 32 so that the fuzzy control value for the steering angle Xr(n) of the rear Wheels 3, 3 linearly or non-linearly increases as the absolute value of the lateral acceleration GL(n) decreases or be set to correct the membership function of the fuzzy control means 32 so that the fuzzy control value for the steering angle Xr(n) of the rear wheels 3, 3 is constant when the absolute value of the lateral acceleration GL(n) is greater than a predetermined value and the correction coefficient C1 linearly or non-linearly increases as the absolute value of the lateral acceleration GL(n) decreases when the absolute value of the lateral acceleration GL(n) is not greater than the predetermined value.

Moreover, although the conclusion portion of the membership function of the fuzzy control means 32 is corrected by using the correction coefficient C1 calculated by the function correcting means 36 in the embodiment shown in FIG. 16 and the antecedent portion of the membership function of the fuzzy control means 32 is corrected by the function correcting means 36, the function correcting means 36 may be constituted so as to output a correction signal for correcting the antecedent portion and the conclusion portion of the membership function of the fuzzy control means 32 in accordance with the absolute value of the lateral acceleration GL(n), or it is possible to constitute the fuzzy control means 32 so as to store a plurality of membership functions differing either their antecedent portion or their conclusion portion or differing in both their antecedent portion and their conclusion portion and constitute the function correcting means 36 so as to select particular membership function(s) among them in accordance with the absolute value of the lateral acceleration GL(n).

Further, in the embodiments shown in FIGS. 16 and 17, although the antecedent portion and/or the conclusion portion of the membership function of the fuzzy control means 32 is corrected based upon the lateral acceleration GL(n), it is possible to directly detect the road surface friction coefficient by means of laser or the like and correct the antecedent portion and/or the conclusion portion of the membership function of the fuzzy control means 32 so that the control value for the steering angle Xr(n) of the rear wheels 3, 3 becomes greater as the road surface friction coefficient becomes lower. In this case, for correcting the antecedent portion and/or the conclusion portion of the membership function of the fuzzy control means 32 so that the control value for the steering angle Xr(n) of the rear wheels 3, 3 linearly increases as the road surface friction coefficient decreases, the membership function may be corrected so that the control value for the steering angle Xr(n) of the rear wheels 3, 3 linearly increases as the road surface friction coefficient decreases, the membership function may be corrected so that the control value for the steering angle Xr(n) of the rear wheels 3, 3 non-linearly increases as the road surface friction coefficient decreases, or the membership function may be corrected so that the control value for the steering angle Xr(n) of the rear wheels 3, 3 remains constant when the road surface coefficient is greater than a predetermined value and that it linearly or non-linearly increases as the road surface friction coefficient decreases when the road surface friction coefficient is not greater than the predetermined value.

Still further, in the embodiment shown in FIGS. 22 and 23, when the correction signal is output from the control value correcting means 38, the side slip angle control means 31 corrects the side slip angle control value Rz(n) so as to become greater or smaller by a steering angle proportional to the absolute value of the rate of change dz(n) of the estimated value z(n) of the side slip angle. However, the correction value for correcting the side slip angle control value Rz(n) need not necessarily be proportional to the absolute value of the rate of change dz(n) of the estimated value z(n) of the side slip angle and it is possible to experimentally or theoretically determine the correction value for correcting the side slip angle control value Rz(n) and store it in the control value correcting means 38 or the side slip angle control means 31 in the form of a map or table, and to retrieve from the map or table the correcting value corresponding to the absolute value of the rate of change dz(n) of the estimated value z(n) of the side slip angle.

I claim:

1. A rear wheel steering system for a vehicle comprising:
    turning state detecting means for physically detecting a turning state of the vehicle;
    yaw rate feedback control means for controlling a steering angle of rear wheels so that a yaw rate detected by the turning state detecting means is made equal to a target yaw rate;
    a second rear wheel steering angle control means adapted for controlling the steering angle of the rear wheels based on a control mode different from that of the yaw rate feedback control means; and
    a control mode selection means for causing the second rear wheel steering angle control means to control the steering angle of the rear wheels when the vehicle is turning with a turning radius smaller than a first predetermined turning radius and causing the yaw rate feedback control means to control the steering angle of the rear wheels when the vehicle is turning with a turning radius equal to or greater than the first predetermined turning radius;
    wherein the control mode selection means causes the yaw rate feedback control means to control the steering angle of the rear wheels when, during control of the steering angle of the rear wheels by the second rear wheel steering angle control means, an absolute value of a deviation between the detected yaw rate and the target yaw rate begins to decrease.

2. A rear wheel steering system for a vehicle comprising:
    turning state detecting means for physically detecting a turning state of the vehicle;
    yaw rate feedback control means for controlling a steering angle of rear wheels so that a yaw rate detected by the turning state detecting means is made equal to a target yaw rate;
    a second rear wheel steering angle control means adapted for controlling the steering angle of the rear wheels based on a control mode different from that of the yaw rate feedback control means;
    a control mode selection means for causing the second rear wheel steering angle control means to control the steering angle of the rear wheels when the vehicle is turning with a turning radius smaller than a first predetermined turning radius and causing the yaw rate feedback control means to control the steering angle of the rear wheels when the vehicle is turning with a turning radius equal to or greater than the first predetermined turning radius;
    a third rear wheel steering angle control means adapted for controlling the steering angle of the rear wheels based on a control mode different from those of the yaw rate feedback control means and the second rear wheel steering angle control means, the control mode selection means being adapted for causing the second rear wheel steering angle control means to control the steering angle of the rear wheels when the vehicle is turning with a turning radius smaller than the first predetermined turning radius but greater than a second predetermined turning radius and causing the third rear wheel steering angle control means to control the steering angle of the rear wheels when the vehicle is turning with a turning radius equal to or smaller than the second predetermined turning radius; and
    side slip angle calculating means for estimating a side slip angle of the vehicle, the second rear wheel steering angle control means being constituted as a side slip angle control means adapted for controlling the steering angle of the rear wheels to decrease an absolute value of the estimated side slip angle calculated by the side slip angle calculating means and the third rear wheel steering angle control means being constituted as a fuzzy control means adapted for controlling the steering angle of the rear wheels based on fuzzy control to decrease an absolute value of a rate of change in the detected yaw rate;
    wherein, in changing the control means for controlling the steering angle of the rear wheels between the yaw rate feedback control means and the other control means for controlling the steering angle of the rear wheels, the control means determines whether or not an amount of change in the steering angle of the rear wheels is greater than a predetermined limit value and when it is, controls the steering angle of the rear wheels so that the amount of change in the steering angle of the rear wheels is made equal to the predetermined limit value and the predetermined limit value used when the control means for controlling the steering angle of the rear wheels is to be changed from the yaw rate feedback control means to the side slip angle control means is set smaller than the predetermined limit value used when the control means is to be changed between other control means.

3. A rear wheel steering system for a vehicle comprising:
    turning state detecting means for physically detecting a turning state of the vehicle;
    yaw rate feedback control means for controlling a steering angle of rear wheels so that a yaw rate detected by the turning state detecting means is made equal to a target yaw rate;
    a second rear wheel steering angle control means adapted for controlling the steering angle of the rear wheels based on a control mode different from that of the yaw rate feedback control means;
    a control mode selection means for causing the second rear wheel steering angle control means to control the steering angle of the rear wheels when the vehicle is turning with a turning radius smaller than a first predetermined turning radius and causing the yaw rate feedback control means to control the steering angle of the rear wheels when the vehicle is turning with a turning radius equal to or greater than the first predetermined turning radius;

a third rear wheel steering angle control means adapted for controlling the steering angle of the rear wheels based on a control mode different from those of the yaw rate feedback control means and the second rear wheel steering angle control means, the control mode selection means being adapted for causing the second rear wheel steering angle control means to control the steering angle of the rear wheels when the vehicle is turning with a turning radius smaller than the first predetermined turning radius but greater than a second predetermined turning radius and causing the third rear wheel steering angle control means to control the steering angle of the rear wheels when the vehicle is turning with a turning radius equal to or smaller than the second predetermined turning radius; and side slip angle calculating means for estimating a side slip angle of the vehicle, the second rear wheel steering angle control means being constituted as a side slip angle control means adapted for controlling the steering angle of the rear wheels to decrease an absolute value of the estimated side slip angle calculated by the side slip angle calculating means and the third rear wheel steering angle control means being constituted as a fuzzy control means adapted for controlling the steering angle of the rear wheels based on fuzzy control to decrease an absolute value of a rate of change in the detected yaw rate;

wherein the fuzzy control means is adapted for controlling the rear wheels based on a deviation between the target yaw rate and the detected yaw rate and/or a rate of change in the deviation to decrease an absolute value of the rate of change in the detected yaw rate, in changing the control means for controlling the steering angle of the rear wheels between the yaw rate feedback control means and the other control means for controlling the steering angle of the rear wheels, the control means determines whether or not an amount of change in the steering angle of the rear wheels is greater than a predetermined limit value and when it is, controls the steering angle of the rear wheels so that the amount of change in the steering angle of the rear wheels is made equal to the predetermined limit value, and the predetermined limit value used when the control means for controlling the steering angle of the rear wheels is to be changed from the yaw rate feedback control means to the side slip angle control means is set smaller than the predetermined limit value used when the control means is to be changed between other control means.

4. A rear wheel steering system for a vehicle comprising:

turning state detecting means for physically detecting a turning state of the vehicle;

yaw rate feedback control means for controlling a steering angle of rear wheels so that a yaw rate detected by the turning state detecting means is made equal to a target yaw rate;

a second rear wheel steering angle control means adapted for controlling the steering angle of the rear wheels based on a control mode different from that of the yaw rate feedback control means;

a control mode selection means for causing the second rear wheel steering angle control means to control the steering angle of the rear wheels when the vehicle is turning with a turning radius smaller than a first predetermined turning radius and causing the yaw rate feedback control means to control the steering angle of the rear wheels when the vehicle is turning with a turning radius equal to or greater than the first predetermined turning radius;

a third rear wheel steering angle control means adapted for controlling the steering angle of the rear wheels based on a control mode different from those of the yaw rate feedback control means and the second rear wheel steering angle control means, the control mode selection means being adapted for causing the second rear wheel steering angle control means to control the steering angle of the rear wheels when the vehicle is turning with a turning radius smaller than the first predetermined turning radius but greater than a second predetermined turning radius and causing the third rear wheel steering angle control means to control the steering angle of the rear wheels when the vehicle is turning with a turning radius equal to or smaller than the second predetermined turning radius; and side slip angle calculating means for estimating a side slip angle of the vehicle, the second rear wheel steering angle control means being constituted as a side slip angle control means adapted for controlling the steering angle of the rear wheels to decrease an absolute value of the estimated side slip angle calculated by the side slip angle calculating means and the third rear wheel steering angle control means being constituted as a fuzzy control means adapted for controlling the steering angle of the rear wheels based on fuzzy control to decrease an absolute value of a rate of change in the detected yaw rate;

wherein the fuzzy control means is adapted for controlling the rear wheels when an absolute value of the deviation between the target yaw rate and the detected yaw rate is greater than a predetermined value and/or an absolute value of the rate of change in the deviation is greater than a predetermined value, in changing the control means for controlling the steering angle of the rear wheels between the yaw rate feedback control means and the other control means for controlling the steering angle of the rear wheels, the control means determines whether or not an amount of change in the steering angle of the rear wheels is greater than a predetermined limit value and when it is, controls the steering angle of the rear wheels so that the amount of change in the steering angle of the rear wheels is made equal to the predetermined limit value, and the predetermined limit value used when the control means for controlling the steering angle of the rear wheels is to be changed from the yaw rate feedback control means to the side slip angle control means is set smaller than the predetermined limit value used when the control means is to be changed between other control means.

5. A rear wheel steering system for a vehicle comprising:

turning state detecting means for physically detecting a turning state of the vehicle;

yaw rate feedback control means for controlling a steering angle of rear wheels so that a yaw rate detected by the turning state detecting means is made equal to a target yaw rate;

a second rear wheel steering angle control means adapted for controlling the steering angle of the rear wheels based on a control mode different from that of the yaw rate feedback control means;

a control mode selection means for causing the second rear wheel steering angle control means to control the steering angle of the rear wheels when the vehicle is turning with a turning radius smaller than a first predetermined turning radius and causing the yaw rate feedback control means to control the steering angle of the rear wheels when the vehicle is turning with a turning radius equal to or greater than the first predetermined turning radius; and steering rate restricting means adapted for restricting a steering rate of the rear wheels so as to steer the rear wheels at a steering rate lower than a steering rate calculated by the yaw rate feedback control means, when, during increase of an absolute value of the detected yaw rate, an absolute value of a deviation between the detected yaw rate and the target yaw rate exceeds a predetermined value; wherein the steering angle restricting means stops restricting the steering rate and the control mode selection means causes the yaw rate feedback control means to control the steering angle of the rear wheels when the absolute value of the deviation between the detected yaw rate and the target yaw rate begins to decrease.

6. A rear wheel steering system for a vehicle comprising:

turning state detecting means for physically detecting a turning state of the vehicle;

yaw rate feedback control means for controlling a steering angle of rear wheels so that a yaw rate detected by the turning state detecting means is made equal to a target yaw rate;

a second rear wheel steering angle control means adapted for controlling the steering angle of the rear wheels based on a control mode different from that of the yaw rate feedback control means; and a control mode selection means for causing the second rear wheel steering angle control means to control the steering angle of the rear wheels when the vehicle is turning with a turning radius smaller than a first predetermined turning radius and causing the yaw rate feedback control means to control the steering angle of the rear wheels when the vehicle is turning with a turning radius equal to or greater than the first predetermined turning radius; wherein in changing the control means for controlling the steering angle of the rear wheels between the yaw rate feedback control means and the second rear wheel steering angle control means, the control means determines whether or not an amount of change in the steering angle of the rear wheels is greater than a predetermined limit value and when it is, controls the steering angle of the rear wheels so that the amount of change in the steering angle of the rear wheels is made equal to the predetermined limit value.

7. A rear wheel steering system for a vehicle in accordance with claim 6 further comprising lateral acceleration detecting means for detecting a lateral acceleration, and the predetermined limit value being increased as an absolute value of the lateral acceleration detected by the lateral acceleration detecting means increases.

8. A rear wheel steering system for a vehicle in accordance with claim 6 further comprising road surface friction coefficient detecting means for detecting a road surface friction coefficient, and the predetermined limit value being increased as the road surface friction coefficient decreases.

9. A rear wheel steering system for a vehicle in accordance with claim 6 further comprising steering angle detecting means for detecting a steering angle of a steering wheel, and the predetermined limit value being increased as an absolute value of a rate of change in the steering angle detected by the steering angle detecting means increases.

10. A rear wheel steering system for a vehicle comprising:

turning state detecting means for physically detecting turning state of the vehicle;

yaw rate feedback control means for controlling a steering angle of rear wheels so that a yaw rate detected by the turning state detecting means is made equal to a target yaw rate;

a second rear wheel steering angle control means adapted for controlling the steering angle of the rear wheels based on a control mode different from that of the yaw rate feedback control means;

a control mode selection means for causing the second rear wheel steering angle control means to control the steering angle of the rear wheels when the vehicle is turning with a turning radius smaller than a first predetermined turning radius and causing the yaw rate feedback control means to control the steering angle of the rear wheels when the vehicle is turning with a turning radius equal to or greater than the first predetermined turning radius; and steering angle restricting means adapted for restricting the steering angle of the rear wheels so that an amount of steering of the rear wheels becomes maximum to decrease an absolute value of the detected yaw rate when, during increase of an absolute value of the detected yaw rate, an absolute value of a deviation between the detected yaw rate and the target yaw rate exceeds a predetermined value and an absolute value of a rate of change in the deviation exceeds a predetermined value.

11. A rear wheel steering system for a vehicle in accordance with claim 10 wherein the steering angle restricting means stops restricting the steering rate and the control mode selection means causes the yaw rate feedback control means to control the steering angle of the rear wheels when the absolute value of the deviation between the detected yaw rate and the target yaw rate begins to decrease.

12. A rear wheel steering system for a vehicle comprising:

turning state detecting means for physically detecting a turning state of the vehicle;

yaw rate feedback control means for controlling a steering angle of rear wheels so that a yaw rate detected by the turning state detecting means is made equal to a target yaw rate;

a second rear wheel steering angle control means adapted for controlling the steering angle of the rear wheels based on a control mode different from that of the yaw rate feedback control means;

a control mode selection means for causing the second rear wheel steering angle control means to control the steering angle of the rear wheels when the vehicle is turning with a turning radius smaller than a first predetermined turning radius and causing the yaw rate feedback control means to control the steering angle of the rear wheels when the vehicle is turning with a turning radius equal to or greater than the first predetermined turning radius; and steering angle detecting means for detecting a steering angle of a steering wheel and steering angle restricting means adapted for restricting the steering angle of the rear wheels so that an amount of steering the rear wheels becomes maximum to decrease an absolute value of the detected yaw rate when, during increase of an absolute value of the detected yaw rate after a change in a sign of a rate of change in the steering angle detected by the steering angle detected by the steering angle detecting means, an absolute value of a deviation between the detected yaw rate and the target yaw rate exceeds a predetermined value.

13. A rear wheel steering system for a vehicle in accordance with claim 12 wherein the steering angle restricting means stops restricting the steering rate and the control mode selection means causes the yaw rate feedback control means to control the steering angle of the rear wheels when the absolute value of the deviation between the detected yaw rate and the target yaw rate begins to decrease.

* * * * *